US012641537B2

(12) United States Patent
Lee et al.

(10) Patent No.: US 12,641,537 B2
(45) Date of Patent: May 26, 2026

(54) RESOURCE CYCLE METHODOLOGY

(71) Applicant: QUALCOMM Incorporated, San Diego, CA (US)

(72) Inventors: Hyun Yong Lee, San Diego, CA (US); Diana Maamari, San Diego, CA (US); Prashanth Haridas Hande, San Diego, CA (US); Peerapol Tinnakornsrisuphap, San Diego, CA (US); Mickael Mondet, Louannec (FR); Ravi Agarwal, San Diego, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 400 days.

(21) Appl. No.: 18/313,825

(22) Filed: May 8, 2023

(65) Prior Publication Data

US 2023/0403648 A1     Dec. 14, 2023

Related U.S. Application Data

(63) Continuation-in-part of application No. 18/296,952, filed on Apr. 6, 2023.

(60) Provisional application No. 63/366,204, filed on Jun. 10, 2022.

(51) Int. Cl.
*H04W 52/02*       (2009.01)
*H04W 76/28*       (2018.01)

(52) U.S. Cl.
CPC ....... *H04W 52/0216* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 10,420,164 B2 | 9/2019 | Uchino et al. | |
| 2016/0192292 A1 | 6/2016 | Höglund et al. | |
| 2022/0394618 A1 | 12/2022 | Yang et al. | |
| 2023/0403758 A1* | 12/2023 | Lee ...................... | H04L 1/1642 |

OTHER PUBLICATIONS

International Search Report and Written Opinion—PCT/US2023/024459—ISA/EPO—Sep. 21, 2023.
Ericsson: "Discussion on Power Saving Enhancements for XR", 3GPP TSG-RAN WG1 Meeting #109-e, R1-2203638, Online, May 9-20, 2022, 13 Pages, Apr. 29, 2022, Section 2.3.3, Sections 2.1, 2.3.1.1.

(Continued)

*Primary Examiner* — Diane L Lo
(74) *Attorney, Agent, or Firm* — Harrity & Harrity, LLP

(57) ABSTRACT

Various aspects of the present disclosure generally relate to wireless communication. In some aspects, a user equipment (UE) may wake up, starting at a subframe, based at least in part on a subframe index of a resource cycle and a system frame number (SFN) wraparound offset that accounts for accumulated lengths of a hyper frame. The UE may receive a data burst during the subframe. Numerous other aspects are described.

38 Claims, 47 Drawing Sheets

(56) References Cited

OTHER PUBLICATIONS

Moderator (Qualcomm Incorporated) : "Final Moderator Summary on XR Specific Power Saving Techniques", 3GPP TSG RAN WG1 #109-e, R1-2205412, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, May 21, 2022, pp. 1-97, XP052192046, pp. 1-3, 8-10, 12-14, 17, 18, 21-23, 29, 38-42, 43, 45, 55-57, 63, 69, 74.

Qualcomm Incorporated (Gaal P., et al.,) : "Power Saving Techniques for XR", 3GPP TSG RAN WG1 #111, R1-2212134, 3rd Generation Partnership Project (3GPP), Mobile Competence Centre, 650, Route Des Lucioles, F-06921, Sophia-Antipolis Cedex, France, vol. 3GPP RAN 1, No. Toulouse, F, Nov. 14, 2022-Nov. 18, 2022, Nov. 5, 2022, pp. 1-31, XP052222697, The Whole Document.

Qualcomm Incorporated: "Power Saving Techniques for XR", 3GPP TSG RAN WG1 #109-e, R1-2205054, 3rd Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, pp. 1-26, XP052203902, p. 4-5.

* cited by examiner

XR headset
with on-device processing

On-device
adjustment to
latest pose

Uplink: Tracking/Inputs

Ex: 100 bytes every 2 ms (500 Hz)
can be reduced to align with video frame rate

Downlink: Encoded data

100+ KB at 45/60/75/90 frames per second
(every 11, 13, 16, 22 ms)

gNB

Edge cloud
with game rendering

| Traffic | Short cadence | w/ slot offset |
|---|---|---|
| 20.833 | 20.000 | 20.750 |
| 41.667 | 41.000 | 41.625 |
| 62.500 | 62.000 | 62.500 |
| 83.333 | 83.000 | 83.250 |
| 104.167 | 104.000 | 104.125 |
| 125.000 | 125.000 | 125.000 |
| 145.833 | 145.000 | 145.750 |
| 166.667 | 166.000 | 166.625 |
| 187.500 | 187.000 | 187.500 |

60 Hz:

| Traffic | Short cadence | w/ slot offset |
|---|---|---|
| 16.667 | 16.000 | 16.625 |
| 33.333 | 33.000 | 33.250 |
| 50.000 | 50.000 | 50.000 |
| 66.667 | 66.000 | 66.625 |
| 83.333 | 83.000 | 83.250 |
| 100.000 | 100.000 | 100.000 |
| 116.667 | 116.000 | 116.625 |
| 133.333 | 133.000 | 133.250 |
| 150.000 | 150.000 | 150.000 |
| 166.667 | 166.000 | 166.625 |
| 183.333 | 183.000 | 183.250 |
| 200.000 | 200.000 | 200.000 |

80 Hz:

| Traffic | Short cadence | w/ slot offset |
|---|---|---|
| 12.500 | 12.000 | 12.500 |
| 25.000 | 25.000 | 25.000 |
| 37.500 | 37.000 | 37.500 |
| 50.000 | 50.000 | 50.000 |
| 62.500 | 62.000 | 62.500 |
| 75.000 | 75.000 | 75.000 |
| 87.500 | 87.000 | 87.500 |
| 100.000 | 100.000 | 100.000 |
| 112.500 | 112.000 | 112.500 |
| 125.000 | 125.000 | 125.000 |
| 137.500 | 137.000 | 137.500 |
| 150.000 | 150.000 | 150.000 |
| 162.500 | 162.000 | 162.500 |
| 175.000 | 175.000 | 175.000 |
| 187.500 | 187.000 | 187.500 |
| 200.000 | 200.000 | 200.000 |

90 Hz:

| Traffic | Short cadence | w/ slot offset |
|---|---|---|
| 11.111 | 11.000 | 11.000 |
| 22.222 | 22.000 | 22.125 |
| 33.333 | 33.000 | 33.250 |
| 44.444 | 44.000 | 44.375 |
| 55.556 | 55.000 | 55.500 |
| 66.667 | 66.000 | 66.625 |
| 77.778 | 77.000 | 77.750 |
| 88.889 | 88.000 | 88.875 |
| 100.000 | 100.000 | 100.000 |
| 111.111 | 111.000 | 111.000 |
| 122.222 | 122.000 | 122.125 |
| 133.333 | 133.000 | 133.250 |
| 144.444 | 144.000 | 144.375 |
| 155.556 | 155.000 | 155.500 |
| 166.667 | 166.000 | 166.625 |
| 177.778 | 177.000 | 177.750 |
| 188.889 | 188.000 | 188.875 |
| 200.000 | 200.000 | 200.000 |

1200
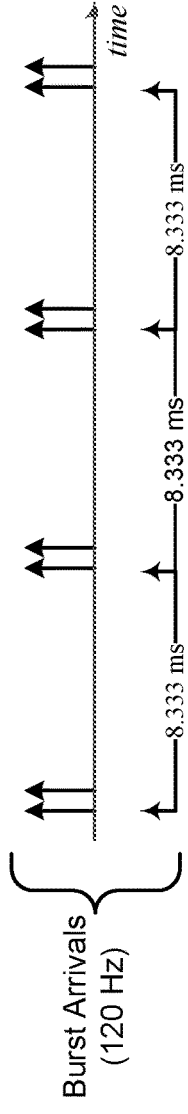
Burst Arrivals
(120 Hz)
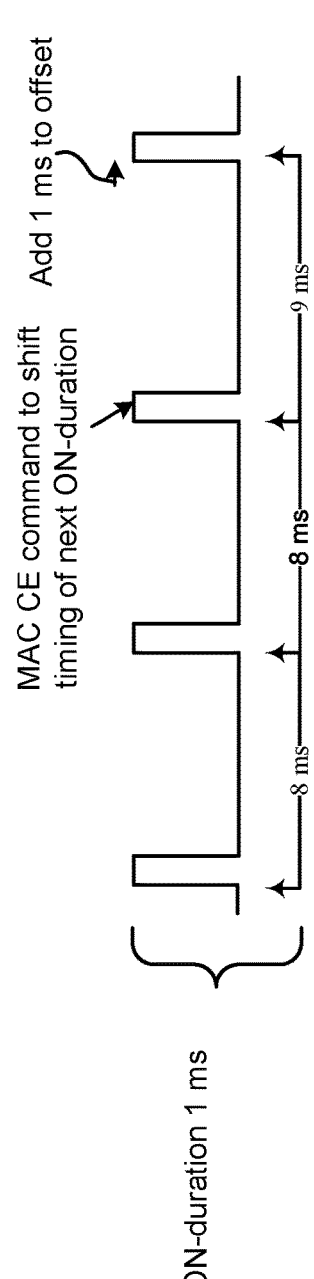
ON-duration 1 ms
FIG. 12

1300
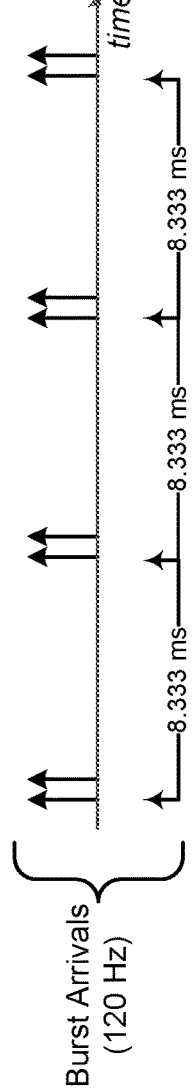
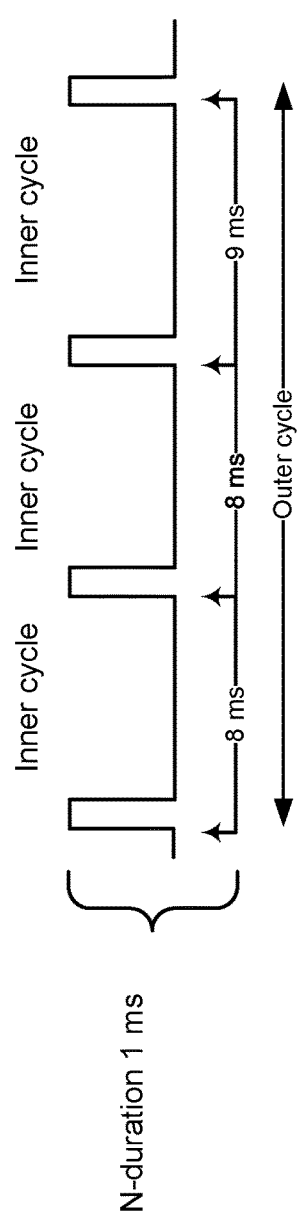
FIG. 13

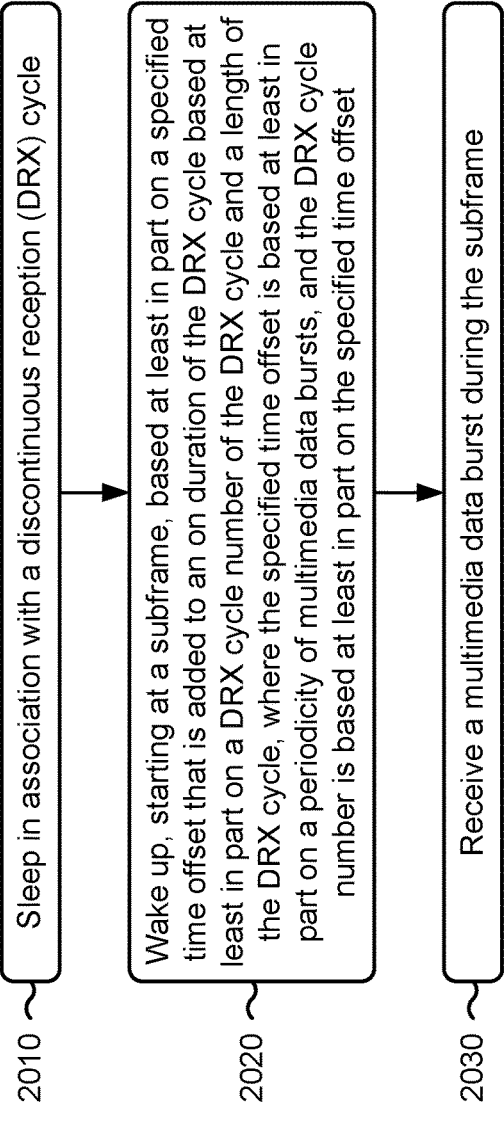

2010  Sleep in association with a discontinuous reception (DRX) cycle

2020  Wake up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and the DRX cycle number is based at least in part on the specified time offset 2030  Receive a multimedia data burst during the subframe

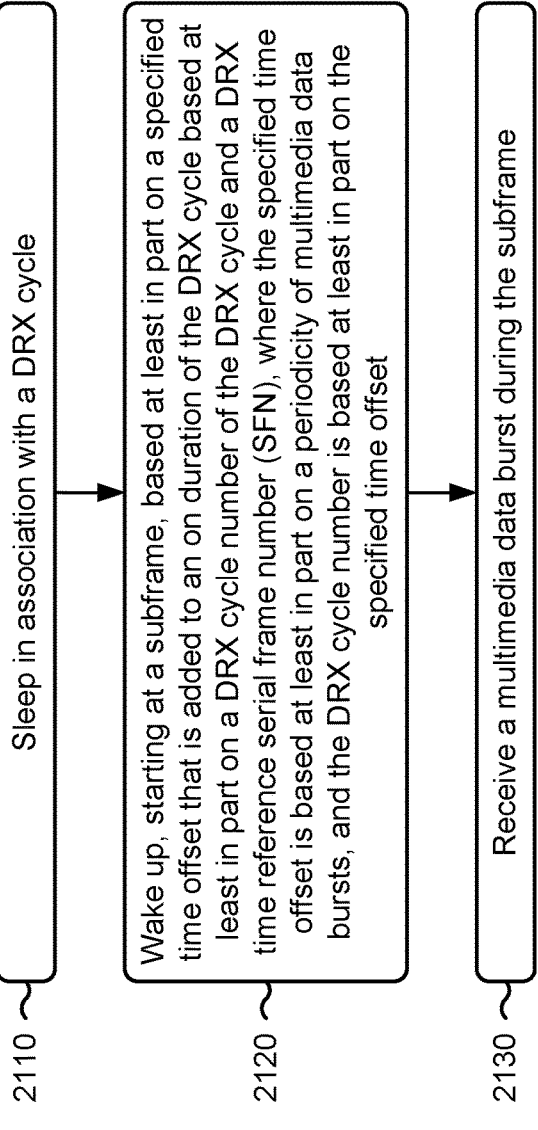

2110 — Sleep in association with a DRX cycle

2120 — Wake up, starting at a subframe, based at least in part on a specified time offset that is added to an on duration of the DRX cycle based at least in part on a DRX cycle number of the DRX cycle and a DRX time reference serial frame number (SFN), where the specified time offset is based at least in part on a periodicity of multimedia data bursts, and the DRX cycle number is based at least in part on the specified time offset 2130 — Receive a multimedia data burst during the subframe

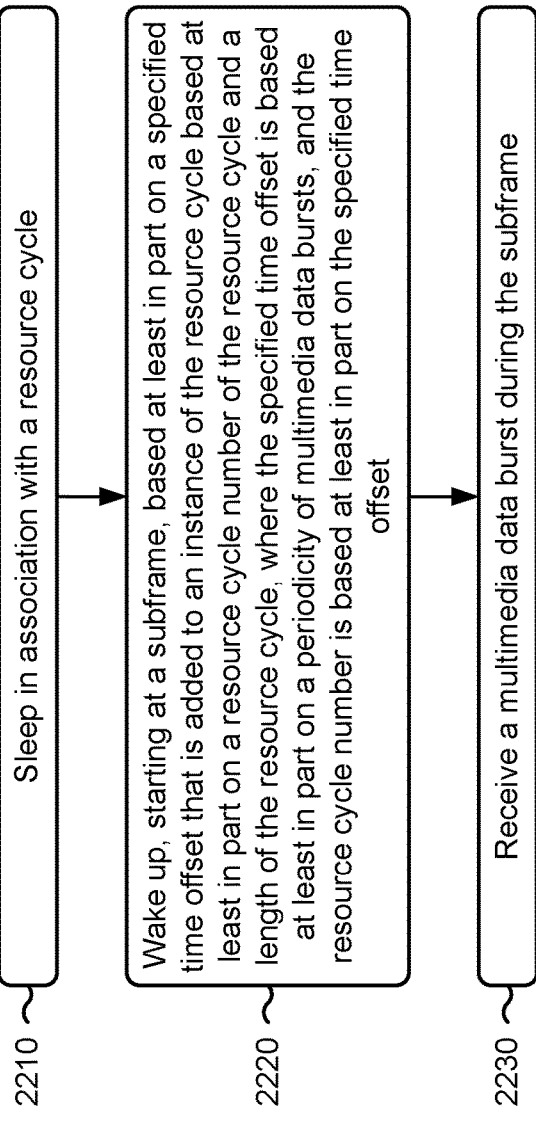

2210    Sleep in association with a resource cycle

2220    Wake up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and the resource cycle number is based at least in part on the specified time offset 2230    Receive a multimedia data burst during the subframe

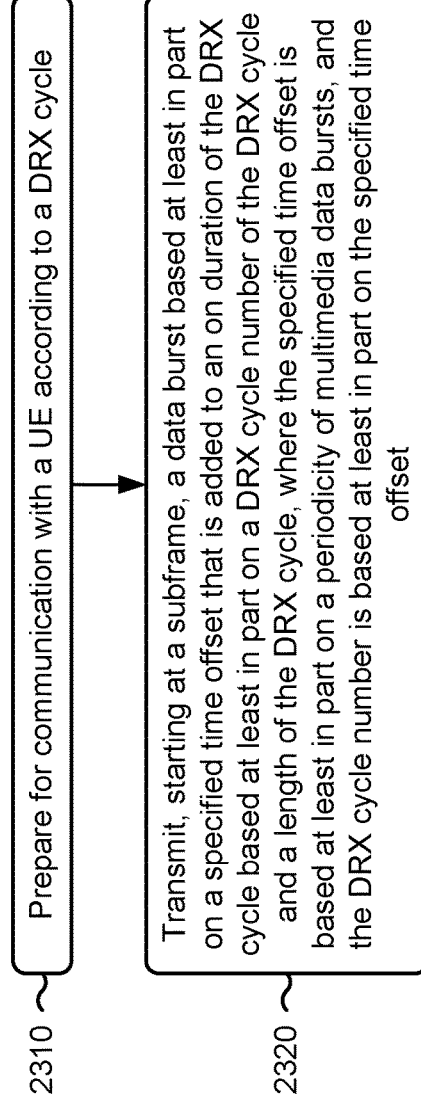

2310 — Prepare for communication with a UE according to a DRX cycle

2320 — Transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and the DRX cycle number is based at least in part on the specified time offset

2300

FIG. 23

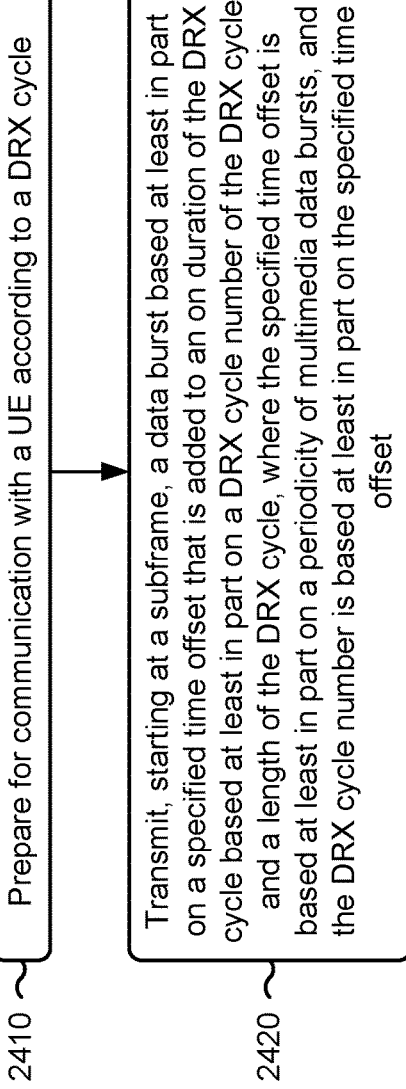

2410 Prepare for communication with a UE according to a DRX cycle

2420 Transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and the DRX cycle number is based at least in part on the specified time offset

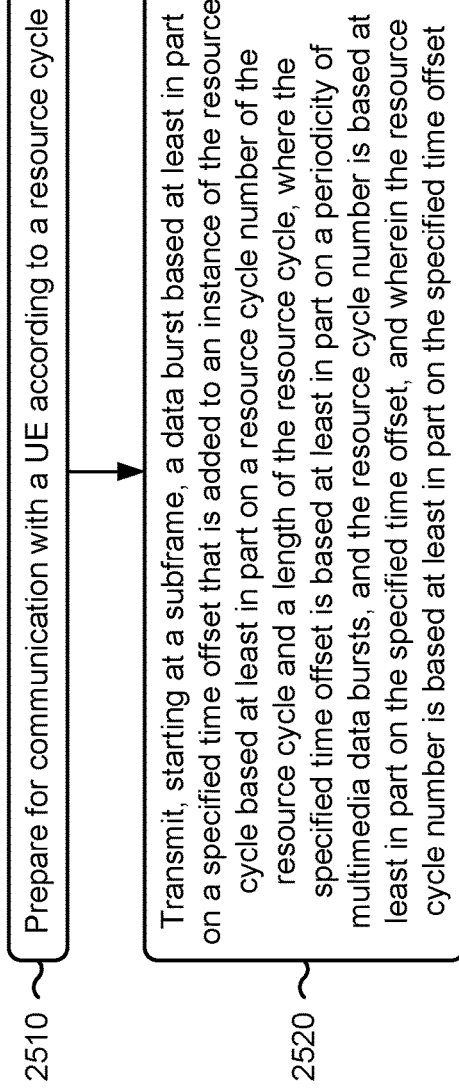

2510 Prepare for communication with a UE according to a resource cycle

2520 Transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, and the resource cycle number is based at least in part on the specified time offset, and wherein the resource cycle number is based at least in part on the specified time offset

2500

FIG. 25

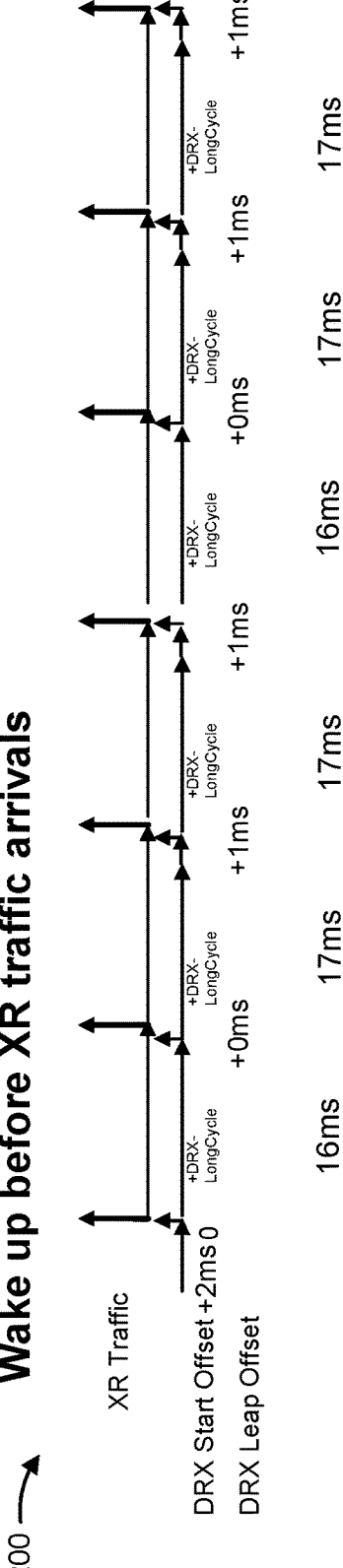
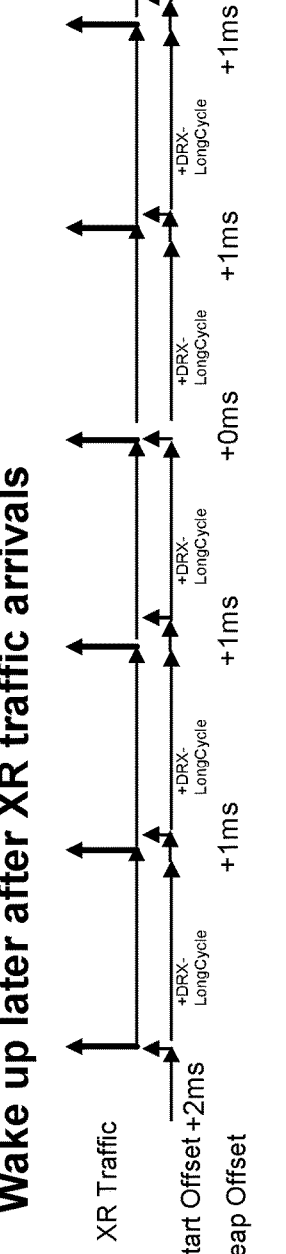
FIG. 32

3300

| n | XR (16.666 * n) | [(SFN × 10) + subframe number] | drx-Offset(n) | drx-LeapOffset ((n-1) mod 3) | Wanted Values |
|---|---|---|---|---|---|
| 0 | 0 | 16 × 0 + 0 = 0 | 0 | | 0 |
| 1 | 16.666 | 16 × 1 + 0 = 16 | 0 | 0 | 16 |
| 2 | 33.333 | 16 × 2 + 1 = 33 | 1 | 1 | 33 |
| 3 | 50 | 16 × 3 + 2 = 50 | 2 | 1 | 50 |
| 4 | 66.666 | 16 × 4 + 2 = 66 | 2 | 0 | 66 |
| 5 | 83.333 | 16 × 5 + 3 = 83 | 3 | 1 | 83 |
| 6 | 100 | 16 × 6 + 4 = 100 | 4 | 1 | 100 |
| 7 | 116.666 | 16 × 7 + 4 = 116 | 4 | 0 | 116 |
| 8 | 133.333 | 16 × 8 + 5 = 133 | 5 | 1 | 133 |
| 9 | 150 | 16 × 9 + 6 = 150 | 6 | 1 | 150 |

| n | XR (16.666 * n) | [(SFN × 10) + subframe number] | drx-Longcycle * n | floor(drx-Longcycle * n) | Wanted Values |
|---|---|---|---|---|---|
| 0 | 0 | 16 x 0 + 0 = 0 | 0 | 0 | 0 |
| 1 | 16.666 | 16 x 1 + 0 = 16 | 16.666 | 16 | 16 |
| 2 | 33.333 | 16 x 2 + 1 = 33 | 33.333 | 33 | 33 |
| 3 | 50 | 16 x 3 + 2 = 50 | 50 | 50 | 50 |
| 4 | 66.666 | 16 x 4 + 2 = 66 | 66.666 | 66 | 66 |
| 5 | 83.333 | 16 x 5 + 3 = 83 | 83.333 | 83 | 83 |
| 6 | 100 | 16 x 6 + 4 = 100 | 100 | 100 | 100 |
| 7 | 116.666 | 16 x 7 + 4 = 116 | 116.333 | 116 | 116 |
| 8 | 133.333 | 16 x 8 + 5 = 133 | 133.333 | 133 | 133 |
| 9 | 150 | 16 x 9 + 6 = 150 | 150 | 150 | 150 |

| DRX long cycle (ms) | Backward Compatibility |
|---|---|
| 10 | O |
| 20 | O |
| 32 | O |
| 40 | O |
| 60 | X |
| 64 | O |
| 70 | X |
| 80 | O |
| 128 | O |
| 160 | O |
| 256 | O |
| 320 | O |
| 512 | O |
| 640 | O |
| 1024 | O |
| 1280 | O |
| 2048 | O |
| 2560 | O |
| 10240 | O |

3402

| DRX short cycle (ms) | Backward Compatibility |
|---|---|
| 2 | O |
| 3 | X |
| 4 | O |
| 5 | O |
| 6 | X |
| 7 | X |
| 8 | O |
| 10 | O |
| 14 | X |
| 16 | O |
| 20 | O |
| 30 | X |
| 32 | O |
| 35 | X |
| 40 | O |
| 64 | O |
| 80 | O |
| 128 | O |
| 160 | O |
| 256 | O |
| 320 | O |
| 512 | O |
| 640 | O |

3625
Transmit capability message

3630
Transmit configuration that uses SFN wraparound offset

3635
Wake up, starting at subframe, based on subframe index and SFN wraparound offset

3640
Receive data burst during subframe

UE
3620

Network entity
3610

3600

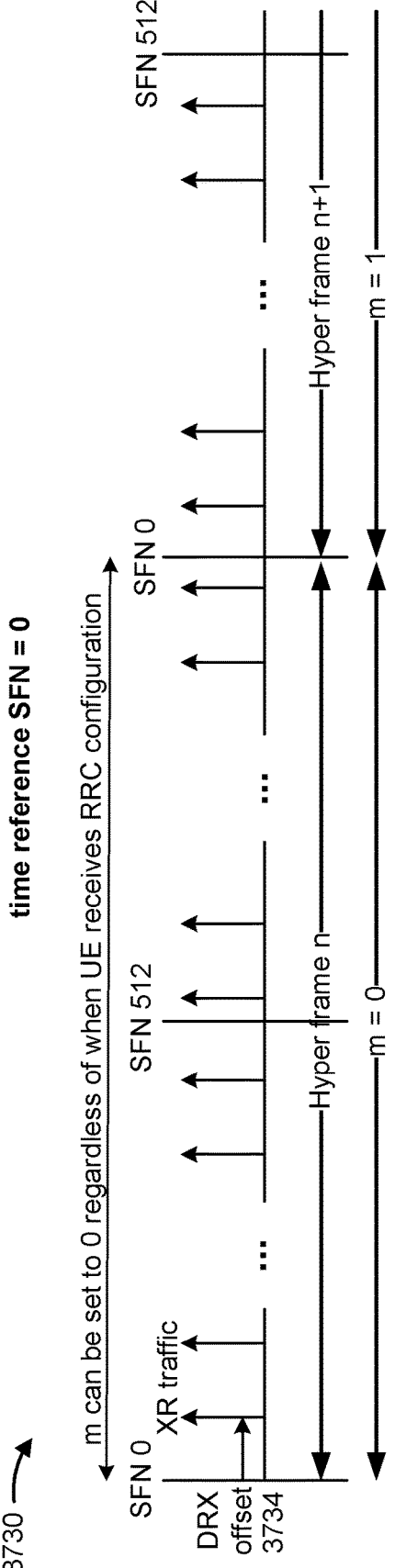
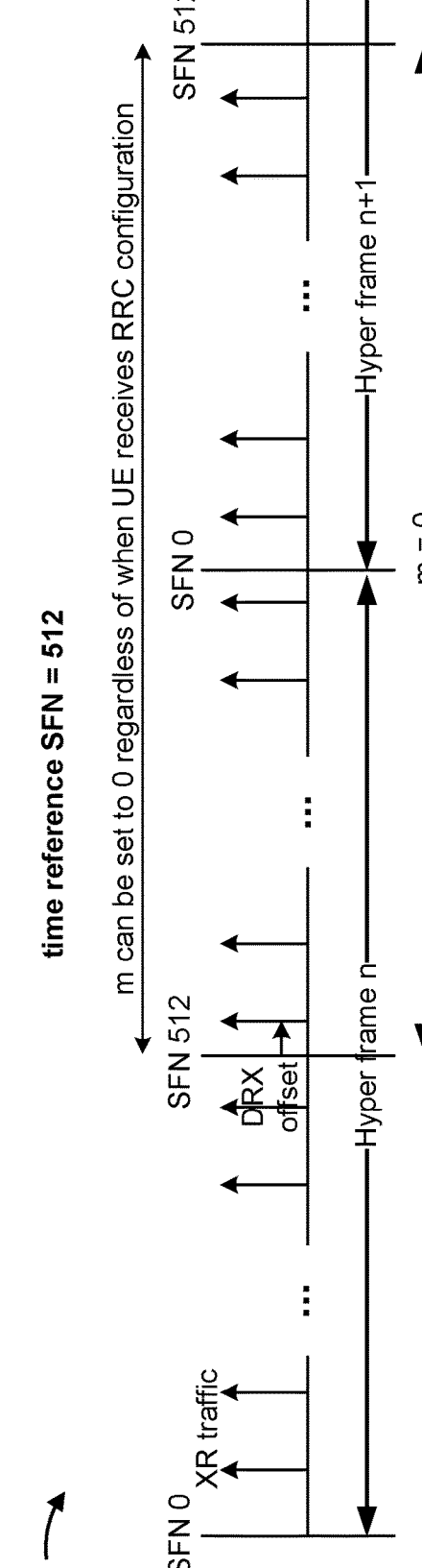
FIG. 37C

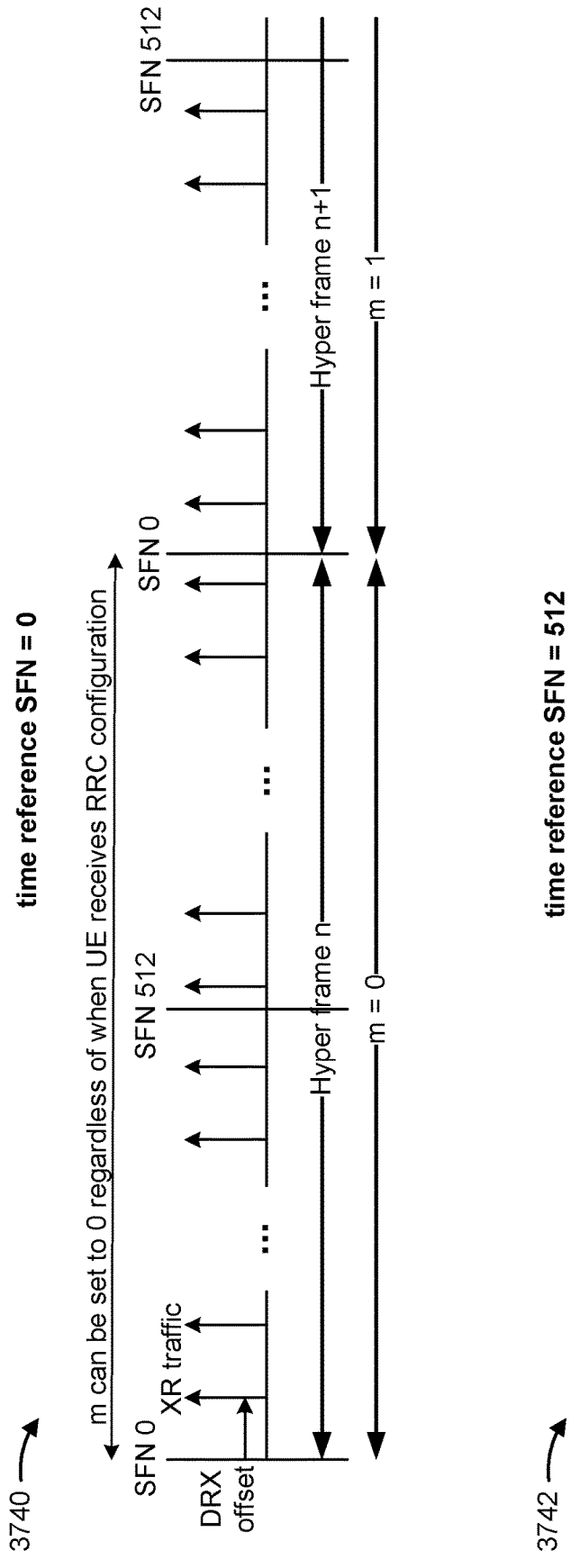
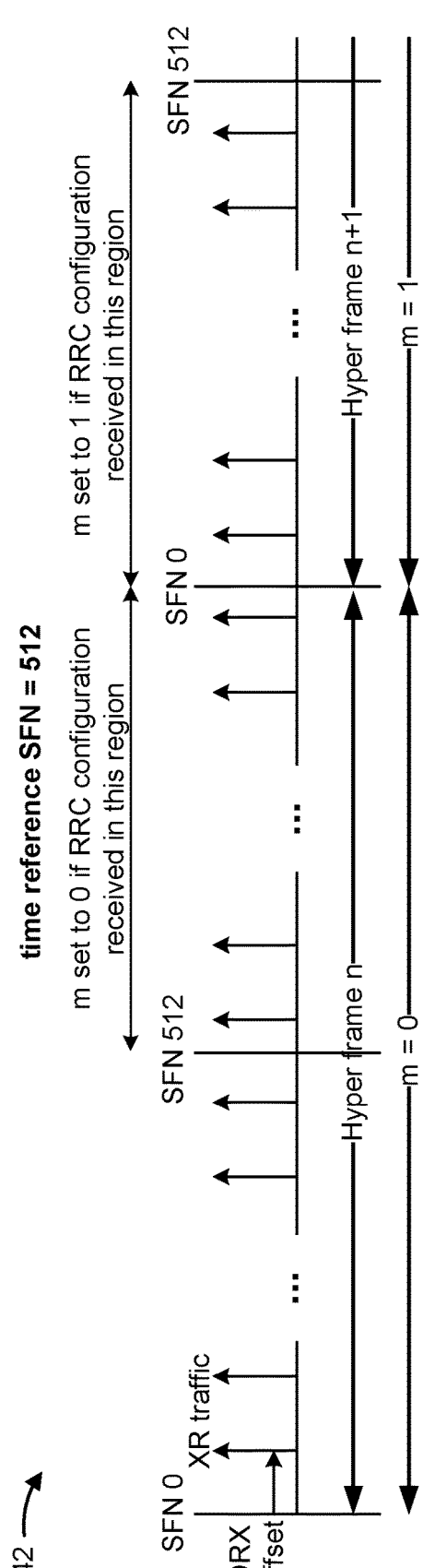
FIG. 37D

Wake up, starting at a subframe, based at least in part on a subframe index of a resource cycle and a system frame number (SFN) wraparound offset that accounts for accumulated lengths of a hyper frame

3810

Receive a data burst during the subframe

3820

3800

RESOURCE CYCLE METHODOLOGY

CROSS-REFERENCE TO RELATED APPLICATION

This patent application is a continuation-in-part of U.S. patent application Ser. No. 18/296,952, filed on Apr. 6, 2023, entitled "RESOURCE CYCLE METHODOLOGY," which claims priority to U.S. Provisional Patent Application No. 63/366,204, filed on Jun. 10, 2022, entitled "DISCONTINU-OUS RECEPTION METHODOLOGY," both of which are assigned to the assignee hereof. The disclosures of the prior applications are considered part of and are incorporated by reference into this patent application.

INTRODUCTION

Aspects of the present disclosure generally relate to wireless communication and to techniques and apparatuses for handling resource cycles and other applications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method for wireless communication at a user equipment (UE). The method may include waking up, starting at a subframe, based at least in part on a subframe index of a resource cycle and a system frame number (SFN) wraparound offset that accounts for accumulated lengths of a hyper frame. The method may include receiving a data burst during the subframe.

Some aspects described herein relate to a UE for wireless communication. The UE may include one or more memories and one or more processors, coupled with the one or more memories. The one or more processors may be individually or collectively configured to wake up, starting at a subframe, based at least in part on a subframe index of a resource cycle and an SFN wraparound offset that accounts for accumulated lengths of a hyper frame. The one or more processors may be individually or collectively configured to receive a data burst during the subframe.

Some aspects described herein relate to a non-transitory computer-readable medium that stores a set of instructions for wireless communication by a UE. The set of instructions, when executed by one or more processors of the UE, may cause the UE to wake up, starting at a subframe, based at least in part on a subframe index of a resource cycle and an SFN wraparound offset that accounts for accumulated lengths of a hyper frame. The set of instructions, when executed by one or more processors of the UE, may cause the UE to receive a data burst during the subframe.

Some aspects described herein relate to an apparatus for wireless communication. The apparatus may include means for waking up, starting at a subframe, based at least in part on a subframe index of a resource cycle and an SFN wraparound offset that accounts for accumulated lengths of a hyper frame. The apparatus may include means for receiving a data burst during the subframe.

Some aspects described herein relate to a method of wireless communication performed by a UE. The method may include sleeping in association with a discontinuous reception (DRX) cycle. The method may include waking up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The method may include receiving a multimedia data burst during the subframe.

Some aspects described herein relate to a method of wireless communication performed by a UE. The method may include sleeping in association with a DRX cycle. The method may include waking up, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset. The method may include receiving a multimedia data burst during the subframe.

Some aspects described herein relate to a method of wireless communication performed by a UE. The method may include sleeping in association with a resource cycle. The method may include waking up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset. The method may include receiving a multimedia data burst during the subframe.

Some aspects described herein relate to a method of wireless communication performed by a network entity. The method may include preparing for communication with a UE according to a DRX cycle. The method may include transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a method of wireless communication performed by a network entity. The method may include preparing for communication with a UE according to a DRX cycle. The method may include transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a method of wireless communication performed by a network entity. The method may include preparing for communication with a UE according to a resource cycle. The method may include transmitting, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset, and where the resource cycle number is based at least in part on the specified time offset.

Some aspects described herein relate to a UE for wireless communication. The UE may include one or more memories and one or more processors coupled with the one or more memories. The one or more processors may be individually or collectively configured to cause the UE to sleep in association with a DRX cycle. The one or more processors may be configured to wake up the UE, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The one or more processors may be individually or collectively configured to receive a multimedia data burst during the subframe.

Some aspects described herein relate to a UE for wireless communication. The UE may include one or more memories and one or more processors coupled with the one or more memories. The one or more processors may be individually or collectively configured to cause the UE to sleep in association with a DRX cycle. The one or more processors may be individually or collectively configured to wake up the UE, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset. The one or more processors may be individually or collectively configured to receive a multimedia data burst during the subframe.

Some aspects described herein relate to a UE for wireless communication. The UE may include one or more memories and one or more processors coupled to the one or more memories. The one or more processors may be individually or collectively configured to cause the to sleep in association with a resource cycle. The one or more processors may be individually or collectively configured to wake up the UE, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset. The one or more processors may be individually or collectively configured to receive a multimedia data burst during the subframe.

Some aspects described herein relate to a network entity for wireless communication. The network entity may include one or more memories and one or more processors coupled to the one or more memories. The one or more processors may be individually or collectively configured to prepare for communication with a UE according to a DRX cycle. The one or more processors may be individually or collectively configured to transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a network entity for wireless communication. The network entity may include one or more memories and one or more processors coupled to the one or more memories. The one or more processors may be individually or collectively configured to prepare for communication with a UE according to a DRX cycle. The one or more processors may be individually or collectively configured to transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a network entity for wireless communication. The network entity may include one or more memories and one or more processors coupled to the one or more memories. The one or more processors may be individually or collectively configured to prepare for communication with a UE according to a resource cycle. The one or more processors may be individually or collectively configured to transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset, and where the resource cycle number is based at least in part on the specified time offset.

Some aspects described herein relate to a non-transitory computer-readable medium that stores a set of instructions for wireless communication by a UE. The set of instructions, when executed by one or more processors of the UE, may cause the UE to sleep in association with a DRX cycle. The set of instructions, when executed by one or more processors of the UE, may cause the UE to wake up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The set of instructions, when executed by one or more processors of the UE, may cause the UE to receive a multimedia data burst during the subframe.

Some aspects described herein relate to a non-transitory computer-readable medium that stores a set of instructions for wireless communication by a UE. The set of instructions, when executed by one or more processors of the UE, may cause the UE to sleep in association with a DRX cycle. The set of instructions, when executed by one or more processors of the UE, may cause the UE to wake up, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset. The set of instructions, when executed by one or more processors of the UE, may cause the UE to receive a multimedia data burst during the subframe.

Some aspects described herein relate to a non-transitory computer-readable medium that stores a set of instructions for wireless communication by a UE. The set of instructions, when executed by one or more processors of the UE, may cause the UE to sleep in association with a resource cycle. The set of instructions, when executed by one or more processors of the UE, may cause the UE to wake up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset. The set of instructions, when executed by one or more processors of the UE, may cause the UE to receive a multimedia data burst during the subframe.

Some aspects described herein relate to a non-transitory computer-readable medium that stores a set of instructions for wireless communication by a network entity. The set of instructions, when executed by one or more processors of the network entity, may cause the network entity to prepare for communication with a UE according to a DRX cycle. The set of instructions, when executed by one or more processors of the network entity, may cause the network entity to transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a non-transitory computer-readable medium that stores a set of instructions for wireless communication by a network entity. The set of instructions, when executed by one or more processors of the network entity, may cause the network entity to prepare for communication with a UE according to a DRX cycle. The set of instructions, when executed by one or more processors of the network entity, may cause the network entity to transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to a non-transitory computer-readable medium that stores a set of instructions for wireless communication by a network entity. The set of instructions, when executed by one or more processors of the network entity, may cause the network entity to prepare for communication with a UE according to a resource cycle. The set of instructions, when executed by one or more processors of the network entity, may cause the network entity to transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset, and where the resource cycle number is based at least in part on the specified time offset.

Some aspects described herein relate to an apparatus for wireless communication. The apparatus may include means for sleeping in association with a DRX cycle. The apparatus may include means for waking up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The apparatus may include means for receiving a multimedia data burst during the subframe.

Some aspects described herein relate to an apparatus for wireless communication. The apparatus may include means for sleeping in association with a DRX cycle. The apparatus may include means for waking up, starting at a subframe, based at least in part on a specified time offset that is added to an on duration of the DRX cycle based at least in part on a DRX cycle number of the DRX cycle and a DRX time reference system frame number (SFN), where the specified time offset is based at least in part on a periodicity of multimedia data bursts, and where the DRX cycle number is based at least in part on the specified time offset. The apparatus may include means for receiving a multimedia data burst during the subframe.

Some aspects described herein relate to an apparatus for wireless communication. The apparatus may include means for sleeping in association with a resource cycle. The apparatus may include means for waking up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset. The apparatus may include means for receiving a multimedia data burst during the subframe.

Some aspects described herein relate to an apparatus for wireless communication. The apparatus may include means for preparing for communication with a UE according to a DRX cycle. The apparatus may include means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to an apparatus for wireless communication. The apparatus may include means for preparing for communication with a UE according to a DRX cycle. The apparatus may include means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

Some aspects described herein relate to an apparatus for wireless communication. The apparatus may include means for preparing for communication with a UE according to a resource cycle. The apparatus may include means for transmitting, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset, and where the resource cycle number is based at least in part on the specified time offset.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example of using different short cadence values, in accordance with the present disclosure.

FIG. 12 is a diagram illustrating an example of using a short cadence value for DRX, in accordance with the present disclosure.

FIG. 13 is a diagram illustrating an example of using a short cadence value for DRX, in accordance with the present disclosure.

FIG. 20 is a diagram illustrating an example process performed, for example, by a UE, in accordance with the present disclosure.

FIG. 21 is a diagram illustrating an example process performed, for example, by a UE, in accordance with the present disclosure.

FIG. 22 is a diagram illustrating an example process performed, for example, by a UE, in accordance with the present disclosure.

FIG. 23 is a diagram illustrating an example process performed, for example, by a base station, in accordance with the present disclosure.

FIG. 24 is a diagram illustrating an example process performed, for example, by a base station, in accordance with the present disclosure.

FIG. 25 is a diagram illustrating an example process performed, for example, by a base station, in accordance with the present disclosure.

FIG. 32 is a diagram illustrating an example of leap offset patterns, in accordance with the present disclosure.

FIG. 33A is a diagram illustrating an example of subframe indices, in accordance with the present disclosure.

FIG. 33B is a diagram illustrating an example of subframe indices, in accordance with the present disclosure.

FIG. 34 is a diagram illustrating an example of backward compatibility, in accordance with the present disclosure.

FIG. 37C is a diagram illustrating an example of receiving the configuration for resource cycles, in accordance with the present disclosure.

FIG. 37D is a diagram illustrating an example of receiving the configuration for resource cycles, in accordance with the present disclosure.

DETAILED DESCRIPTION

Figure 1:
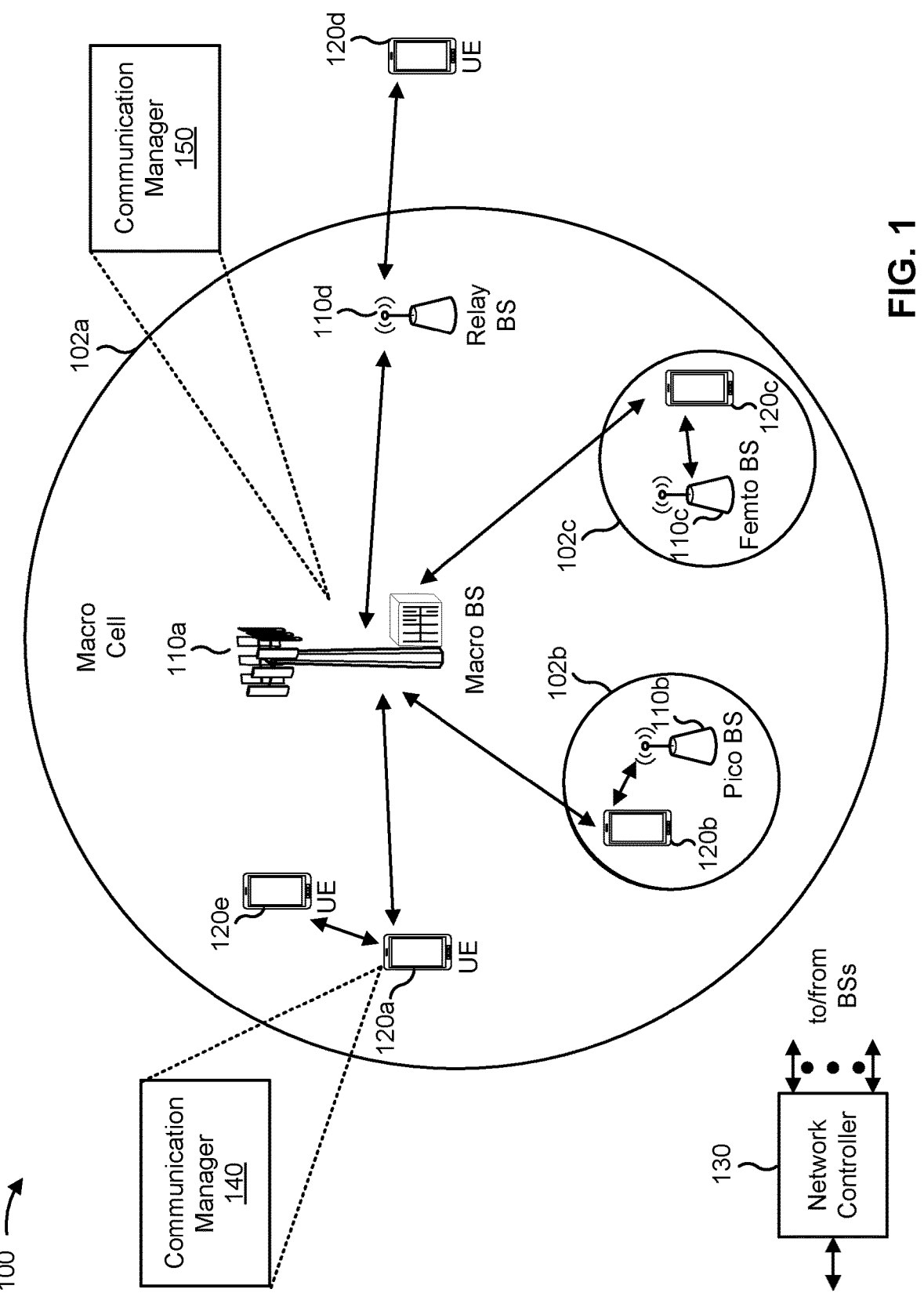
FIG. 1 is a diagram illustrating an example of a wireless network, in accordance with the present disclosure.

Power dissipation of a user equipment (UE), such as an extended reality (XR) device, may be reduced by limiting an amount of time that processing resources of the UE are active for computations and power consumption. Some wireless communication systems may a support a discontinuous reception (DRX) mode. A UE in a DRX mode may transition between a sleep state for power conservation and an active state for data transmission and reception. The sleep state involves a reduced use of resources (power saving) for receiving or transmitting communications. The active state includes an increased use or restoration of resources for receiving and transmitting communications. The active state for data transmission and reception may be referred to as a DRX "ON-duration." A DRX cycle may be a time duration that includes a sleep state and an active ON-duration state for a UE. The DRX cycle may start at the beginning of an ON-duration and end at the beginning of the next ON-duration. In some aspects, a DRX cycle may be referred to as a "DRX long cycle".

However, there are timing mismatches that prevent successful use of DRX. For example, according to one or more aspects, an update rate for the UE may be, for example, 120 Hz or 60 Hz, thus resulting in a downlink traffic burst arrival periodicity of 8.333 ms or 16.667 ms, respectively. However, DRX configurations may have one millisecond as the finest granularity for a DRX cycle, and the start of the ON-duration may be aligned to millisecond time boundaries. These partial millisecond differences may compound with each traffic burst of an XR traffic period to misalign the DRX cycle and the multimedia traffic periodicity. For example, an XR traffic period (times at which XR traffic data bursts arrive) may drift to a middle of a DRX cycle. The mismatch between when XR traffic bursts arrive and when the UE wakes for ON-durations of the DRX cycle can cause an increase in latency and power consumption, because if an XR traffic burst arrives when the UE is not awake, the XR traffic burst has to be retransmitted or is lost as a waste of power and signaling resources.

The techniques described in more detail below improve alignment of DRX cycles and multimedia traffic to reduce mismatches between the multimedia burst traffic and DRX ON-duration times. For example, the UE may use a wake-up condition to determine when to wake up, which may include adding a specified time offset, which may be a fixed time shift, to an ON-duration (e.g., a next ON-duration) of a DRX cycle. The wake-up condition may be based at least in part on the subframe number of a subframe, which in one or more aspects may be a subframe of a frame identified by a system frame number (SFN). The specified time offset may be added based at least in part on the DRX cycle number and the DRX cycle length of the DRX cycle. In some aspects, a DRX cycle may be a leap cycle that adds a leap offset or an amount of time (e.g., 1 ms) to realign XR traffic bursts with DRX ON-durations. In some aspects, a UE may be configured with a leap offset pattern that indicates for which DRX ON-durations that a leap offset is to be applied. A leap offset pattern may applied be per leap cycle, which may include a quantity of DRX ON-durations. An anchor cycle may include multiple leap cycles.

According to one or more aspects, a UE may configure a DRX cycle for a cadence of the data bursts, such as every 8.33 ms at 120 Hz, but the cadence of the data bursts may be associated with a periodicity of 1000 ms. In one or more examples, with a multimedia periodicity of 1000 ms and a DRX cycle of 10,240 ms (1024 SFNs per hyper frame at 10 ms each), the hyper frame (formed by a quantity of SFNs, such as 1024 SFNs) of the DRX may be misaligned with a frame of a multimedia server every 10.24 seconds. An SFN wraparound occurs when the SFN returns to 0 at an end of a hyper frame. The SFN wraparound may cause the on-durations of the DRX cycle to misalign with the data bursts due to the difference between the periodicity (e.g., 1000 ms) of the data bursts and the length of the hyper frame (e.g., 10240 ms). In some aspects, the wake-up condition may account for this SFN wraparound issue where an end of the hyper frame (end of the 1024 SFNs) causes a misalignment of a subframe index and a traffic burst. For example, the UE may wake up based at least in part on an SFN wraparound offset, which adjusts for the misalignment caused by an end of a hyper frame. As a result, the UE may not miss traffic bursts, and communication performance may improve.

In some aspects, the SFN wraparound offset may be based at least in part on a counter m. The initial value of m may be based at least in part on when a resource cycle configuration is received. As a result, the UE may apply the correct SFN wraparound offset. The UE may not miss traffic bursts and communication performance may improve.

While various aspects described herein are applied to examples with DRX cycles, the various aspects described herein may also apply to other resource cycles.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, a transmit receive point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "sub-6 GHz" band. A similar nomenclature issue sometimes occurs with regard to FR2, which is often referred to (interchangeably) as a "millimeter wave" band despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may sleep in association with a DRX cycle; wake up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset; and receive a multimedia data burst during the subframe.

In some aspects, the communication manager 140 may sleep in association with a DRX cycle; wake up, starting at a subframe, based at least in part on a specified time offset that is added to an on duration of the DRX cycle based at least in part on a DRX cycle number of the DRX cycle and a DRX time reference system frame number (SFN), where the specified time offset is based at least in part on a periodicity of multimedia data bursts, and where the DRX cycle number is based at least in part on the specified time offset; and receive a multimedia data burst during the subframe.

In some aspects, the communication manager 140 may sleep in association with a resource cycle; wake up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset; and receive a multimedia data burst during the subframe. Additionally, or alternatively, the communication manager 140 may perform one or more other operations described herein.

In some aspects, a network entity (e.g., base station 110) may include a communication manager 150. As described in more detail elsewhere herein, the communication manager 150 may prepare for communication with a UE according to a DRX cycle; and transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

In some aspects, the communication manager 150 may prepare for communication with a UE according to a DRX cycle; and transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

In some aspects, the communication manager 150 may prepare for communication with a UE according to a resource cycle; and transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset. Additionally, or alternatively, the communication manager 150 may perform one or more other operations described herein.

As indicated above, FIG. 1 is provided as an example. Other examples may differ from what is described with regard to FIG. 1.

Figure 2:
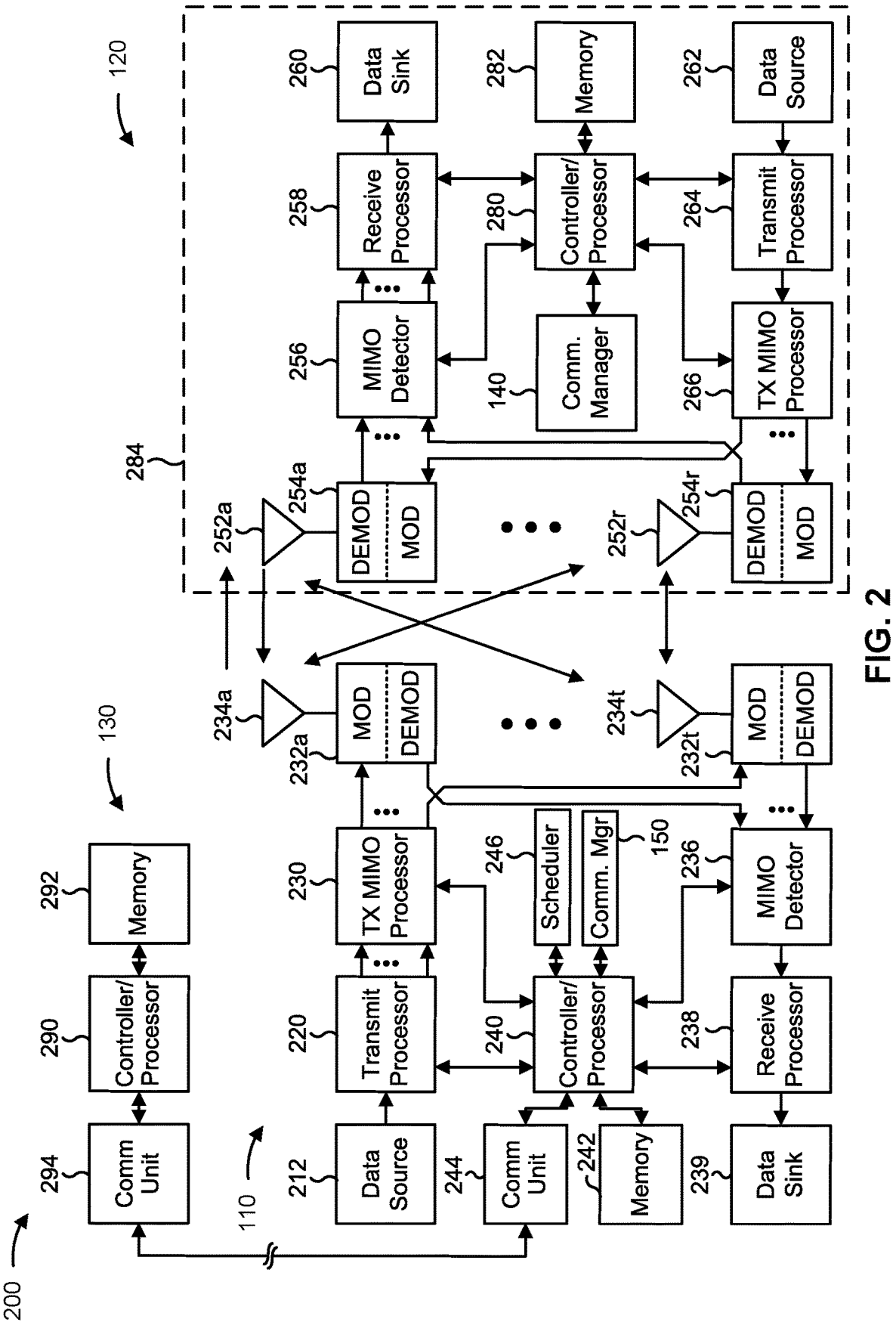
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292 (e.g., one or more memories). The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 (e.g., one or more memories) to perform aspects of any of the methods described herein (e.g., with reference to FIGS. 3-41).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 (e.g., one or more memories) to perform aspects of any of the methods described herein (e.g., with reference to FIGS. 3-41).

The controller/processor 240 of a network entity (e.g., base station 110), the controller/processor 280 of the UE 120, and/or any other component(s) of FIG. 2 may perform one or more techniques associated with methodologies for DRX, such as setting a hyper frame length for DRX, as described in more detail elsewhere herein. For example, the controller/processor 240 of the base station 110, the controller/processor 280 of the UE 120, and/or any other component(s) of FIG. 2 may perform or direct operations of, for example, process 2000 of FIG. 20, process 2100 of FIG. 21, process 2200 of FIG. 22, process 2300 of FIG. 23, process 2400 of FIG. 24, process 2500 of FIG. 25, process 3800 of FIG. 38, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 2000 of FIG. 20, process 2100 of FIG. 21, process 2200 of FIG. 22, process 2300 of FIG. 23, process 2400 of FIG. 24, process 2500 of FIG. 25, process 3800 of FIG. 38, and/or other processes as described herein. In some examples, executing instructions may include running the instructions, converting the instructions, compiling the instructions, and/or interpreting the instructions, among other examples.

In some aspects, a UE (e.g., a UE 120) includes means for sleeping in association with a DRX cycle; means for waking up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset; and/or means for receiving a multimedia data burst during the subframe. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for sleeping in association with a DRX cycle; means for waking up, starting at a subframe, based at least in part on a specified time offset that is added to an on duration of the DRX cycle based at least in part on a DRX cycle number of the DRX cycle and a DRX time reference system frame number (SFN), where the specified time offset is based at least in part on a periodicity of multimedia data bursts, and where the DRX cycle number is based at least in part on the specified time offset; and/or means for receiving a multimedia data burst during the subframe.

In some aspects, the UE includes means for sleeping in association with a resource cycle; means for waking up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset; and/or means for receiving a multimedia data burst during the subframe.

In some aspects, a network entity (e.g., base station 110) includes means for preparing for communication with a UE according to a DRX cycle; and/or means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network entity includes means for preparing for communication with a UE according to a DRX cycle; and/or means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

In some aspects, the network entity includes means for preparing for communication with a UE according to a resource cycle; and/or means for transmitting, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
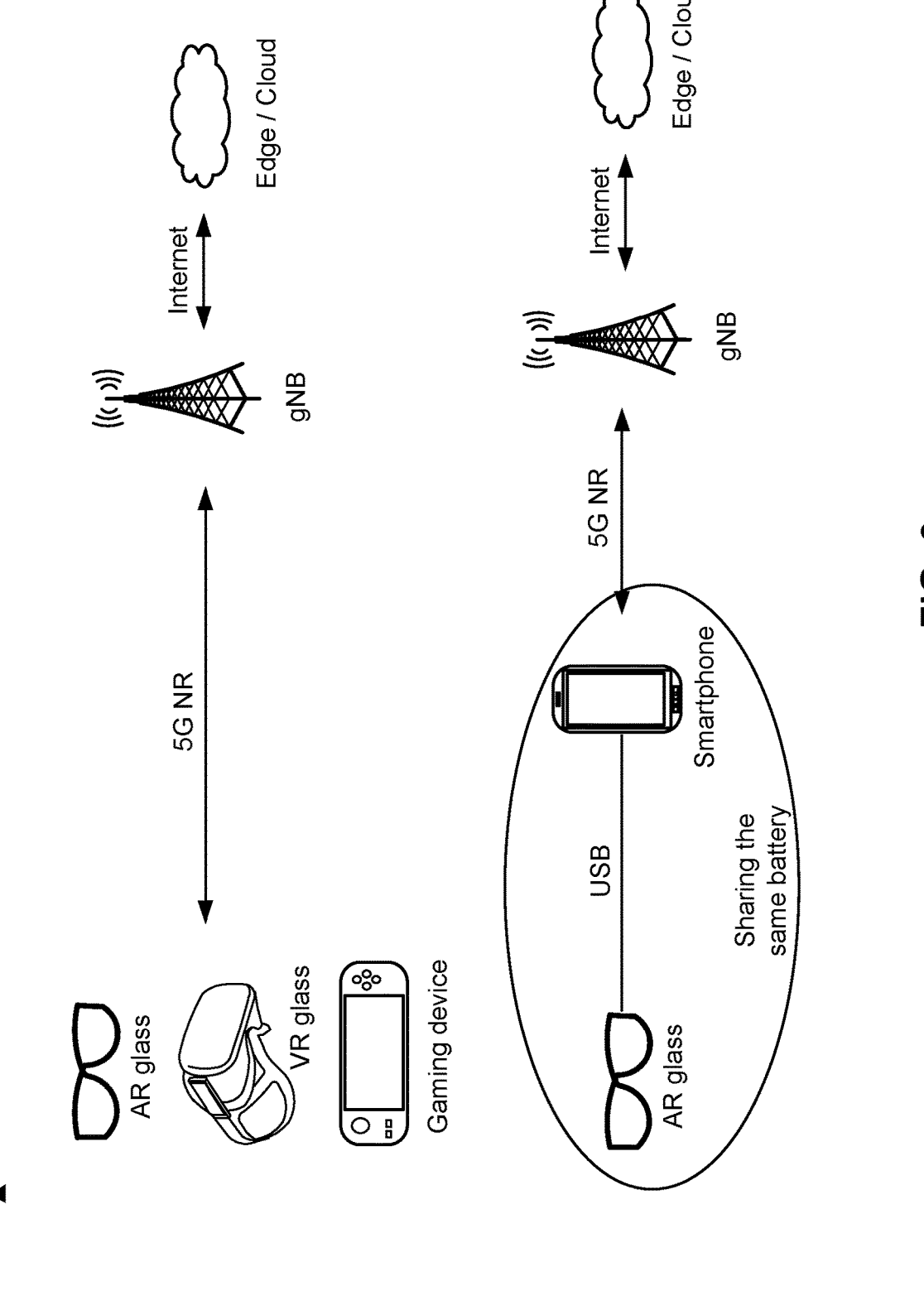
FIG. 3 is a diagram illustrating an example of devices designed for low latency applications, in accordance with the present disclosure.

FIG. 3 is a diagram illustrating an example 300 of devices designed for low latency applications, in accordance with the present disclosure.

Some devices, including devices for XR, may require low-latency traffic to and from an edge server or a cloud environment. Example 300 shows communications between an XR device and the edge server or the cloud environment, via a base station (e.g., gNB). The XR device may be an augmented reality (AR) glass device, a virtual reality (VR) glass device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

As indicated above, FIG. 3 is provided as an example. Other examples may differ from what is described with regard to FIG. 3.

Figure 4:
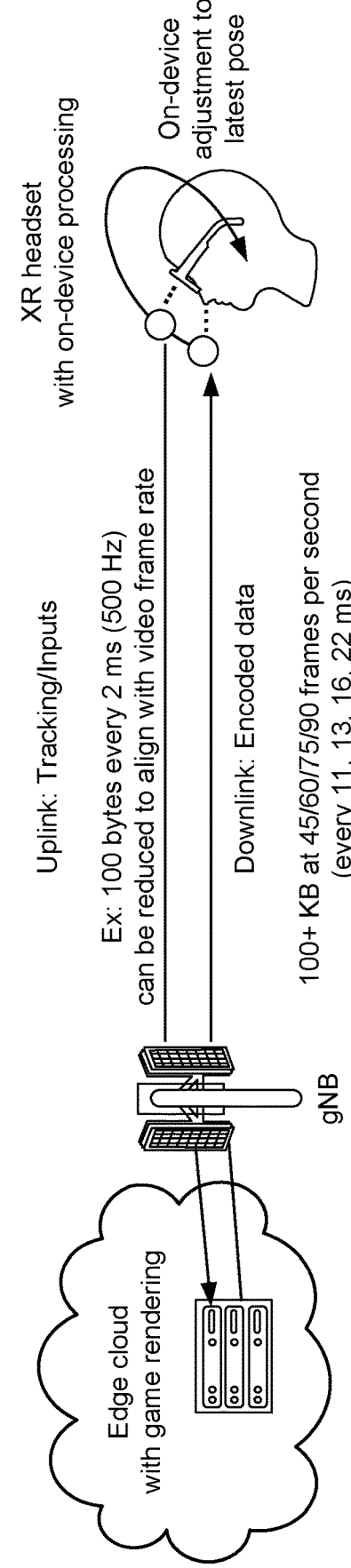
FIG. 4 is a diagram illustrating an example of low-latency traffic and power states, in accordance with the present disclosure.

FIG. 4 is a diagram illustrating an example 400 of low-latency traffic and power states, in accordance with the present disclosure.

Power dissipation may be reduced by limiting an amount of time that processing resources of the XR device are active for computations and power consumption. Some wireless communications systems may a support a UE, such as the XR device, that operates in a DRX mode. A UE in a DRX mode may transition between sleeping and waking up. Sleeping may include entering or being in a DRX inactive state (e.g., sleep state, power saving mode) for power conservation. Waking up may include entering a DRX active state (e.g., active time) from a DRX inactive state for data transmission and reception. The active state for data transmission and reception may be referred to as a DRX "ON-duration." A DRX cycle may be a time duration that includes a sleep state and an active ON-duration state for a UE. The DRX cycle may start at the beginning of an ON-duration and end at the beginning of the next ON-duration. Different DRX cycles may have different lengths (e.g., 8 milliseconds (ms), 16 ms). A UE that uses different DRX cycles may have non-uniform cycle durations within a DRX time period, which is a larger time duration that includes multiple DRX cycles. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information (DCI) or a MAC CE).

By offloading some computations to an edge server, an XR device may save processing resources. Example 400 shows a scenario where an XR device may split computations for an application with the edge server on the other side of a base station. The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources. XR downlink traffic (e.g., video frames) may have a periodic pattern that corresponds to a frame rate of transmitted video data (e.g., H.264/H.265 encoded video). Such downlink traffic may be quasi-periodic with a data burst every frame at one frame-per-second (1/fps), or two possibly staggered "eye-buffers" per frame at $1/(2*fps)$. For example, XR downlink traffic may include 100+ kilobytes (KB) of data for 45, 60, 75, or 90 frames per second (e.g., every 11 ms, 13 ms, 16 ms, or 22 ms). XR uplink traffic may include controller information for gaming, information for VR split rendering, and/or the user pose information. The XR uplink traffic may include 100 bytes every 2 ms (500 Hz). The XR device may reduce this periodicity to align the XR uplink traffic with the XR downlink traffic.

For low-latency applications, the DRX cycle and a start offset of a DRX cycle are to be time-aligned to downlink traffic arrivals. For example, the XR device may serve the user and enter a brief sleep state in a DRX cycle and do so between video frames. The XR device and the edge server may attempt to align the uplink and downlink DRX cycles as part of connected DRX (CDRX). However, there are DRX-multimedia timing mismatches that prevent such alignment and that prevent successful use of CDRX. For example, an update rate may be, for example, 120 Hz or 60 Hz, thus resulting in a downlink traffic burst arrival periodicity of 8.333 ms or 16.667 ms, respectively. However, conventional DRX configuration may have one millisecond as the finest granularity for a DRX cycle, and the start of the ON-duration may be aligned to millisecond time boundaries. These partial millisecond differences may compound with each instance of a period to misalign the DRX cycle and the XR traffic periodicity. For example, the XR traffic period may drift to a middle of the DRX cycle. This causes an increase in latency and power consumption.

As indicated above, FIG. 4 is provided as an example. Other examples may differ from what is described with regard to FIG. 4.

Figure 5:
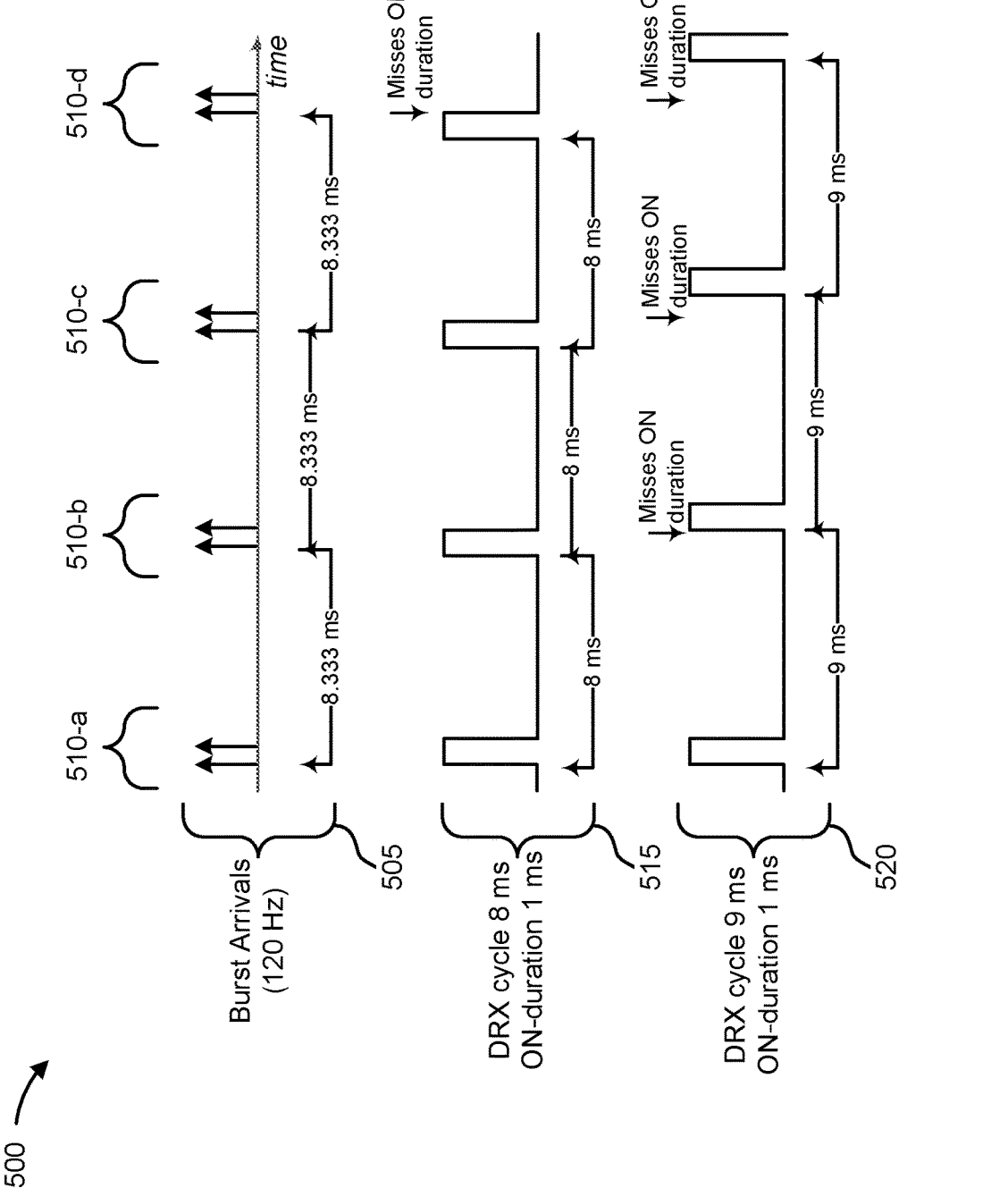
FIG. 5 illustrates an example of a misalignment of a discontinuous reception (DRX) cycle and extended reality traffic periodicity, in accordance with the present disclosure.

FIG. 5 illustrates an example 500 of a misalignment of a DRX cycle and XR traffic periodicity, in accordance with the present disclosure. Example 500 shows downlink traffic burst arrivals 505 that may include a number of downlink traffic bursts 510 that are transmitted according to a periodic pattern. Example 500 also shows a first conventional DRX configuration 515 and a second conventional DRX configuration 520.

The downlink traffic bursts 510 may include, for example, XR downlink traffic with a periodic pattern that corresponds to a frame rate of transmitted data (e.g., H.264/H.265 encoded video). An update rate may be, for example, 120 Hz or 60 Hz, thus resulting in a downlink traffic burst arrival periodicity of 8.333 ms or 16.667 ms, respectively. However, the first conventional DRX configuration 515 and the second conventional DRX configuration 520 may have one millisecond as the finest granularity for a DRX cycle, and the start of the ON-duration may be aligned to millisecond time boundaries.

In the example of FIG. 5, a 120 Hz update rate is illustrated for burst arrivals 505, thus resulting in an 8.333 ms periodicity for the downlink traffic bursts 510. In the event that the first conventional DRX configuration 515 is selected and an initial DRX cycle has an ON-duration that is aligned with the first downlink traffic burst 510-a, the second downlink traffic burst 510-b and the third downlink traffic burst 510-a will each also be within the subsequent two ON-durations. However, the fourth downlink burst 510-d would miss the fourth ON-duration, as it would occur 0.333 seconds after the end of the fourth ON-duration. If the second conventional DRX configuration 520 were to be selected instead, the result would be that the first downlink traffic burst 510-*a* would be aligned with an ON-duration, but subsequent downlink traffic bursts 510-*b*, 510-*c*, and 510-*d* would each miss the ON-duration.

Further, if the DRX configuration were to be modified to have a finest granularity corresponding to a slot or symbol, such misalignments may continue to occur due to the burst arrivals 505 having a periodicity that is not a multiple of a slot or symbol duration. For example, as the traffic burst interval (120 Hz or 60 Hz) expressed in milliseconds has a factor of 3 in the denominator, which cannot divide into the numerator (i.e., $1000/120=X/3$, where X is an integer such as 25 for a 120 Hz update rate or 50 for 60 Hz update rate). More generally, if DRX cycle granularity can be defined in slots, the expression would be the number of slots in a second divided by the source update rate in Hz. Misalignments between the downlink traffic bursts 510 and ON-durations may add additional latency to communications, where the additional latency is cyclic. For example, in a first missed ON-duration of an 8 ms DRX configuration, the downlink traffic burst may be retransmitted at a next ON-duration, which occurs 7 ms later than the missed ON-duration. Subsequent downlink traffic bursts will have a lower latency, which reduces by 0.333 ms each cycle, until the downlink traffic bursts are again aligned with ON-durations in 21 cycles, with such alignment lasting for three cycles. Thus, the alignment and misalignment of downlink traffic bursts in such an example would be cyclic with a period of 24 cycles, and an average latency of about 3 ms. In some cases, to reduce the latency, the DRX cycle duration may be reduced, which also has a corresponding increase in power consumption due to the extra ON-durations. As a result, the XR device may consume additional processing resources.

As indicated above, FIG. 5 is provided as an example. Other examples may differ from what is described with regard to FIG. 5.

Figure 6:
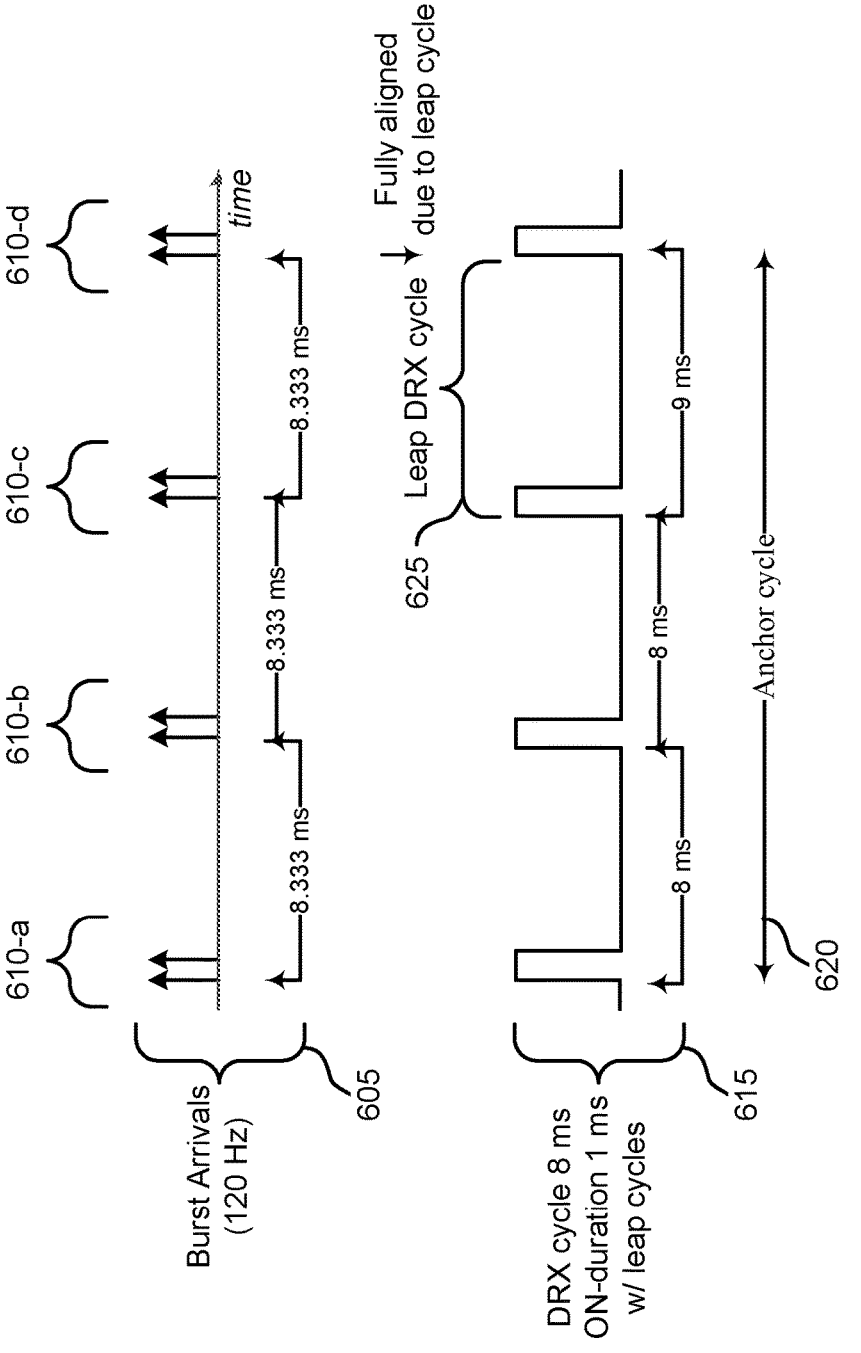
FIG. 6 illustrates an example of an anchor cycle with a leap DRX cycle, in accordance with the present disclosure.

FIG. 6 illustrates an example 600 of an anchor cycle with a leap DRX cycle, in accordance with the present disclosure.

In some scenarios, a UE (e.g., XR device) and the network may use an anchor cycle with a leap DRX cycle to better align the DRX cycle to reduce latency and conserve energy consumption. For example, the UE and the network may implement an anchor cycle with a leap DRX cycle. An anchor cycle may include a cycle that includes multiple DRX cycles, one of which is a DRX leap cycle. A DRX leap cycle may occur every specified quantity of DRC cycles. The DRX leap cycle may be a DRX cycle that adjusts a timing of its ON-duration (e.g., by using an additional DRX offset that aligns the ON-duration with multimedia periodicity). Downlink traffic burst arrivals 605 may include a number of downlink traffic bursts 610 that are transmitted according to a periodic pattern. The downlink traffic bursts 610 may include, for example, XR downlink traffic that has a periodic pattern with a downlink traffic bursts 610 every 8.333 ms, for example. An anchor cycle 620 may, for example, span three DRX cycles 615, and the third DRX cycle may be a leap cycle 625 that has a longer cycle duration than the initial two DRX cycles. In some cases, the anchor cycle 620, which may be an example of a DRX time period, may span more or fewer DRX cycles, and may include one or more leap cycles 625. The anchor cycle 620 may be used as a basis for determining timing for radio resource management (RRM) functions. In some cases, the leap cycle 625 may include one or more additional slots than other DRX cycles of the anchor cycle 620. The position of the leap cycle(s) 625 can be varied within the anchor cycle 620. While example 600 shows burst arrivals 605 associated with periodic traffic having a 120 Hz update rate and the anchor cycle 620 includes three DRX cycles with durations of 8 ms, 8 ms, and 9 ms, other configurations may be used for different periodicities or patterns of downlink traffic. For example, for periodic traffic with a 60 Hz update rate, an anchor cycle with three DRX cycles of 16 ms, 17 ms, 17 ms may be configured, or the three DRX cycles may have durations of 16 ms, 16 ms, 18 ms, respectively. The order of the leap cycle(s) 625 among the DRX cycles within the anchor cycle 620 may also be configured. For example, for 120 Hz update rate, DRX cycles with duration of (8 ms, 8 ms, 9 ms), (8 ms, 9 ms, 8 ms), or (9 ms, 8 ms, 8 ms) can be configured. Support for such varied options in the ordering may help with offsetting multiple users in time for their respective ON-durations, in order to better distribute utilization of resources over time.

In some cases, a base station may configure a UE with a DRX configuration via radio resource control (RRC) signaling. For example, a base station may identify that periodic traffic is being transmitted to the UE (e.g., based on XR application traffic having a certain update rate, or based on historical downlink burst transmissions to the UE), and that the periodic traffic does not align with slot or subframe boundaries. The base station may determine the anchor cycle duration (e.g., based on a number of periods of the downlink traffic bursts 610 that correspond to millisecond time boundaries, such as three 8.333 ms periods that provide a 25 ms anchor cycle duration), a number of DRX cycles within the anchor cycle 620, and which of the DRX cycles are to have different cycle durations. In some cases, the RRC signaling may indicate the anchor cycle duration in milliseconds, the number of DRX cycles in the anchor cycle, and the cycle duration of each DRX cycle (e.g., 8, 8, 9). In some cases, the UE may signal to the base station that the UE has a capability to perform DRX procedures with non-uniform DRX cycles, and the base station may enable the capability when providing the DRX configuration. In other cases, non-uniform DRX cycles may be configured using other techniques, such as by adjusting a starting offset of an ON-duration of a DRX cycle, as discussed in connection with FIG. 7.

As indicated above, FIG. 6 is provided as an example. Other examples may differ from what is described with regard to FIG. 6.

Figure 7:
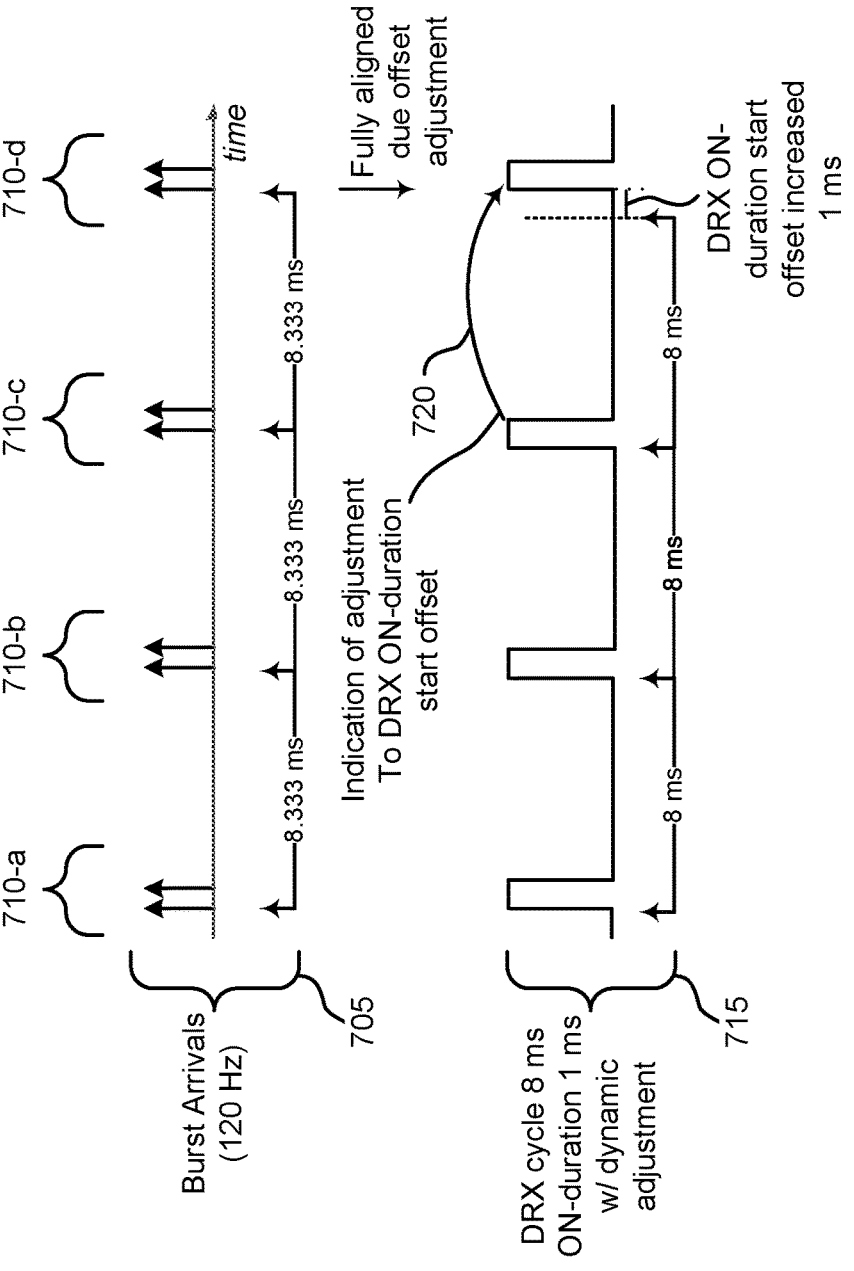
FIG. 7 illustrates an example of a DRX configuration with dynamic offset adjustment that supports DRX techniques with non-uniform cycle durations, in accordance with the present disclosure.

FIG. 7 illustrates an example 700 of a DRX configuration with dynamic offset adjustment that supports DRX techniques with non-uniform cycle durations, in accordance with the present disclosure. Example 700 shows downlink traffic burst arrivals 705 that include a number of downlink traffic bursts 710 that are transmitted according to a periodic pattern. Example 700 also shows a DRX configuration 715 with non-uniform cycle durations.

The downlink traffic bursts 710 may include, for example, XR downlink traffic that has a periodic pattern with a downlink traffic bursts 710 every 8.333 ms. In example 700, DRX configuration 715 has a configuration with an 8 ms DRX cycle duration and a 1 ms ON-duration. In the initial DRX cycles of the downlink traffic bursts 710, the ON-duration may have a zero millisecond offset, such that the first downlink traffic burst 710-*a*, the second downlink traffic burst 710-*b*, and the third downlink traffic burst 710-*c* are aligned with ON-durations. A UE may make an adjustment 720 to the DRX ON-duration start offset following the third downlink burst 710-*c*, which may increase the ON-duration start offset by one millisecond in this example, such that the adjusted DRX ON-duration is aligned with the fourth downlink traffic burst 710-d. The UE may make another adjustment to the ON-duration offset back to the original offset following the fourth downlink traffic burst 710-d, and thus the DRX cycles may be configured to align ON-durations with downlink traffic bursts 710.

In some cases, the DRX ON-duration start offset adjustment can be predefined based on a specification, or defined in the DRX configuration (e.g., that is provided in RRC signaling). For example, different types of traffic (e.g., XR traffic) and different periodicities (e.g., based on a 120 Hz or 60 Hz update rate) DRX starting offsets may be defined according to a pattern such as in example 700 (e.g., every 4th DRX cycle has a 1 ms starting offset added). In some cases, the DRX starting offset may be dynamically indicated (e.g. based on MAC CE or DCI) in a prior downlink transmission.

As indicated above, FIG. 7 is provided as an example. Other examples may differ from what is described with regard to FIG. 7.

Figure 8:
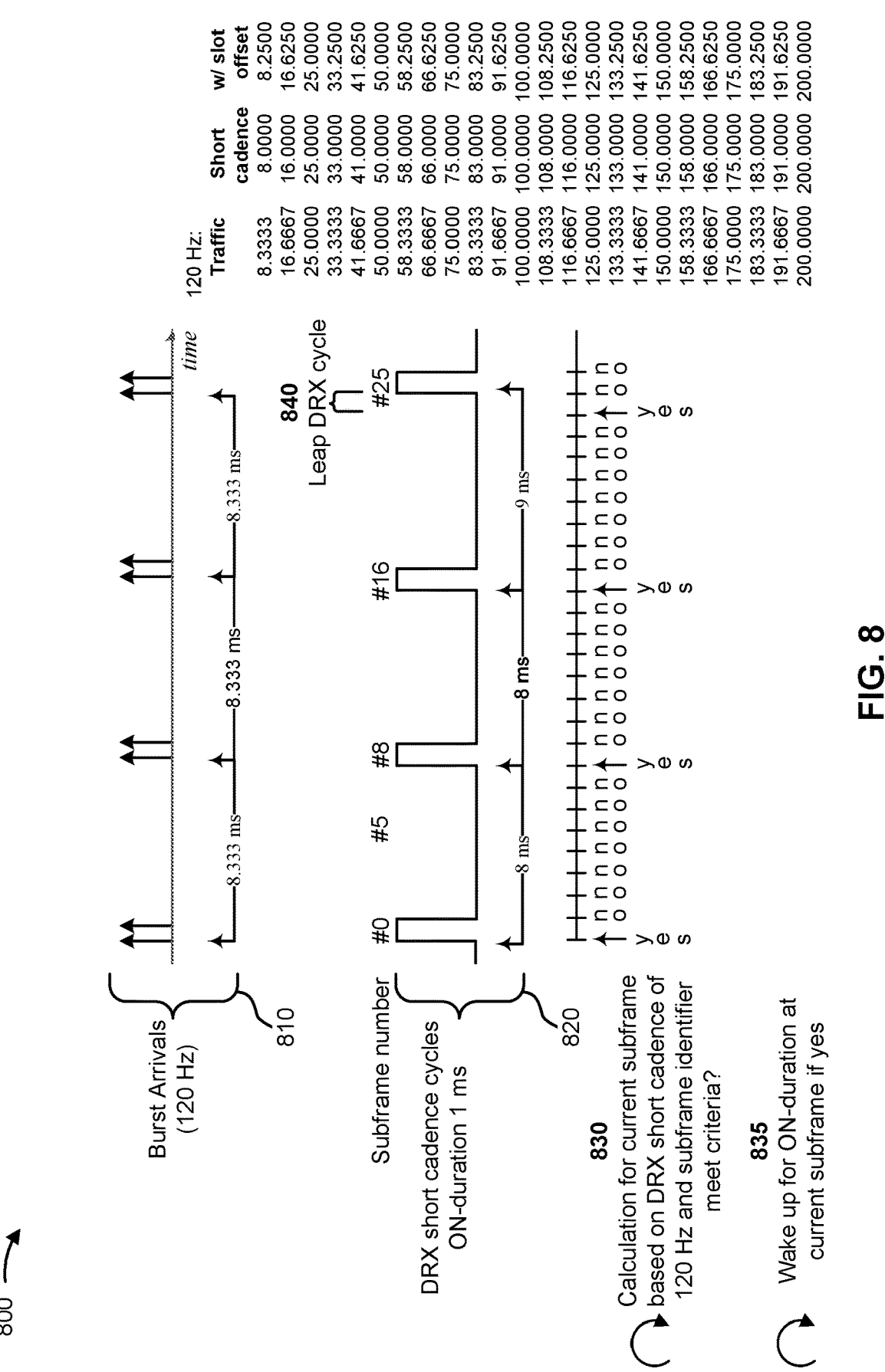
FIG. 8 is a diagram illustrating an example of using a short cadence value for DRX, in accordance with the present disclosure.

FIG. 8 is a diagram illustrating an example 800 of using a short cadence value for DRX, in accordance with the present disclosure. Example 800 shows traffic burst arrivals 810 that are arriving at a rate of 120 Hz.

The techniques described in connection with FIGS. 3-7 may improve alignment of DRX cycles and XR traffic to reduce mismatches between burst traffic and DRX ON-duration times. However, according to various aspects described herein, a UE (e.g., an XR device) and the network may further improve such alignment by using a DRX short cadence that corresponds to a number of Hz (e.g., instances per second) rather than an integer ms value. The DRX short cadence value may correspond to a number of Hz, for example, by being defined by a number of Hz or by being defined by a value that is based on or derived from a number of Hz or a similar or related unit. The DRX short cadence (drx-ShortCadence) may be, for example, 45 Hz, 60 Hz, 90 Hz, or 120 Hz, so as to align ON-duration times of the UE with traffic bursts that are received by the UE according to a video frame rate. That is, the DRX short cadence value may be a DRX timing value that corresponds to a same time unit or frequency unit by which traffic bursts are received by the UE (e.g., video frame rate). This is in contrast to a regular DRX cycle with a DRX long cycle that is a length (time duration) of a DRX cycle and that has a unit granularity of milliseconds. Once the base station (e.g., gNB) obtains the frame rate of traffic bursts to the UE, or the periodicity of the traffic bursts to the UE, the base station may set the DRX short cadence value. The UE may receive the DRX short cadence value from the base station or obtain the DRX short cadence value based at least in part on the frame rate or the periodicity of the traffic.

The UE may use the DRX short cadence value to determine when to wake up for an ON-duration and decode physical downlink control channel (PDCCH) grants from the base station, as part of DRX short cadence cycles 820. The UE may determine when to wake up subframe by subframe, or slot by slot. For example, as shown by reference number 830, the UE may calculate, in the first part of a current subframe (having a subframe identifier n), whether specific criteria are satisfied for the current subframe. The criteria may be associated with the DRX short cadence value and subframe identifiers and may be designed such that subframes (or slots) that satisfy the condition align with a timing of the frame rate or the periodicity of the traffic bursts received by the UE. Each subframe may be 1 ms and include multiple slots (e.g., 2, 6, 8). The criteria may be associated with a system frame number (SFN). For a subframe with subframe identifier n=[(SFN*10)+subframe number], the UE may wake up if a first ceiling value (smallest integer higher than calculated value) of (n*drx-ShortCadence/1000)+1 is equal to a second ceiling value of ((n+1)*(drx-ShortCadence/1000)). The SFN may be a number between 0 and 1023 of a frame, and the subframe number may be a number between 0 and 9 within the frame. For example, if the DRX cadence value is 120 Hz and the subframe has a subframe number of 5 in a frame with a SFN of 800, a subframe identifier n for the subframe may be (800*10)+5, or 8005. A first ceiling value may be a smallest integer of (8005*120/1000)+1, or 961. A second ceiling value may be a smallest integer of (8005+1)*(120/1000), or 960. The first ceiling value and the second ceiling value are not equal, and thus the UE does not satisfy the criteria and wake up for this subframe. However, a later subframe with a subframe number of 8, may render a first ceiling value of 961 (smallest integer of (8008*120/1000)+1) and a second ceiling value of 961 (smallest integer of (8008+1)*(120/1000)), and thus the UE may satisfy the criteria and wake up during that subframe. The calculation may be performed at the start of each subframe. In some aspects, multiple calculations for multiple subframes may be made at one time.

In other words, the UE may satisfy some type of criteria that is associated with the DRX short cadence (corresponding to Hz) and a subframe identifier of the subframe that uniquely identifies the subframe among consecutive subframes within a cycle or time period. The criteria, or whatever is calculated for a given subframe, may be designed to use the DRX short cadence to wake up for subframes according to a frame rate or a periodicity of the traffic bursts received by the UE.

As shown by reference number 835, the UE may wake up for an ON-duration at the current subframe. When the UE wakes up, the UE may start a DRX ON-duration timer (drx-onDurationTimer). The DRX ON-duration timer may be a minimum time duration that the UE is to be awake and may be, for example, 1 ms or 2 ms. For example, if the UE wakes up at subframe 8, and the DRX ON-duration timer is 2 ms, the UE may stay awake through subframes 8 and 9. If there is no more traffic, the UE may go back to sleep. In example 800, the DRX ON-duration timer is 1 ms. The DRX ON-duration timer may be started for a DRX group.

In some aspects, there may be a leap of 1 subframe every specified number of cycles, similar to the leap-cycle technique described in connection with FIG. 6. For example, for a cycle of 8 ms, there may be a leap of 1 subframe (1 ms) every 3 cycles to accommodate the ⅓ subframe part when the duty cycle is 8.333 ms for 120 Hz. That is, for a DRX short cadence of 120 Hz, the UE may determine to wake up for subframe n=8, 16, 25, 33, 41, 50, and so forth. As shown by reference number 840, after waking up at subframes 8 and 16, instead of subframe 24, the UE may leap 1 subframe to wake up at subframe 25. If example 800 were to continue to show ON-duration subframes, the UE may then wake up 8 ms later at subframe 33, and another 8 ms later at subframe 41. Instead of waking up 8 ms later at subframe 49, the UE may leap 1 subframe and wake up at subframe 50. In some aspects, the UE may skip calculations for one or more subframes after an ON-duration until the next possible ON-duration approaches.

In some aspects, the UE may use a DRX start offset and/or a DRX slot offset to provide for more granularity as to when to wake up within a subframe, in order to more closely align with the traffic periodicity of the UE. The UE may wake up and start a DRX ON-duration timer after a DRX start offset (drx-StartOffset) from a beginning of the subframe (n+drx-StartOffset) and/or a DRX slot offset (drx-SlotOffset). The DRX start offset may be a number of ms or microseconds (p) (or set to zero ms or μs for no DRX start offset), symbols, or mini-slots. The DRX start offset may be used to stagger multiple UEs in time. The DRX slot offset may be a number of slots. For example, if there are 8 slots in a subframe (such as for mmWave), each slot is 125 μs or 0.125 ms. If the DRX slot offset is 2 slots, the wake up time is shifted (2*0.125) or 0.250 ms. If wake up times, according to 120 Hz, were 8 ms, 16 ms, 25 ms, 33 ms, 41 ms, 50 ms, and so forth, the UE may use the DRX slot offset to better match the traffic bursts at 8.33 ms, 16.66 ms, and 25 ms by using a DRX slot offset of 2 slots at subframe 8 for 8.250 ms, a DRX slot offset of 5 slots at subframe 16 for 16.625 ms, no DRX slot offset at subframe for 25.000 ms, and so forth, such as shown by the table for 120 Hz in FIG. 8. As a result, the UE may better align the DRX cycle and the traffic period to further reduce latency and conserve signaling resources.

As indicated above, FIG. 8 is provided as an example. Other examples may differ from what is described with regard to FIG. 8.

Figure 9:
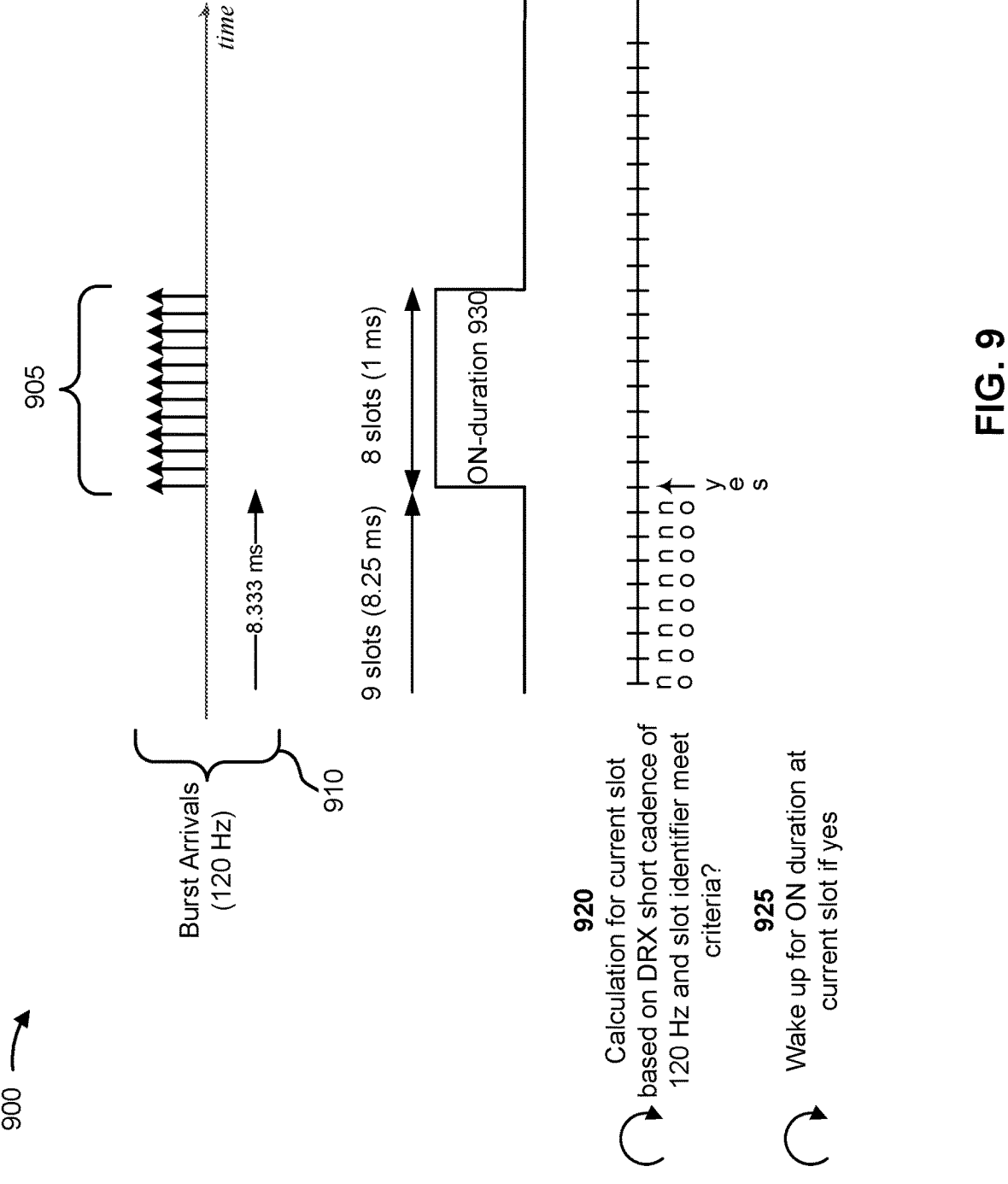
FIG. 9 is a diagram illustrating an example of using a short cadence value for DRX for slot positions, in accordance with the present disclosure.

FIG. 9 is a diagram illustrating an example 900 of using a short cadence value for DRX for slot positions, in accordance with the present disclosure. Example 900 shows a traffic burst 905 among multiple burst arrivals 910 that arrive at a rate of 120 Hz. The burst arrivals 910 in example 900 may be the same as the burst arrivals 810 shown in example 800 of FIG. 8, except that the timeline in example 900 is magnified in order to show multiple slots for a subframe.

In some aspects, the calculations per subframe that are based on a subframe identifier may be extended to slot positions, with a slot identifier k. That is, the criteria for waking up may be based at least in part on slot identifier k being equal to (((SFN*+subframe number)*slots per second)+a slot number. The UE may wake up and start a DRX ON-duration timer at slot k if a first ceiling value of (k*drx-ShortCadence/1000*slots per second)+1 is equal to a second ceiling value of ((k+1)*(drx-ShortCadence/1000*slots per second)). The calculations may be per slot rather than per subframe. As shown by reference number 920, the UE may determine if a calculation for a current slot, based at least in part on the DRX short cadence and the slot identifier, satisfies the criteria for waking up. As shown by reference number 925, if the UE is to wake up, the UE may wake up for the ON-duration 930, which may be a subframe or 8 slots. In some aspects, the calculation may be performed all at once at a beginning of a subframe. In other words, the UE may satisfy some criteria that is associated with the DRX short cadence value (corresponding to Hz) and a slot identifier of the slot that uniquely identifies the slot among consecutive slots within a cycle or time period. The criteria, or whatever is calculated for a given slot, may be designed to use the DRX short cadence value to wake up for slots according to a frame rate or a periodicity of the traffic bursts to the UE. In some aspects, the UE may skip calculations for one or more slots or subframes after the ON-duration.

In some aspects, the UE may wake up and start a DRX ON-duration timer after a DRX start slot offset (drx-Start-SlotOffset) from a beginning of the subframe (n+drx-Start-Offset). The DRX start slot offset may be a number of ms, microseconds (p) (or set to zero ms or μs for no DRX start offset), symbols, slots, or mini-slots. The DRX start slot offset may be used to stagger the UE and the other UEs in time. The DRX start slot offset may be updated based at least in part on how many UEs are transmitting, how long the UEs are staying, and if there are changes to UE behavior.

As indicated above, FIG. 9 is provided as an example. Other examples may differ from what is described with regard to FIG. 9.

Figure 10:
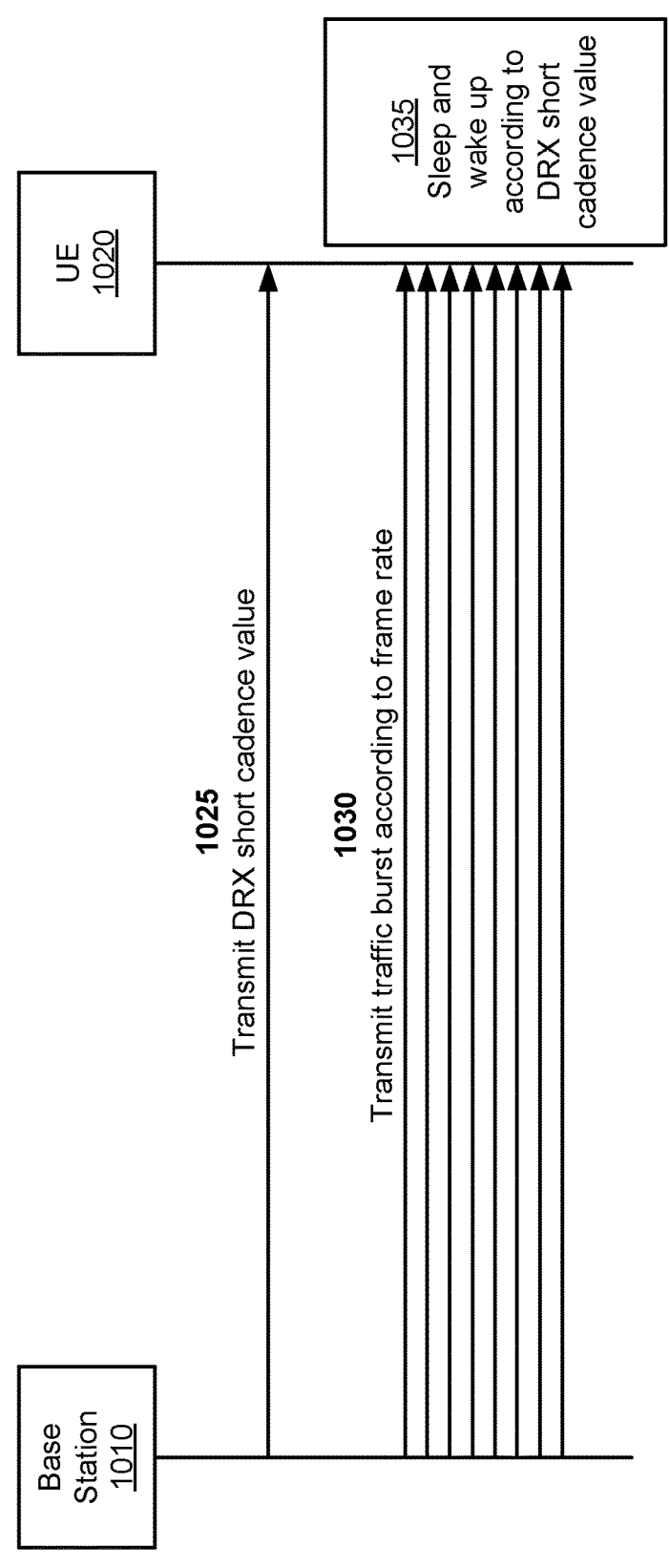
FIG. 10 is a diagram illustrating an example of using a short cadence value for DRX, in accordance with the present disclosure.

FIG. 10 is a diagram illustrating an example 1000 of using a short cadence value for DRX, in accordance with the present disclosure. As shown in FIG. 10, a base station 1010 (e.g., base station 110) may communicate with a UE 1020 (e.g., UE 120). The base station 1010 and the UE 1020 may be part of a wireless network (e.g., wireless network 100).

The UE 1020 may obtain a DRX short cadence value, which may be defined as a number of Hz. As shown by reference number 1025, the base station 1010 may transmit the DRX short cadence value to the UE 120. The UE 1020 may also obtain the DRX short cadence value from stored configuration information. For example, the UE 1020 may select a DRX short cadence value from among multiple DRX short cadence values based at least in part on a determined periodicity of traffic bursts (e.g., video frame rate) transmitted by the base station 1010, as shown by reference number 1030.

As shown by reference number 1035, the UE 1020 may sleep and wake up according to the DRX short cadence value. For example, the UE 1020 may calculate, for each subframe, whether a subframe identifier causes the UE 1020 meet the criteria for waking up, based at least in part on the DRX short cadence value. The DRX short cadence value (drx-ShortCadence) may be, for example, 120 Hz, and subframe identifier n=[(SFN*10)+subframe number]. If the subframe identifier n=7, ceil(n*drx-ShortCadence/1000)+1=2 and ceil((n+1)*drx-ShortCadence/1000)=1. As 2 does not equal 1, the criteria are not satisfied (condition is false). If the subframe identifier n=8, ceil(n*drx-ShortCadence/1000)+1=2 and ceil((n+1)*drx-ShortCadence/1000)=2. As 2 equals 2, the criteria are satisfied (condition is true). If the subframe identifier n=9, ceil(n*drx-ShortCadence/1000)+1=3 and ceil((n+1)*drx-ShortCadence/1000)=2. As 3 does not equal 2, the criteria are not satisfied (condition is false). In some aspects, the UE 1020 may use a leap cycle, a slot offset, a timing offset, or any other technique described herein to better match the periodicity of the traffic bursts. The UE 1020 may start an ON-duration timer as part of waking up.

In some aspects, the UE 1020 may perform the calculation for each slot, to determine whether a slot identifier causes the UE 1020 meet the criteria for waking up, based at least in part on the DRX short cadence value. The DRX short cadence value (drx-ShortCadence) may be, for example, 120 Hz, and slot identifier k=[((SFN*10+subframe number)*slots per second)+slot number]. The slots per second (slotPerSec) for 120 Hz may be 8 slots per second. If the slot identifier k=8*8+1, ceil(k*drx-ShortCadence/(1000*slotPerSec))+1=2 and ceil((k+1)*drx-ShortCadence/(1000*slotPerSec))=1. As 2 does not equal 1, the criteria are not satisfied (condition is false). If the slot identifier k=8*8+2, ceil(k*drx-ShortCadence/(1000*slotPerSec))+1=2 and ceil((k+1)*drx-ShortCadence/(1000*slotPerSec))=2. As 2 equals 2, the criteria are satisfied (condition is true). If the slot identifier k=8*8+3, ceil(k*drx-ShortCadence/(1000*slotPerSec))+1=3 and ceil((k+1)*drx-ShortCadence/(1000*slotPerSec))=2. As 3 does not equal 2, the criteria are not satisfied (condition is false). In some aspects, the UE 1020 may use a leap cycle, a slot offset, a timing offset, or any other technique described herein to better match the periodicity of the traffic bursts.

As indicated above, FIG. 10 is provided as an example. Other examples may differ from what is described with regard to FIG. 10

FIG. 11 is a diagram illustrating an example 1100 of using different short cadence values, in accordance with the present disclosure. FIG. 11 shows tables for different DRX short cadence values, including for 48 Hz, 60 Hz, 80 Hz, and 90 Hz to match corresponding frame rates of 48 Hz, 60 Hz, 80 Hz, and 90 Hz. Similar to the table for 120 Hz in FIG. 8, the first column in each table of FIG. 11 indicates the periodicity of traffic bursts (ms between traffic bursts—corresponding to a frame rate/short cadence value). The second column in each table indicates the wake up time (in ms) when the criteria is satisfied for the short cadence value, so as to match the periodicity in the first column. The third column indicates (in ms) the wake up time when using a slot offset (e.g., increments of 0.125 ms) in order to more closely match the periodicity indicated in the first column.

In other words, the UE may calculate, based at least in part on a subframe identifier for a subframe (or a slot identifier for a slot) and a DRX short cadence value of 48 Hz, 60 Hz, 80 Hz, 90 Hz, or 120 Hz, whether the subframe (or the slot) satisfies a criteria for waking up. The criteria may be designed such that the UE wakes up starting at a subframe and/or a slot that is a closest match or alignment for a traffic burst according to the periodicity of the traffic bursts. The UE may use a slot offset to closely match periodicity. In this way, the UE more closely matches wake up times with traffic bursts so as to conserve power and processing resources while not missing any traffic bursts during an ON-duration time. The UE may adjust the ON-duration time as necessary in coordination with the short cadence value and/or the slot offset value. Note that other DRX short cadence values may be used to match frame rates of 45 Hz, Hz, or other frame rates used for applications or services that are not explicitly listed herein.

As indicated above, FIG. 11 is provided as an example. Other examples may differ from what is described with regard to FIG. 11.

FIG. 12 is a diagram illustrating an example 1200 of using a short cadence value for DRX, in accordance with the present disclosure. Example 1200 shows traffic burst arrivals that are arriving at a rate of 120 Hz.

There are additional solutions for better matching of a multimedia cadence as part of an enhanced connected mode DRX (EC-DRX or eCDRX). In one scenario, a base station may detect that an offset between ON-duration occasions needs to be changed, in order to better match the arrival time of the next data burst. In some aspects, the base station may transmit a MAC CE to a UE in order to signal a change of an offset between ON-duration occasions. For example, the MAC CE may indicate that the next offset is to be increased by 1 ms, or to shift from 8 ms to 9 ms. The MAC CE may indicate an offset value from a list of absolute values or a quantity of slots to shift an offset (from a relative value list).

As indicated above, FIG. 12 is provided as an example. Other examples may differ from what is described with regard to FIG. 12.

FIG. 13 is a diagram illustrating an example 1300 of using a short cadence value for DRX, in accordance with the present disclosure. Example 1300 shows traffic burst arrivals that are arriving at a rate of 120 Hz.

DRX may involve a DRX short cycle. If the DRX short cycle is used for a DRX group, where [(SFN×10)+subframe number] modulo (drx-ShortCycle)=(drx-StartOffset) modulo (drx-ShortCycle), the UE may start drx-onDuration-Timer for this DRX group after drx-SlotOffset from the beginning of the subframe. [(SFN×10)+subframe number] may define the subframe index for a DRX cycle. The parameter drx-ShortCycle may define the subframe periodicity of an ON-duration cycle, and the parameter drx-StartOffset may define the subframe offset of an ON-duration cycle.

DRX may involve a DRX long cycle. If the DRX long cycle is used for a DRX group, where [(SFN×10)+subframe number] modulo (drx-LongCycle)=drx-StartOffset, the UE may start drx-onDurationTimer for this DRX group after drx-SlotOffset from the beginning of the subframe.

In some aspects, a two-level DRX configuration may define an outer DRX cycle and an inner DRX cycle to structure a leap DRX cycle. The outer DRX may be the same as legacy DRX, which supports only uniform DRX. The inner DRX may support sub-cycles that can be non-uniform. The start of the first inner DRX cycle may be aligned to the start of the outer DRX, and the end of the last inner DRX cycle may be aligned to the end of the outer DRX. The ON-duration, an inactivity timer, and other DRX parameters for configuration for the inner DRX cycles can be the same as that of the outer DRX cycle. If the outer DRX cycle is configured to be 25 ms as an "anchor-cycle" that depends on the DRX subframe index of [(SFN×10)+subframe number], the inner DRX cycles may be configured to be (8, 8, 9) ms for a set of sub-cycles for ON-duration.

In some aspects, the start of the ON-duration may be defined with respect to the short DRX cycle and the long DRX cycle. The short DRX cycle may be defined as [(SFN×10)+subframe number] modulo (drx-ShortCycle)=(drx-StartOffset) modulo (drx-ShortCycle). The long DRX cycle may be defined as [(SFN×10)+subframe number] modulo (drx-LongCycle)=drx-StartOffset.

As indicated above, FIG. 13 is provided as an example. Other examples may differ from what is described with regard to FIG. 13.

Figure 14:
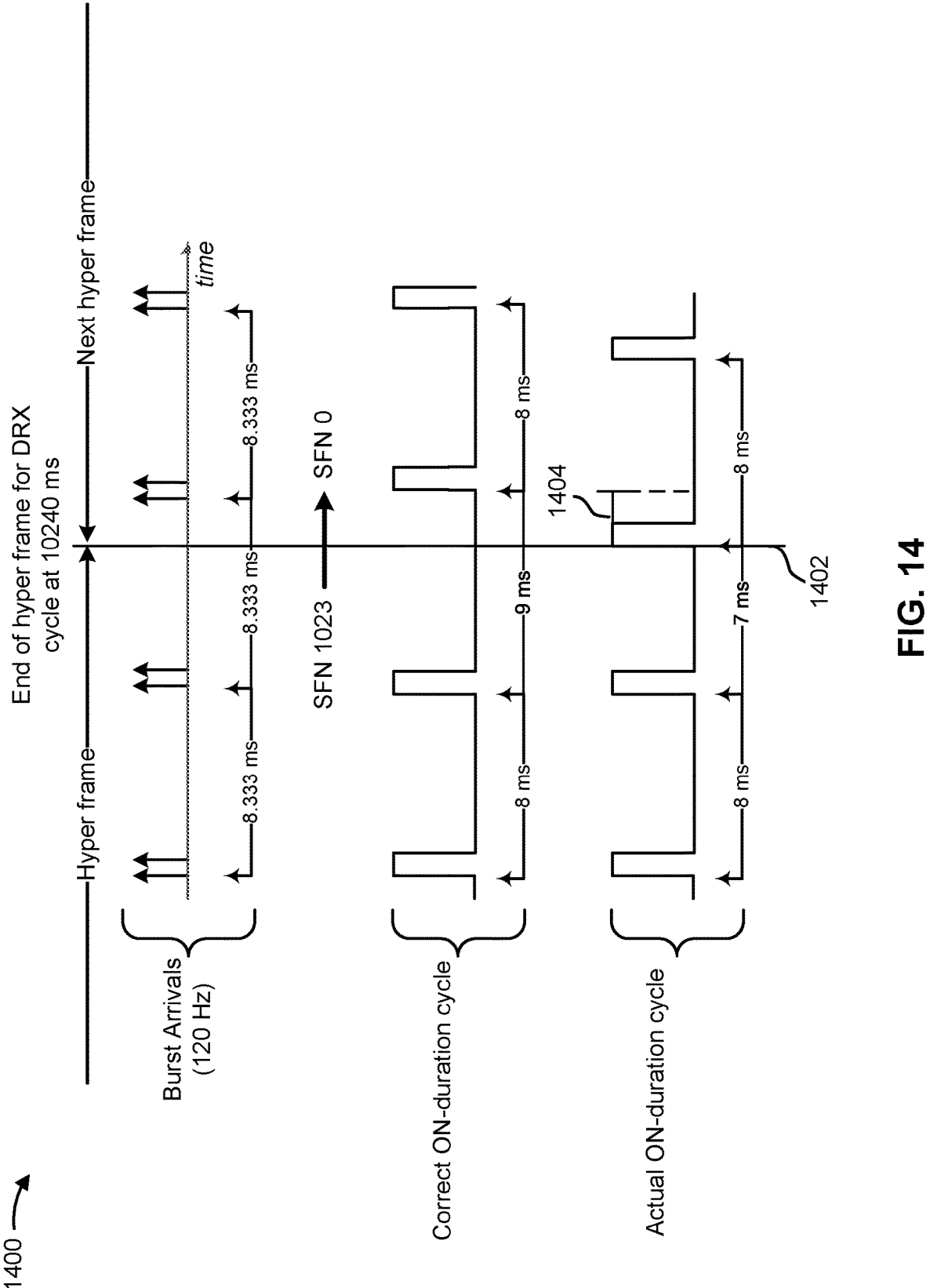
FIG. 14 is a diagram illustrating an example of a system frame number wraparound, in accordance with the present disclosure.

FIG. 14 is a diagram illustrating an example 1400 of an SFN wraparound, in accordance with the present disclosure. Example 1400 shows multimedia data burst arrivals that are arriving at a rate of 120 Hz. In example 1400, drx-StartOffset is set to 0.

A UE may configure a DRX cycle for a cadence of data bursts, such as every 8.33 ms at 120 Hz, but the cadence of the data bursts may be associated with a periodicity of 1000 ms. With a multimedia periodicity of 1000 ms and a DRX cycle of 10,240 ms (1024 SFNs per hyper frame at 10 ms each), the hyper frame of the DRX may be misaligned with a frame of a multimedia server every 10.24 seconds. There is a drift 1404 of 1.666 ms (2 ms in example 1400) every 10.24 sec (10,240 ms) due to the misalignment between the hyper frame periodicity (10,240 ms) and the multimedia periodicity. In other words, the hyper frame periodicity (10,240 ms) cannot be divided by the multimedia periodicity (Hz, fps). In an example of 120 Hz XR traffic, 10,240 ms/(1000/120) ms=1228.8 frames. The fractional part of 0.8 (or 1-0.8=0.2) is the remaining partial frame at the end of the hyper frame, and this partial frame causes an SFN wraparound problem in the next hyper frame. Other multimedia periodicities result in other quantities of frames that do not align with a quantity of SFNs per hyper frame: 45 Hz (460.8 SFNs), 48 Hz (491.52 SFNs), 60 Hz (614.4 SFNs), or 90 Hz (921.6 SFNs.

Example 1400 shows an end of the hyper frame (at SFN 1023) and a beginning of the next hyper frame (at SFN 0), or when the SFN numbers wrap around (restart or return to 0) for the next hyper frame. When the end of the hyper frame 1402 is reached, an ON-duration wake-up condition or formula, such as (SFN*10)+subframe number=0, may select a subframe for an ON-duration that is between data bursts due to the SFN wraparound. Because the subframe may not be aligned with a data burst, the data burst may not be received. This may cause a degradation of communications that could consume additional processing resources and signaling resources.

As indicated above, FIG. 14 is provided as an example. Other examples may differ from what is described with regard to FIG. 14.

Figure 15:
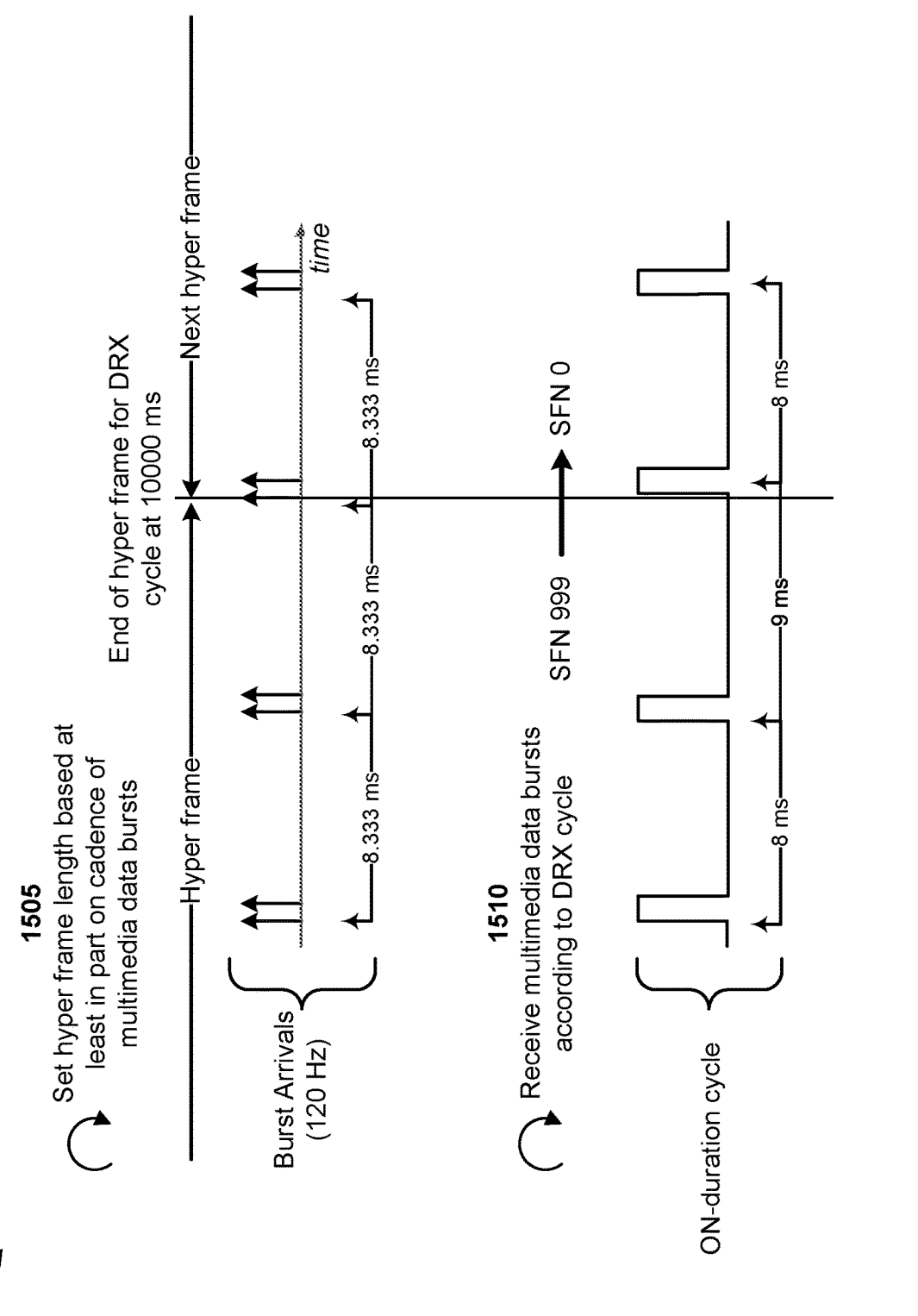
FIG. 15 is a diagram illustrating an example of setting a hyper frame length, in accordance with the present disclosure.

FIG. 15 is a diagram illustrating an example 1500 of setting a hyper frame length, in accordance with the present disclosure. Example 1500 shows multimedia data burst arrivals that are arriving at a rate of 120 Hz.

In some aspects, a network entity (e.g., base station 110) may configure a UE (e.g., UE 120) to set a hyper frame length that is based at least in part on the cadence of the multimedia data bursts, as shown by reference number 1505. The cadence of the multimedia data bursts may correspond to a number of Hz, and a number of frames forming the hyper frame length may be a multiple of a time periodicity of the number of Hz. For example, the UE may set the hyper frame length to be 1000 SFNs rather than 1024 SFNs, such that there is no SFN wraparound at the end of a hyper frame that would misalign ON-duration occasions that are calculated in the next hyper frame. The hyper frame length may also be 1000 frames or 10000 subframes. In some aspects, the UE may maintain an SFN counter for a hyper frame and reset the counter for a next hyper frame upon reaching the hyper frame length (end of the hyper frame). The UE may initialize the SFN counter with a current SFN. The SFN counter increases when the SFN is updated. As a result of setting a hyper frame length to match a cadence or periodicity of the multimedia data bursts, there will not be a misalignment and frequent drift of the timing when the UE receives the multimedia data bursts, as shown by reference number 1510. By adjusting a hyper frame length, the UE may align ON-duration occasions with data bursts to improve communications and cause the UE to avoid consuming additional processing resources and signaling resources. In some aspects, the network entity may select the hyper frame length and transmit the hyper frame length in configuration information.

The UE may use the set hyper frame length by performing a modulo operation with the hyper frame length to determine subframe identifiers of DRX ON-duration subframes for receiving the multimedia data bursts, and the DRX cycle may be configured for a cadence of the multimedia data bursts. For example, if a subframe identifier n for calculating an ON-duration subframe was previously determined, with n=[(SFN×10)+subframe number], the UE may now determine the subframe identifier n with n=[(SFN_M×10)+subframe number], where SFN_M is the SFN after a modulo operation with the set hyper frame length (in SFNs). For example, for a given subframe in sequence N=50000, subframe identifier n for an ON-duration wake-up condition or formula would be 50000 mod 10240, or 9040, with a hyper frame length of 1024 frames (SFN_M=1024). By contrast, for a given subframe N=50000, n would be 50000 mod 10000, or 0, with a hyper frame length of 1000 frames (SFN_M=1000), for the ON-duration formula.

In some aspects, the ON-duration formula for waking up from an ON-duration sleep cycle may include waking up, starting at a subframe, based at least in part on a subframe identifier of the subframe and a DRX cycle periodicity that corresponds a multiple of a multimedia periodicity (inverse of multimedia cadence in a number of Hz). For example, the formula may be [(SFN×numberOfSubframesPerFrame)+subframe number in the frame]=[timeReferenceSFN×numberOfSubframesPerFrame+drx-StartOffset+floor(N×1000/ drx-ShortCadence)] modulo (1024× numberOfSubframesPerFrame). N may be a value that is used for sequentially searching for DRX cycle ON-durations. N increments by one for each ON-duration occasion. There is no SFN wraparound with sequential searching value N. The parameter drx-timeReferenceSFN may provide an SFN that may be used to offset a resource or start a hyper frame. The UE may use the closest SFN with the indicated number preceding the reception of the eCDRX configuration. In some aspects, the ceiling of (N×1000/drx-ShortCadence) may be used instead of the floor. (drx-SlotOffset/32× numberOfSlotsPerSubframe) may indicate the slot offset value in slots when drx-SlotOffset is the value in ⅟32 ms, and the ceiling operation may be used instead of the floor. The terms drx-ShortCadence and drx-ShortCycle may have a relationship such as drx-ShortCycle (ms)=1000/drx-ShortCadence (fps).

In some aspects, the formula may be [(SFN×numberOfSubframesPerFrame)+subframe number in the frame]=[timeReferenceSFN×numberOfSubframesPerFrame+drx-StartOffset(i)+N×drx-ShortCycle] modulo (1024× numberOfSubframesPerFrame).

There may be multiple DRX offsets. The index i may be used to indicate one of the multiple DRX start offsets (drx-StartOffset(i)) and/or multiple DRX slot offsets (drx-StartOffset(i)). Index i may be an integer in an RRC information element (e.g., 0 to 10239 for drx-StartOffset(i), 0 to 31 for drx-SlotOffset(i)). The drx-SlotOffset may have a value of, for example, ⅟32 ms for 480 kilohertz (KHz) subcarrier spacing (SCS). In one example, three DRX start offsets may be defined within drx-ShortCycle, i=[0, 1, 2], and drx-StartOffset may be defined for each i. In this example, with a multimedia cadence of 120 Hz, drx-ShortCycle=25, drx-StartOffset(0)=0, drx-StartOffset(1)=8, and drx-StartOffset(2)=16. Also, drx-SlotOffset(0)=0, drx-SlotOffset(1)=0, drx-SlotOffset(2)=0. Any of the three values of drx-StartOffset(i) and drx-SlotOffset(i) will activate the drx-onDurationTimer.

There may be multiple DRX start offsets (e.g., unit: subframe, 1 ms) within the drx-ShortCycle. For any i, the drx-onDurationTimer for a DRX group may start after drx-SlotOffset(i) from the beginning of the subframe. The set of multiple drx-StartOffsets and drx-SlotOffsets may be configured within drx-ShortCycle, and drx-ShortCycle may be set with any integer numbers.

In some aspects, drx-timeReferenceSFN may be an enumerated value, such as SFN 512, that indicates the SFN used for determination of the offset of a time domain resource. The UE may use the closest SFN with the indicated number preceding the reception of the eCDRX configuration. If timeReferenceSFN is not present, timeReferenceSFN may be 0.

In some aspects, at a slot level, an ON-duration formula may be [(SFN×numberOfSlotsPerFrame)+slot number in the frame]=[timeReferenceSFN×numberOfSlotsPerFrame+ drx-StartOffset×numberOfSlotsPerSubframe+floor(drx-SlotOffset/32×numberOfSlotsPerSubframe)+floor(N×numberOfSlotsPerSubframe×1000/drx-ShortCadence)] modulo (1024×numberOfSlotsPerFrame). drx-SlotOffset may be the value in ⅟32 ms. In some aspects, the ceiling of (N×numberOfSlotsPerSubframe×1000/drx-ShortCadence) may be used instead of the floor.

In some aspects, the formula may be [(SFN×numberOfSlotsPerFrame)+slot number in the frame]=[timeReferenceSFN×numberOfSlotsPerFrame+drx-StartOffset(i)× numberOfSlotsPerSubframe+floor(drx-SlotOffset(i)/32× numberOfSlotsPerSubframe)+N×drx-ShortCycle] modulo (1024×numberOfSlotsPerFrame). For any i, drx-onDura-tionTimer may start for a DRX group at the beginning of the slot. DRX timers (e.g., drx-InactivityTimer, drx-HARQ-RTT-Timer) may be set with the granularity of the slot. In an example with a multimedia cadence of 120 Hz (30 kHz SCS (0.5 ms), drx-ShortCycle=25×2 slots, drx-StartOffset(0)=0, drx-StartOffset(1)=8, and drx-StartOffset(2)=16.

In some aspects, the formula may be [(SFN×num-berOfSlotsPerFrame)+slot number in the frame]=[timeRef-erenceSFN×numberOfSlotsPerFrame+drx-StartOffset(i)+N×drx-ShortCycle] modulo (1024× numberOfSlotsPerFrame). drx-StartOffset may be set with the granularity of a slot. The value of drx-StartOffset(i) may be an integer between 0 and 327647, for example. The unit for the multiple DRX start offsets with the drx-ShortCycle may be a slot, and drx-SlotOffset may be merged into drx-StartOffset. In an example with a multimedia cadence of 120 Hz (30 kHz SCS (0.5 ms), drx-ShortCycle=25×2 slots, drx-StartOffset(0)=0 slots, drx-StartOffset(1)=8×2 slots, and drx-StartOffset(2)=16×2 slots.

In some aspects, a sequential search DRX cycle formula may involve a rational number for drx-ShortCycle. The formula may be [(SFN×numberOfSubframesPerFrame)+subframe number in the frame]=[timeReferenceSFN×num-berOfSubframesPerFrame+drx-StartOffset+floor(N×drx-ShortCycle)] modulo (1024× numberOfSsubframesPerFrame). In some aspects, a ceiling of (N×drx-ShortCycle)] may be used.

In some aspects, the drx-ShortCycle may be indicated in an RRC information element (IE) and may be an enumerated value such as ms8and1Over3, ms11and1Over9, ms12and1Over2, ms16and2Over3, ms20and5Over6, ms22and2Over9, ms33and1Over3, or ms41and2Over3. These represent rational numbers associated with DRX cycle periodicity. A rational number may represent a non-integer value for drx-ShortCycle and thus ms8and1Over3 is associated with 120 fps XR traffic. In this example with a multimedia cadence (drx-ShortCadence) of 120 fps or 120 Hz, drx-ShortCycle=ms8and1Over3 and drx-StartOffset=0. That is, with drx-ShortCycle (ms)=1000/drx-ShortCadence (fps) and drx-ShortCadence=120, drx-ShortCycle=1000/120=25/3=8+⅓ (ms8and1Over3). In another example where drx-ShortCadence=60 fps or 60 Hz, drx-Short-Cycle=1000/60=50/3 (16and2Over3).

The network entity may configure the UE with the hyper frame length, such as with an additional information element in an RRC message (e.g., drx-initialSFN). The network entity may transmit an RRC message with a DRX short cadence value (e.g., drx-ShortCadence) that is an integer between 1 and 1000, for example. The network entity may transmit an RRC message with a DRX SFN modulo (e.g., drx-SFNModulo) value that is less than 1024 SFNs, such as between 1 and 1023. The network entity may transmit an RRC message indicating an initial value of SFN_M (e.g., drx-initialSFN), which may be between 0 and 1023 SFNs. The network entity may transmit a MAC CE indicating an initialization value or timing of SFN_M, or any other such values.

This new SFN_M value, or otherwise setting the hyper frame length based at least in part on the cadence of the multimedia data bursts, may be used with other solutions for aligning ON-duration occasions with multimedia data bursts, as described in connection with FIGS. 6-13. For example, the UE may set a new hyper frame length (and use SFN modulo the new hyper frame length, or n=[(SFN_M×10)+subframe number]) in calculations for outer DRX cycles in two-level DRX configuration and calculations for a short DRX cycle and a long DRX cycle. In some aspects, a MAC entity may consider that a sequential $N^{th}$ ON-duration cycle occurs in a subframe for which [(SFN× numberOfSubframesPerFrame)+subframe number in the frame]=[timeReferenceSFN×numberOfSubframesPer-Frame+drx-StartOffset+drx-PeriodicOffset(1V)] modulo (1024×numberOfSubframesPerFrame). The drx-Periodi-cOffset(0)=0 when N=0, and the drx-PeriodicOffset(1V) =drx-PeriodicOffset(N−1)+drx-ShortCycleList{(N−1) modulo SIZE(drx-ShortCycleList)}, when N>0. The UE may start drx-onDurationTimer for this DRX group after drx-SlotOffsetList{(N−1) modulo SIZE(drx-SlotOffset)} from the beginning of the subframe. The drx-timeReferenc-eSFN may provide the SFN used for determination of the offset of a resource in a time domain. The UE may use the closest SFN with the indicated number preceding the recep-tion of the DRX configuration. The drx-ShortCycleList may be or may be associated with a set of non-uniform DRX short cycles (values in 1 ms, e.g. drx-ShortCycleList=(8,8,9) for 120 Hz). The drx-SlotOffsetList may be or may be associated with a set of DRX slot offsets. The drx-ShortCy-cleList may be a sequence with a size of 1 to maxNrofShort-Cycle (maximum number of short cycles) of drx-Short-Cycle-r18. The drx-ShortCycle-r18 may be a value in 1 ms (subframe) between 1 and 640. The drx-StartOffset may be value in 1 ms (subframe) between 0 and 10239. This may come from drx-LongCycleStartOffset (cf. 1024 (SFN)×10 (Subframes)=10240). A drx-SlotOffset may be a value in ⅟32 ms (480 kHz SCS) between 1 and 31. The drx-timeRefer-enceSFN may be an enumerated value, such as SFN 512. If timeReferenceSFN is not present, timeReferenceSFN is 0.

In some aspects, a MAC entity may consider that a sequential $N^{th}$ ON-duration cycle occurs in a slot for which [(SFN×numberOfSlotsPerFrame)+slot number in the frame] =[timeReferenceSFN×numberOfSlotsPerFrame+drx-Start-Offset×numberOfSlotsPerSubframe+floor(drx-SlotOffset/32×numberOfSlotsPerSubframe)+drx-PeriodicOffset(N)] modulo (1024×numberOfSlotsPerFrame). The drx-Periodi-cOffset(0)=0 when N=0, and drx-PeriodicOffset(N)=drx-ShortCycleList{(N−1) modulo SIZE(drx-ShortCycleList)}+drx-PeriodicOffset(N−1) when N>0. The drx-ShortCycleList may be a set of non-uniform DRX short cycles (values in slots). The drx-ShortCycle-r18 may be a value in slots between 1 and 20479. The UE may start the drx-onDurationTimer for this DRX group from the begin-ning of the slot.

In some aspects, the network entity may transmit DCI or a MAC CE command that compensates for a subframe index misalignment shift (DRX cycle drift) due to an SFN wrap-around. The network entity may indicate a value to shift a timing of the DRX cycle based at least in part on an indicated shift, such as a 240 subframe (240 ms) shift, a 10,240 subframe (10,240 ms) shift, or a specific timing drift (2 ms in Example 1400). The value may be a value in a new value set in a shift table list that can compensate for the subframe index misalignment shift caused by SFN wrap-around. The value may be a 1-bit value in DCI or a MAC CE command that indicates the SFN wraparound. This value may be transmitted with a shift value index that references the shift table list or another shift table list. The UE may apply the shift before a first ON-duration occasion of the next hyper frame. The UE may use, as a formula for a subframe, [(SFN×numberOfSubframesPerFrame)+sub-frame number in the frame]=(timeReferenceSFN×num-berOfSubframesPerFrame+drx-StartOffset+N×drx-Short-Cycle) modulo (1024×numberOfSubframesPerFrame). The UE may start a drx-onDurationTimer for this DRX group after a drx-SlotOffset from the beginning of the subframe. The UE may use, as a formula for a slot, [(SFN×numberOfSlotsPerFrame)+slot number in the frame]=[timeReferenceSFN×numberOfSlotsPerFrame+drx-StartOffset× numberOfSlotsPerSubframe+floor(drx-SlotOffset/32× numberOfSlotsPerSubframe)+N×drx-ShortCycle× numberOfSlotsPerSubframe] modulo (1024× numberOfSlotsPerFrame). The UE may start a drx-onDurationTimer for this DRX group after a drx-SlotOffset from the beginning of the slot.

In some aspects, the MAC CE may not be transmitted due to a predictability of an SFN wraparound. In such a case, the network entity and the UE may both expect a 240 ms or a 10,240 ms relative shift whenever a hyper frame changes during a DRX cycle. As a result, the UE may apply the shift before a first ON-duration occasion of the next hyper frame without receiving a MAC CE indicating the shift. This implicit method may be triggered by a hyper frame change.

In some aspects, the UE may compensate for a timing drift between DRX on-durations and multimedia burst traffic that is associated with a misalignment between a hyper frame length and a periodicity of the multimedia data bursts. For example, the SFN wraparound problem may be resolved by compensating for the drift of 240 ms in the DRX formula. 240 subframes can be added every hyper frame in the subframe index, [(SFN×10)+subframe number+M×240] modulo (drx-ShortCycle)=(drx-StartOffset) modulo (drx-ShortCycle). M may start from 0 when the DRX is initially configured, and M may increase by 1 every hyper frame with a time reference SFN or when SFN returns to 0. To resolve the timing ambiguity of a DRX configuration message, drx-timeReferenceSFN (0 or 512) can be further considered as the initial reference SFN value.

In some aspects, the SFN wraparound problem may be resolved by accumulating 10,240 ms in the DRX formula. For example, 10,240 subframes can be added every hyper frame in the subframe index, [(SFN×10)+subframe number+M×10240] modulo (drx-ShortCycle)=(drx-StartOffset) modulo (drx-ShortCycle). M may start from 0 when the DRX is initially configured, and M may increase by 1 every hyper frame with a time reference SFN or when SFN returns to 0. To resolve the timing ambiguity of a DRX configuration message, drx-timeReferenceSFN (0 or 512) can be further considered as the initial reference SFN value. These are examples and other formulas may add a specified amount of time (e.g., specified quantity of milliseconds) every hyper frame that satisfies a specified formula involving subframe numbers and a DRX short cycle.

As indicated above, FIG. 15 is provided as an example. Other examples may differ from what is described with regard to FIG. 15.

Figure 16:
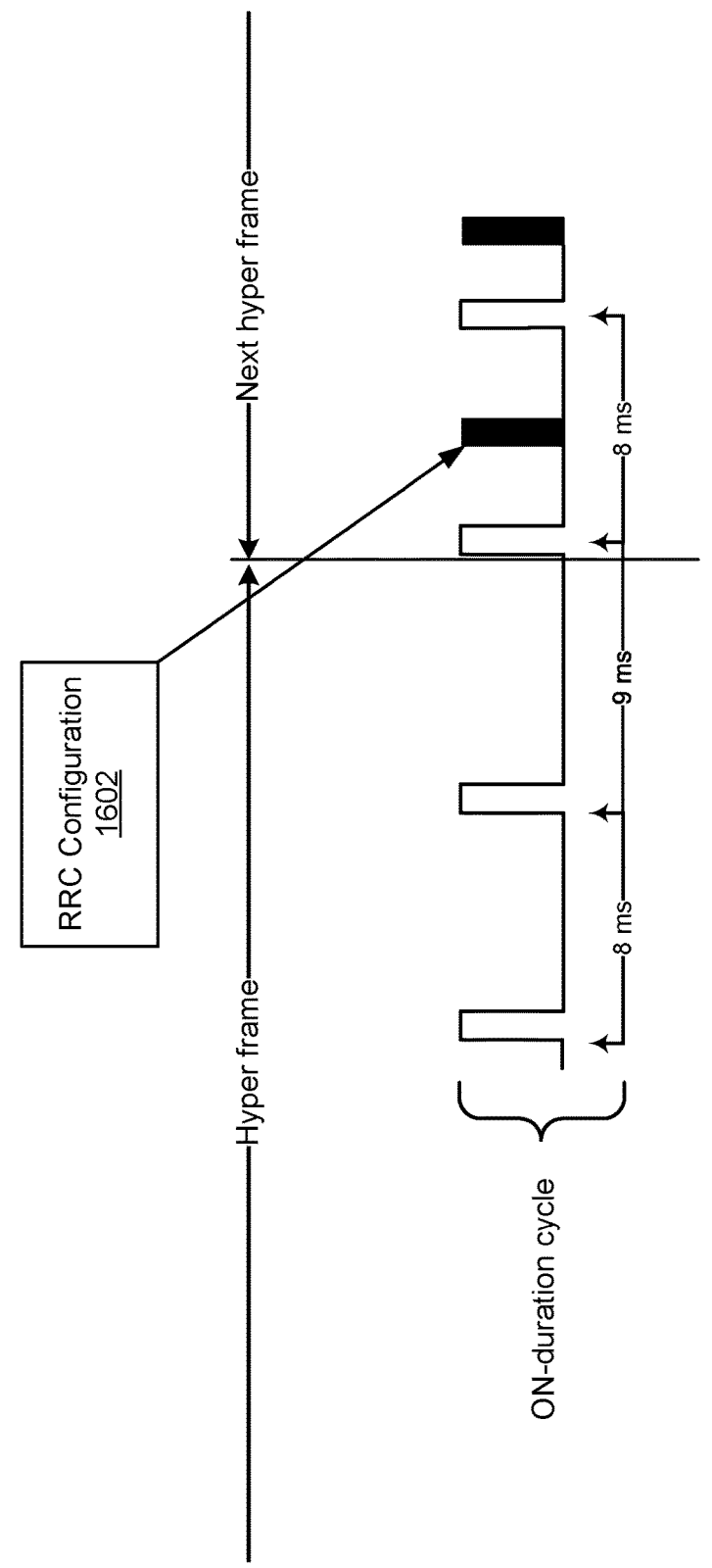
FIG. 16 is a diagram illustrating an example of a radio resource control (RRC) configuration for DRX cycles, in accordance with the present disclosure.

FIG. 16 is a diagram illustrating an example 1600 of an RRC configuration for DRX cycles, in accordance with the present disclosure.

A UE may receive, from a network entity during a hyper frame, an RRC configuration 1602 that indicates DRX cycle information for the hyper frame, including a new timing of ON-duration occasions. However, if the RRC configuration is received late and toward an end of the hyper frame, the DRX configuration may be applied to the next hyper frame rather than the current hyper frame. As a result, the UE and the network entity are no longer using the same DRX configuration for the hyper frame and/or for the next hyper frame.

As indicated above, FIG. 16 is provided as an example. Other examples may differ from what is described with regard to FIG. 16.

Figure 17:
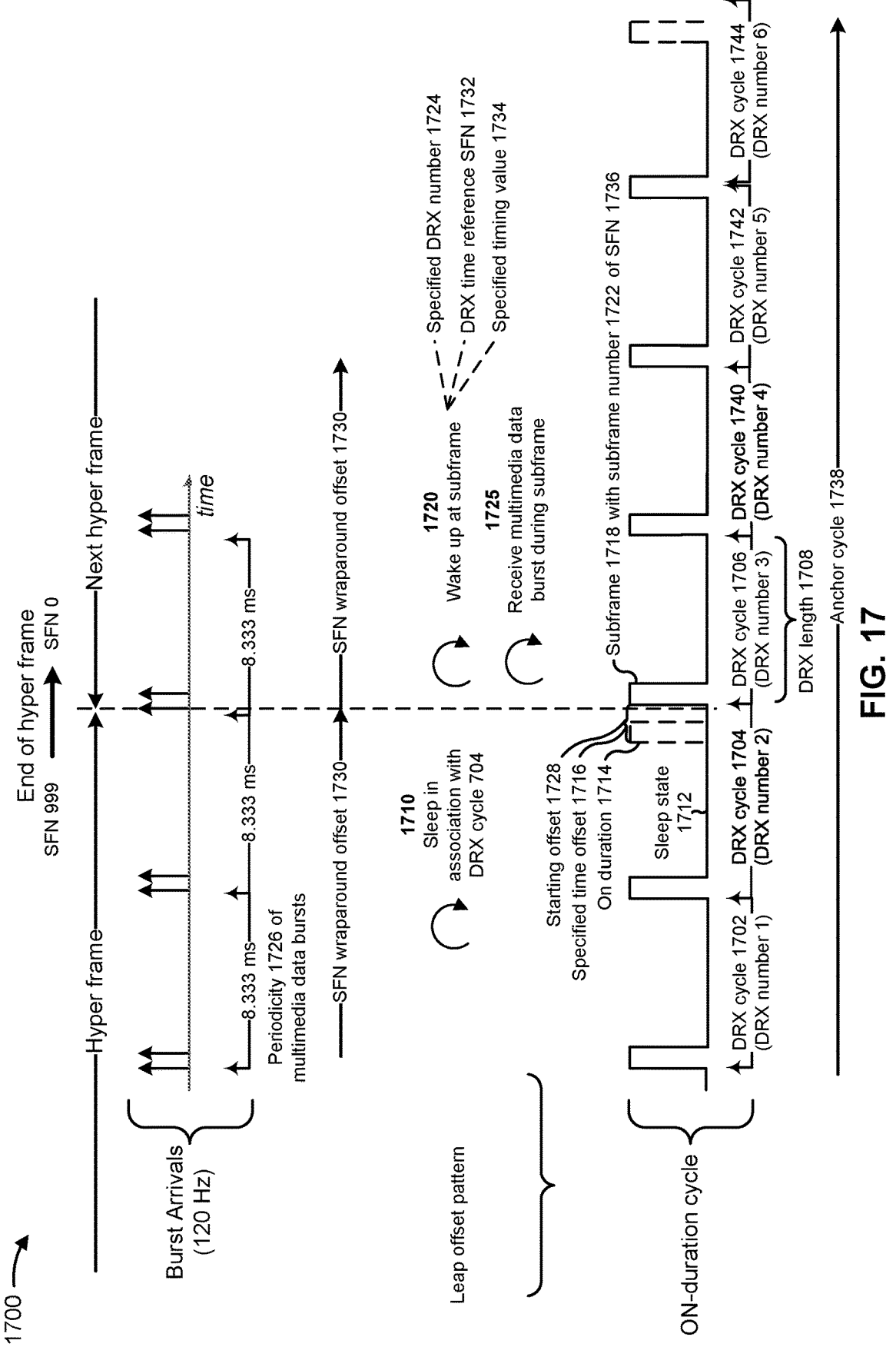
FIG. 17 is a diagram illustrating an example of aligning DRX cycles and a multimedia periodicity, in accordance with the present disclosure.

FIG. 17 is a diagram illustrating an example 1700 of aligning DRX cycles and a multimedia periodicity, in accordance with the present disclosure.

Example 1700 shows multiple DRX cycles (DRX cycle 1702, DRX cycle 1704, DRX cycle 1706, among other DRX cycles) configured for a UE (e.g., a UE 120). DRX cycle 1706 may be a DRX leap cycle based at least in part on its DRX number (e.g., DRX number 103). DRX cycle 1706 may have a DRX cycle length 1708 (e.g., 32 ms). Meanwhile, data bursts may arrive according to a multimedia cadence that is based on, for example, 120 Hz. There is naturally a misalignment due to the mismatch between the Hz granularity of the multimedia data bursts and the millisecond granularity of the DRX cycles. Without proper correction, the misalignment will cause the UE to wake up when a data burst is not sent and sleep when a data burst is sent. As a result, data bursts will be lost and communication performance will degrade.

As shown by reference number 1710, the UE may sleep in association with a DRX cycle, which may be upcoming DRX cycle 1706. For example, the UE may sleep in sleep state 1712 of DRX cycle 1704 in anticipation of upcoming DRX cycle 1706, which will start at the beginning of on duration 1714. To correct the misalignment in advance of waking up, the UE may add a specified time offset 1716 to the on duration 1714. There will be a subframe 1718 at this new time location for the on duration 1714. As shown by reference number 1720, the UE may wake up at the subframe 1718. Waking up at the subframe may include waking up from sleep in time to receive during the subframe. As shown by reference number 1725, the UE may receive a multimedia data burst at the subframe 1718. The subframe 1718 may have a subframe number 1722 within a frame of the subframe 1718. In some aspects, a starting offset (DRX starting offset) may be added to the on duration 1714 as well.

According to various aspects described herein, the UE may use a wake-up condition to determine when to wake up, which may include applying the specified time offset 1716. The wake-up condition may be based at least in part on the subframe number 1722 (e.g., subframe 5 of 10 subframes in a frame) of the subframe 1718, which is a subframe of a frame identified by an SFN 1736. For example, the UE may wake up based at least in part on the specified time offset 1716 being added to the on duration 1714. The specified time offset 1716 may be added based at least in part on the DRX cycle number (e.g., 3) and the DRX cycle length 1708 of DRX cycle 1706. The DRX cycle number may be the number of a DRX cycle with a larger time period, such as an anchor cycle. The specified time offset 1716 may be a fixed time shift (e.g., 4 ms) for the on duration 1714 and the start of an on duration timer. The DRX cycle length 1708 may be referred to as a "DRX long cycle." The specified time offset 1716 may be based at least in part on a periodicity 1726 of the multimedia bursts. For example, the UE may wake up when [(SFN×10)+subframe number 1722] modulo the DRX cycle length 1708 is equal to the starting offset 1728+(n× specified time offset 1716) modulo the DRX cycle length 1708. The count n may be a count of anchor cycles or a count of when a DRX leap cycle occurs, in which the specified time offset 1716 is applied. The count n may be updated or incremented to n+1 whenever the current DRX cycle number modulo a specified DRX cycle number 1724 is equal to 0. The specified DRX cycle number 1724 may be a period of DRX leap cycles or a quantity of DRX cycles at which the specified time offset 1716 is applied again. For example, if the DRX cycle number for DRX cycle 1706 is 3 and the specified DRX cycle number 1724 is 3, the UE may increment count n. If the DRX cycle number is currently 4, the UE may not increment count n. The specified DRX cycle number 1724 may be [(SFN×10)+subframe number 1722]/the DRX cycle length 1708.

Some modifications to this wake-up condition may not successfully address the misalignment of the multimedia data bursts and the DRX cycles. For example, if (n×specified time offset 1716)] is added to a left side of the modulo such that the wake-up condition is [(SFN×10)+subframe number 1722+(n×specified time offset 1716)] modulo the DRX cycle length 1708 is equal to the starting offset 1728+(n× specified time offset) modulo the DRX cycle length 1708, the difference between the DRX cycle on durations and the periodicity 1726 of the multimedia data bursts will continue to increase for each application of the specified time offset 1716. Because of the additional (n×specified time offset 1716) on the left side of the modulo, at a later DRX cycle (e.g., 768 ms), the difference may be equal to the DRX cycle length 1708, which will result in a time duration that is equal to the specified DRX cycle number 1724 that is used for the modulo operation (modulo result will be 0). This introduces a false DRX cycle. Instead of the difference being set to 0 ms, the difference is now 32 ms and increasing.

The wake-up condition may be unsuccessful if the quantity or count of the DRX leap cycles is not accounted for. Therefore, in some aspects, the DRX cycle number of a current DRX cycle that is used for updating n may be based at least in part on the specified time offset 1716. For example, the UE may determine the DRX cycle number of a current DRX cycle for updating n by [(SFN×10)+subframe number 1722+(n×specified time offset 1716)] divided by the DRX cycle length 1708.

In some aspects, the wake-up condition may be more successful if the UE skips every second n+1 update. In some aspects, the wake-up condition may be more successful if n is updated to n+1 when (10×SFN+subframe number 1722) modulo (DRX cycle length 1708×specified DRX cycle number 1724+specified time offset 1716) is equal to a specified timing value 1734. The specified DRX cycle number 1724 may also be referred to as a "specified quantity of DRX cycles." The specified timing value 1734 may be a value used for a condition of updating n and may be equal to (DRX cycle length 1708×specified DRX cycle number 1724)−1.

In some aspects, the wake-up condition may account for any SFN wraparound issue. For example, the UE may wake up based at least in part on an SFN wraparound offset 1730. The SFN wraparound offset 1730 may be equal to (10240× m), and m updates to m+1 when the SFN returns to 0 (resets to 0 at the start of the next hyper frame). In some aspects, the UE may use the SFN wraparound offset 1730 such that the UE wakes up if (10×SFN+subframe number 1722+SFN wraparound offset 1730) modulo the DRX cycle length 1708 is equal to ((n×specified time offset 1716)+a starting offset 1728) modulo the DRX cycle length 1708. The UE may update n to n+1 when (10×SFN+subframe number 1722+SFN wraparound offset 1730) modulo (DRX cycle length 1708×specified DRX cycle number 1724+specified time offset 1716) is equal to the specified timing value 1734.

The UE may resolve any timing ambiguity of an RRC message. For example, an RRC message may be received later in a hyper frame, past SFN 512, and it may not be clear when the UE is to apply the wake-up condition. In some aspects, the UE may receive, in an indication (e.g., the RRC message) from the network, a DRX time reference SFN 1732. The DRX time reference SFN 1732 may be an SFN that is used to adjust the wake-up condition to resolve message timing ambiguity. The DRX time reference SFN 1732 may be SFN 0 or SFN 512. The UE may use the DRX time reference SFN 1732 to wake up if (10×SFN+subframe number 1722+SFN wraparound offset 1730) modulo the DRX cycle length 1728 is equal to [(n×specified time offset 1716)+starting offset 1728+(DRX time reference SFN×10] modulo the DRX cycle length 1708. The UE may update n when (10×SFN+subframe number 1722+SFN wraparound offset 1730) modulo (DRX cycle length 1708×specified DRX cycle number 1724+specified time offset 1716) is equal to a specified timing value 1734. The SFN wraparound offset 1730 may be 10240×m, where m updates to m+1 when the SFN returns to the DRX time reference SFN 1732. The counter m may be used to determine a size of the SFN wraparound offset. The DRX time reference SFN 1732 may be 0 or 512. The UE may receive an indication of the DRX time reference SFN 1732.

DRX cycle 1706 may be part of an anchor cycle 1738 of multiple DRX cycles, shown by DRX cycles 1702, 1704, 1706, 1740, 1742, and 1744. The anchor cycle 1738 may include one DRX leap cycle, such as DRX cycle 1706. In some aspects, the anchor cycle 1738 may include two or more leap cycles, such as both DRX cycle 1706 and DRX cycle 1744. The UE may receive an indication of the two or more leap cycles. For example, an RRC message may indicate a set of multiple leap cycles (e.g., for 45 Hz XR traffic). The indication may indicate a timing of each leap cycle within the anchor cycle 1738 or a leap period. The timing may be explicit, such as a DRX cycle number, an amount of time (e.g., in milliseconds, slot, and/or symbols with respect to another DRX cycle), an SFN, a subframe number, or a combination thereof.

In some aspects, the UE may use a different wake-up condition, where the UE wakes up based at least in part on the specified time offset 1716 added to the on duration 1714 of the DRX cycle 1706 based at least in part on a DRX cycle number of the DRX cycle 1706 and the DRX time reference SFN 1732. The specified time offset 1716 may be based at least in part on the periodicity 1726 of the multimedia data bursts, and the DRX cycle number may be based at least in part on the specified time offset 1716. For example, the UE may wake up if (SFN×quantity of subframes per frame)+subframe number 1722 is equal to [DRX time reference SFN×quantity of subframes per subframe+starting offset 1728+DRX on duration number×DRX cycle length 1708+floor (DRX on duration number/specified time offset 1716)×specified quantity of DRX cycles] modulo (1024×quantity of subframes per frame).

The DRX on duration number N may be a number of an on duration in the anchor cycle 1738. The DRX on duration number N may correspond to the DRX cycle number. In some aspects, the DRX on duration number N may be the Nth eCDRX on duration cycle that occurs in the subframe for which [(SFN_M×10)+subframe number 1722] modulo the DRX cycle length 1708=modulo the DRX cycle length 1708=[starting offset+(n×specified time offset 1716+(DRX time reference SFN×10)] modulo the DRX cycle length 1708, where n=n+1 whenever [(SFN_M×10)+subframe number 1722] modulo (DRX cycle length 1708×specified DRX cycle number 1724+specified time offset 1716)=(DRX cycle length 1708×specified time offset 1716)−1. The specified time offset 1716 may be referred to as a "DRX leap offset." SFN_M may be the SFN after a modulo operation with a set hyper frame length (in SFNs).

In some aspects, the UE may wake up if [(SFN_M×10)+subframe number 1722] modulo the DRX cycle 1706 is equal to [starting offset+(n×specified time offset 1716)+

(DRX time reference SFN×10)] modulo the DRX cycle length 1708, and where n updates to n+1 when [(SFN_M× 10)+subframe number] modulo (DRX cycle length 1708× specified DRX cycle number 1724+specified time offset 1716) is equal to a specified timing value 1734. The specified timing value 1734 may be equal to (DRX cycle length 1708×specified DRX cycle number 1724)−1.

As indicated above, FIG. 17 is provided as an example. Other examples may differ from what is described with regard to FIG. 17.

Figure 18:
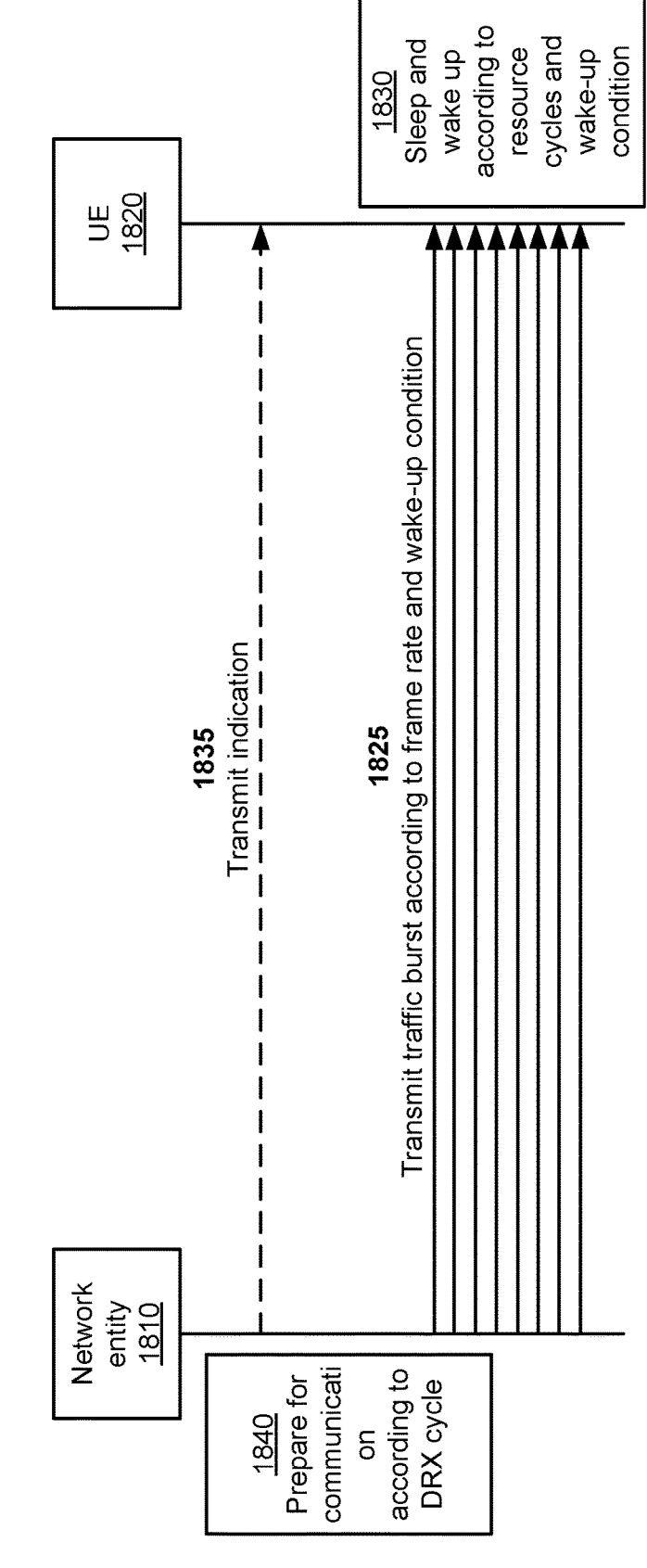
FIG. 18 is a diagram illustrating an example associated with using a specified time offset, in accordance with the present disclosure.

FIG. 18 is a diagram illustrating an example 1800 associated with using a specified time offset, in accordance with the present disclosure. As shown in FIG. 18, a network entity 1810 (e.g., base station 110) may communicate with a UE 1820 (e.g., UE 120). The network entity 1810 and the UE 1820 may be part of a wireless network (e.g., wireless network 100).

As shown by reference number 1825, the network entity 1810 may transmit traffic bursts according to a periodicity (e.g., video frame rate). The network entity 1810 may also transmit the data bursts according to a wake up condition configured for and used by the UE 1820. As shown by reference number 1830, the UE 1820 may sleep and wake up according to resource cycles and a wake-up condition configured for the UE 1820. For example, the UE 1020 may calculate, for each subframe, whether parameters associated with the UE 1020 and the resource cycle meet the criteria for waking up. Examples described herein, such as example 1700, show that the resource cycles may be DRX cycles and that the parameters may be related to the DRX cycles (e.g., SFN, subframe number, DRX cycle length, DRX cycle number).

However, in some aspects, the wake-up conditions used for DRX may be used for other resources, including a channel state information (CSI) reference signal (CSI-RS), a CSI interference measurement resource (CSI-IM), a sounding reference signal (SRS), a scheduling request (SR), a configured grant (CG) resource, a semi-persistent scheduling (SPS) resource, a CSI report, a buffer status report (BSR), physical downlink control channel (PDCCH) monitoring, and/or for physical uplink control channel (PUCCH) resources.

In some aspects, the network entity 1810 may transmit an indication associated with the resource cycle, as shown by reference number 1835. The indication may include parameters (e.g., leap cycle, specified time offset) for waking up according to the resource cycles.

In some aspects, the network entity 1810 may prepare for communication according to a DRX cycle, as shown by reference number 1840. This may include determining the DRX cycle that the UE 1820 is to use or other preparations for the DRX of the UE 1820. Preparation may include preparing for a transmission during an on duration of the DRX cycle.

As indicated above, FIG. 18 is provided as an example. Other examples may differ from what is described with respect to FIG. 18.

While aspects are described with respect to multimedia, the aspects may also be applied to other applications that involve periodic transmissions.

The mathematic symbols used for wake-up conditions or formulas may be interpreted to mean similar concepts. For example, a "+" may refer to a plus or addition, a "−" may refer to a minus or subtraction, "×" or "*" may refer to multiplication, and "/" may refer to division.

Figure 19:
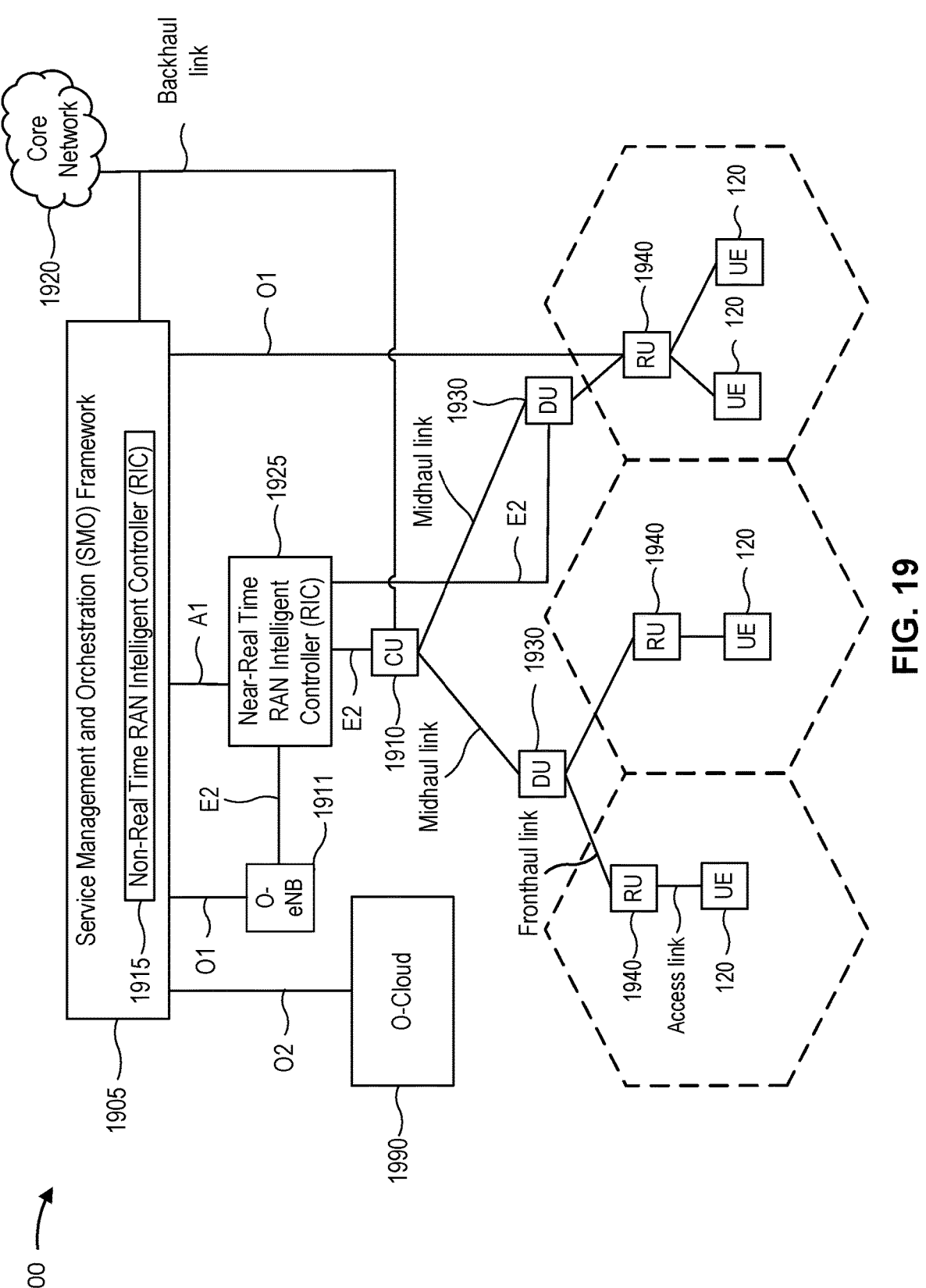
FIG. 19 is a diagram illustrating an example of a disaggregated base station, in accordance with the present disclosure.

FIG. 19 is a diagram illustrating an example of a disaggregated base station 1900, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 1900 architecture may include one or more CUs 1910 that can communicate directly with a core network 1920 via a backhaul link, or indirectly with the core network 1920 through one or more disaggregated base station units (such as a Near-RT RIC 1925 via an E2 link, or a Non-RT RIC 1915 associated with a Service Management and Orchestration (SMO) Framework 1905, or both). A CU 1910 may communicate with one or more DUs 1930 via respective midhaul links, such as an F1 interface. The DUs 1930 may communicate with one or more RUs 1940 via respective fronthaul links. The fronthaul link, the midhaul link, and the backhaul link may be generally referred to as "communication links." The RUs 1940 may communicate with respective UEs 120 via one or more RF access links. In some aspects, the UE 120 may be simultaneously served by multiple RUs 1940. The DUs 1930 and the RUs 1940 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/ actuator, or other wireless device.

Each of the units (e.g., the CUs 1910, the DUs 1930, the RUs 1940, as well as the Near-RT RICs 1925, the Non-RT RICs 1915 and the SMO Framework 1905) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1910 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 1910. The CU 1910 may be configured to handle user plane functionality (i.e., Central Unit-User Plane (CU-UP)), control plane functionality (i.e., Central Unit-Control Plane (CU-CP)), or a combination thereof. In some implementations, the CU 1910 can be logically split into one or more CU-UP units and one or more CU-CP units. The CU-UP unit can communicate bidirectionally with the CU-CP unit via an interface, such as the E1 interface when implemented in an configuration. The CU 1910 can be implemented to communicate with the DU 1930, as necessary, for network control and signaling.

The DU 1930 may correspond to a logical unit that includes one or more base station functions to control the operation of one or more RUs 1940. In some aspects, the DU 1930 may host one or more of a radio link control (RLC) layer, a MAC layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1930 may further host one or more low PHY layers. Each layer (or module) can be implemented with an interface configured to communicate signals with other layers (and modules) hosted by the DU 1930, or with the control functions hosted by the CU 1910.

Lower-layer functionality can be implemented by one or more RUs 1940. In some deployments, an RU 1940, controlled by a DU 1930, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1940 can be implemented to handle over the air (OTA) communication with one or more UEs 120. In some implementations, real-time and non-real-time aspects of control and user plane communication with the RU(s) 1940 can be controlled by the corresponding DU 1930. In some scenarios, this configuration can enable the DU(s) 1930 and the CU 1910 to be implemented in a cloud-based RAN architecture, such as a vRAN architecture.

The SMO Framework 1905 may be configured to support RAN deployment and provisioning of non-virtualized and virtualized network elements. For non-virtualized network elements, the SMO Framework 1905 may be configured to support the deployment of dedicated physical resources for RAN coverage requirements which may be managed via an operations and maintenance interface (such as an O1 interface). For virtualized network elements, the SMO Framework 1905 may be configured to interact with a cloud computing platform (such as an open cloud (O-Cloud) 1990) to perform network element life cycle management (such as to instantiate virtualized network elements) via a cloud computing platform interface (such as an O2 interface). Such virtualized network elements can include, but are not limited to, CUs 1910, DUs 1930, RUs 1940 and Near-RT RICs 1925. In some implementations, the SMO Framework 1905 can communicate with a hardware aspect of a 4G RAN, such as an open eNB (O-eNB) 1911, via an O1 interface. Additionally, in some implementations, the SMO Framework 1905 can communicate directly with one or more RUs 1940 via an O1 interface. The SMO Framework 1905 also may include a Non-RT RIC 1915 configured to support functionality of the SMO Framework 1905.

The Non-RT RIC 1915 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1925. The Non-RT RIC 1915 may be coupled to or communicate with (such as via an A1 interface) the Near-RT RIC 1925. The Near-RT RIC 1925 may be configured to include a logical function that enables near-real-time control and optimization of RAN elements and resources via data collection and actions over an interface (such as via an E2 interface) connecting one or more CUs 1910, one or more DUs 1930, or both, as well as an O-eNB, with the Near-RT RIC 1925.

In some implementations, to generate AI/ML models to be deployed in the Near-RT RIC 1925, the Non-RT RIC 1915 may receive parameters or external enrichment information from external servers. Such information may be utilized by the Near-RT RIC 1925 and may be received at the SMO Framework 1905 or the Non-RT RIC 1915 from non-network data sources or from network functions. In some examples, the Non-RT RIC 1915 or the Near-RT RIC 1925 may be configured to tune RAN behavior or performance. For example, the Non-RT RIC 1915 may monitor long-term trends and patterns for performance and employ AI/ML models to perform corrective actions through the SMO Framework 1905 (such as reconfiguration via O1) or via creation of RAN management policies (such as A1 policies).

As indicated above, FIG. 19 is provided as an example. Other examples may differ from what is described with regard to FIG. 19.

FIG. 20 is a diagram illustrating an example process 2000 performed, for example, by a UE, in accordance with the present disclosure. Example process 2000 is an example where the UE (e.g., UE 120, UE 1820) performs operations associated with a DRX methodology for multimedia.

As shown in FIG. 20, in some aspects, process 2000 may include sleeping in association with a DRX cycle (block 2010). For example, the UE (e.g., using communication manager 2608 and/or DRX component 2610 depicted in FIG. 26) may sleep in association with a DRX cycle, as described above.

As further shown in FIG. 20, in some aspects, process 2000 may include waking up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset (block 2020). For example, the UE (e.g., using communication manager 2608 and/or DRX component 2610 depicted in FIG. 26) may wake up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset, as described above.

As further shown in FIG. 20, in some aspects, process 2000 may include receiving a multimedia data burst during the subframe (block 2030). For example, the UE (e.g., using communication manager 140 and/or reception component 2602 depicted in FIG. 26) may receive a multimedia data burst during the subframe, as described above.

Process 2000 may include additional aspects, such as any single aspect or any combination of aspects described below and/or in connection with one or more other processes described elsewhere herein.

In a first aspect, the DRX cycle number is equal to [(10×the SFN of a frame comprising the subframe+a sub-frame number of the subframe)−(n×the specified time off-set)] divided by the length of the DRX cycle.

In a second aspect, alone or in combination with the first aspect, waking up includes waking up if (10×the SFN+the subframe number) modulo the length of the DRX cycle is equal to ((n×the specified time offset)+a starting offset) modulo the length of the DRX cycle, and n updates to n+1 when the DRX cycle number modulo a specified quantity of DRX cycles is equal to 0 (zero).

In a third aspect, alone or in combination with one or more of the first and second aspects, process 2000 includes skipping every second n+1 update.

In a fourth aspect, alone or in combination with one or more of the first through third aspects, waking up includes waking up if (10×the SFN+the subframe number) modulo the length of the DRX cycle is equal to ((n×the specified time offset)+a starting offset) modulo the length of the DRX cycle, and n updates to n+1 when (10×the SFN+the sub-frame number) modulo (the length of the DRX cycle×a specified quantity of DRX cycles+the specified time offset) is equal to a specified timing value.

In a fifth aspect, alone or in combination with one or more of the first through fourth aspects, the specified timing value is equal to (the length of the DRX cycle×the specified quantity of DRX cycles)−1.

In a sixth aspect, alone or in combination with one or more of the first through fifth aspects, waking up includes waking up further based at least in part on an SFN wrap-around offset.

In a seventh aspect, alone or in combination with one or more of the first through sixth aspects, waking up includes waking up if (10×the SFN+the subframe number+the SFN wraparound offset) modulo the length of the DRX cycle is equal to ((n×the specified time offset)+a starting offset)

modulo the length of the DRX cycle, and n updates to n+1 when (10×the SFN+the subframe number+the SFN wrap-around offset) modulo (the length of the DRX cycle×a specified quantity of DRX cycles+the specified time offset) is equal to a specified timing value.

In an eighth aspect, alone or in combination with one or more of the first through seventh aspects, the SFN wrap-around offset is equal to (10240×m), and m updates to m+1 when the SFN returns to 0 (zero).

In a ninth aspect, alone or in combination with one or more of the first through eighth aspects, waking up includes waking up if (10×the SFN+the subframe number+the SFN wraparound offset) modulo the length of the DRX cycle is equal to [(n×the specified time offset)+a starting offset+ (DRX time reference SFN×10] modulo the length of the DRX cycle, and n updates to n+1 when (10×the SFN+the subframe number+the SFN wraparound offset) modulo (the length of the DRX cycle×a specified quantity of DRX cycles+the specified time offset) is equal to a specified timing value.

In a tenth aspect, alone or in combination with one or more of the first through ninth aspects, the SFN wraparound offset is 10240×m, where m updates to m+1 when the SFN returns to the DRX time reference SFN, and the DRX time reference SFN is 0 or 512.

In an eleventh aspect, alone or in combination with one or more of the first through tenth aspects, process 2000 includes receiving an indication of the DRX time reference SFN.

In a twelfth aspect, alone or in combination with one or more of the first through eleventh aspects, an anchor cycle that includes the DRX cycle also includes two or more leap cycles.

In a thirteenth aspect, alone or in combination with one or more of the first through twelfth aspects, process 2000 includes receiving an indication of the two or more leap cycles.

In a fourteenth aspect, alone or in combination with one or more of the first through thirteenth aspects, process 2000 includes receiving an indication of a timing of the two or more leap cycles. In some aspects, a leap cycle offset pattern of the two or more leap cycles may include (0 milliseconds (ms), 1 ms, 1 ms) or (1 ms, 1 ms, 0 ms).

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

FIG. 21 is a diagram illustrating an example process 2100 performed, for example, by a UE, in accordance with the present disclosure. Example process 2100 is an example where the UE (e.g., UE 120, UE 1820) performs operations associated with a DRX methodology for multimedia.

As shown in FIG. 21, in some aspects, process 2100 may include sleeping in association with a DRX cycle (block 2110). For example, the UE (e.g., using communication manager 2608 and/or DRX component 2610 depicted in FIG. 26) may sleep in association with a DRX cycle, as described above.

As further shown in FIG. 21, in some aspects, process 2100 may include waking up, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset (block 2120). For example, the UE (e.g., using communication manager 2608 and/or DRX component 2610 depicted in FIG. 26) may wake up, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset, as described above.

As further shown in FIG. 21, in some aspects, process 2100 may include receiving a multimedia data burst during the subframe (block 2130). For example, the UE (e.g., using communication manager 140 and/or reception component 2602 depicted in FIG. 26) may receive a multimedia data burst during the subframe, as described above.

Process 2100 may include additional aspects, such as any single aspect or any combination of aspects described below and/or in connection with one or more other processes described elsewhere herein.

In a first aspect, waking up includes waking up if (an SFN of a frame comprising the subframe×a quantity of subframes per frame)+a subframe number of the subframe is equal to [the DRX time reference SFN×the quantity of subframes per subframe+a starting offset+a DRX on duration number×a length of the DRX cycle+floor (the DRX on duration number/the specified time offset)×a specified quantity of DRX cycles] modulo (1024×the quantity of subframes per frame).

In a second aspect, alone or in combination with the first aspect, waking up includes waking up if [(a modified SFN of a frame comprising the subframe×10)+a subframe number of the subframe] modulo a length of the DRX cycle is equal to [a starting offset+(n×the specified time offset)+(the DRX time reference SFN×10)] modulo the length of the DRX cycle, and n updates to n+1 when [(SFN_M×10)+the subframe number] modulo (the length of the DRX cycle×a specified quantity of DRX cycles+the specified time offset) is equal to a specified timing value.

In a third aspect, alone or in combination with one or more of the first and second aspects, the specified timing value is equal to (the length of the DRX cycle×the specified quantity of DRX cycles)−1.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

FIG. 22 is a diagram illustrating an example process 2200 performed, for example, by a UE, in accordance with the present disclosure. Example process 2200 is an example where the UE (e.g., UE 120, UE 1820) performs operations associated with a DRX methodology for multimedia.

As shown in FIG. 22, in some aspects, process 2200 may include sleeping in association with a resource cycle (block 2210). For example, the UE (e.g., using communication manager 2608 and/or resource component 2612 depicted in FIG. 26) may sleep in association with a resource cycle, as described above.

As further shown in FIG. 22, in some aspects, process 2200 may include waking up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset (block 2220). For example, the UE (e.g., using communication manager 140 and/or resource component 2612 depicted in FIG. 26) may wake up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset, as described above.

As further shown in FIG. 22, in some aspects, process 2200 may include receiving a multimedia data burst during the subframe (block 2230). For example, the UE (e.g., using communication manager 2608 and/or reception component 2602 depicted in FIG. 26) may receive a multimedia data burst during the subframe, as described above.

Process 2200 may include additional aspects, such as any single aspect or any combination of aspects described below and/or in connection with one or more other processes described elsewhere herein.

In a first aspect, the resource cycle is a cycle for one of a CSI reference signal, a CSI interference measurement resource, or a sounding reference signal.

In a second aspect, alone or in combination with the first aspect, the resource cycle is a cycle for a scheduling request.

In a third aspect, alone or in combination with one or more of the first and second aspects, the resource cycle is a cycle for a configured grant resource or a semi-persistent scheduling resource.

In a fourth aspect, alone or in combination with one or more of the first through third aspects, the resource cycle is a cycle for a channel state information report or a buffer status report.

In a fifth aspect, alone or in combination with one or more of the first through fourth aspects, the resource cycle is a cycle for physical downlink control channel monitoring or for physical uplink control channel resources.

In a sixth aspect, alone or in combination with one or more of the first through fifth aspects, the resource cycle number is equal to [(10×a system frame number (SFN) of a frame comprising the subframe+a subframe number of the subframe)−(n×the specified time offset)] divided by the length of the resource cycle.

In a seventh aspect, alone or in combination with one or more of the first through sixth aspects, waking up includes waking up if (10×the SFN+the subframe number+an SFN wraparound offset) modulo the length of the resource cycle is equal to ((n×the specified time offset)+a starting offset) modulo the length of the resource cycle, and n updates to n+1 when (10×the SFN+the subframe number+the SFN wraparound offset) modulo (the length of the resource cycle×a specified quantity of resource cycles+the specified time offset) is equal to a specified timing value.

In an eighth aspect, alone or in combination with one or more of the first through seventh aspects, the SFN wraparound offset is 10240×m, and m updates to m+1 when the SFN returns to 0 (zero).

In a ninth aspect, alone or in combination with one or more of the first through eighth aspects, waking up includes waking up if (10×the SFN+the subframe number+an SFN wraparound offset) modulo the length of the resource cycle is equal to [(n×the specified time offset)+a starting offset+(a resource time reference SFN×10] modulo the length of the resource cycle, and n updates to n+1 when (10×the resource+the subframe number+the SFN wraparound offset)

modulo (the length of the resource cycle×a specified quan-
tity of resource cycles+the specified time offset) is equal to
a specified timing value.

In a tenth aspect, alone or in combination with one or
more of the first through ninth aspects, the SFN wraparound
offset is 10240×m, where m updates to m+1 when the SFN
returns to the resource time reference SFN, and the resource
time reference SFN is 0 or 512.

Although FIG. 22 shows example blocks of process 2200,
in some aspects, process 2200 may include additional
blocks, fewer blocks, different blocks, or differently
arranged blocks than those depicted in FIG. 22. Additionally,
or alternatively, two or more of the blocks of process 2200
may be performed in parallel.

FIG. 23 is a diagram illustrating an example process 2300
performed, for example, by a network entity, in accordance
with the present disclosure. Example process 2300 is an
example where the network entity (e.g., base station 110,
network entity 1810) performs operations associated with a
DRX methodology for multimedia.

As shown in FIG. 23, in some aspects, process 2300 may
include preparing for communication with a UE according
to a DRX cycle (block 2310). For example, the network
entity (e.g., using communication manager 2908 and/or
DRX component 2910 depicted in FIG. 29) may prepare for
communication with a UE according to a DRX cycle, as
described above.

As further shown in FIG. 23, in some aspects, process
2300 may include transmitting, starting at a subframe, a data
burst based at least in part on a specified time offset that is
added to an on duration of the DRX cycle based at least in
part on a DRX cycle number of the DRX cycle and a length
of the DRX cycle, where the specified time offset is based
at least in part on a periodicity of multimedia data bursts, and
where the DRX cycle number is based at least in part on the
specified time offset (block 2320). For example, the network
entity (e.g., using communication manager 2908 and/or
transmission component 2904 depicted in FIG. 29) may
transmit, starting at a subframe, a data burst based at least in
part on a specified time offset that is added to an on duration
of the DRX cycle based at least in part on a DRX cycle
number of the DRX cycle and a length of the DRX cycle,
where the specified time offset is based at least in part on a
periodicity of multimedia data bursts, and where the DRX
cycle number is based at least in part on the specified time
offset, as described above.

Process 2300 may include additional aspects, such as any
single aspect or any combination of aspects described below
and/or in connection with one or more other processes
described elsewhere herein.

In a first aspect, the DRX cycle number is equal to
[(10×SFN of a frame comprising the subframe+a subframe
number of the subframe)−(n×the specified time offset)]
divided by the length of the DRX cycle.

In a second aspect, alone or in combination with the first
aspect, transmitting the data burst includes transmitting the
data burst if (10×the SFN+the subframe number) modulo the
length of the DRX cycle is equal to ((n×the specified time
offset)+a starting offset) modulo the length of the DRX
cycle, and n updates to n+1 when the DRX cycle number
modulo a specified quantity of DRX cycles is equal to 0
(zero).

In a third aspect, alone or in combination with one or more
of the first and second aspects, process 2300 includes
skipping every second n+1 update.

In a fourth aspect, alone or in combination with one or
more of the first through third aspects, transmitting the data burst includes transmitting the data burst if (10×the SFN+the
subframe number) modulo the length of the DRX cycle is
equal to ((n×the specified time offset)+a starting offset)
modulo the length of the DRX cycle, and n updates to n+1
when (10×the SFN+the subframe number) modulo (the
length of the DRX cycle×a specified quantity of DRX
cycles+the specified time offset) is equal to a specified
timing value.

In a fifth aspect, alone or in combination with one or more
of the first through fourth aspects, the specified timing value
is equal to (the length of the DRX cycle×the specified
quantity of DRX cycles)−1.

In a sixth aspect, alone or in combination with one or
more of the first through fifth aspects, transmitting the data
burst includes transmitting the data burst further based at
least in part on an SFN wraparound offset.

In a seventh aspect, alone or in combination with one or
more of the first through sixth aspects, transmitting the data
burst includes transmitting the data burst if (10×the SFN+the
subframe number+the SFN wraparound offset) modulo the
length of the DRX cycle is equal to ((n×the specified time
offset)+a starting offset) modulo the length of the DRX
cycle, and n updates to n+1 when (10×the SFN+the sub-
frame number+the SFN wraparound offset) modulo (the
length of the DRX cycle×a specified quantity of DRX
cycles+the specified time offset) is equal to a specified
timing value.

In an eighth aspect, alone or in combination with one or
more of the first through seventh aspects, the SFN wrap-
around offset is equal to (10240×m), and m updates to m+1
when the SFN returns to 0 (zero).

In a ninth aspect, alone or in combination with one or
more of the first through eighth aspects, transmitting the data
burst includes transmitting the data burst up if (10×the
SFN+the subframe number+the SFN wraparound offset)
modulo the length of the DRX cycle is equal to [(n×the
specified time offset)+a starting offset+(DRX time reference
SFN×10] modulo the length of the DRX cycle, and n
updates to n+1 when (10×the SFN+the subframe number+
the SFN wraparound offset) modulo (the length of the DRX
cycle×a specified quantity of DRX cycles+the specified time
offset) is equal to a specified timing value.

In a tenth aspect, alone or in combination with one or
more of the first through ninth aspects, the SFN wraparound
offset is 10240×m, where m updates to m+1 when the SFN
returns to the DRX time reference SFN, and the DRX time
reference SFN is 0 or 512.

In an eleventh aspect, alone or in combination with one or
more of the first through tenth aspects, process 2300
includes transmitting an indication of the DRX time refer-
ence SFN.

In a twelfth aspect, alone or in combination with one or
more of the first through eleventh aspects, an anchor cycle
that includes the DRX cycle also includes two or more leap
cycles.

In a thirteenth aspect, alone or in combination with one or
more of the first through twelfth aspects, process 2300
includes transmitting an indication of the two or more leap
cycles.

In a fourteenth aspect, alone or in combination with one
or more of the first through thirteenth aspects, process 2300
includes transmitting an indication of a timing of the two or
more leap cycles.

Although FIG. 23 shows example blocks of process 2300,
in some aspects, process 2300 may include additional
blocks, fewer blocks, different blocks, or differently
arranged blocks than those depicted in FIG. 23. Additionally, or alternatively, two or more of the blocks of process 2300 may be performed in parallel.

FIG. 24 is a diagram illustrating an example process 2400 performed, for example, by a network entity, in accordance with the present disclosure. Example process 2400 is an example where the network entity (e.g., base station 110, network entity 1810) performs operations associated with a DRX methodology for multimedia.

As shown in FIG. 24, in some aspects, process 2400 may include preparing for communication with a UE according to a DRX cycle (block 2410). For example, the network entity (e.g., using communication manager 2908 and/or DRX component 2910 depicted in FIG. 29) may prepare for communication with a UE according to a DRX cycle, as described above.

As further shown in FIG. 24, in some aspects, process 2400 may include transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset (block 2420). For example, the network entity (e.g., using communication manager 2908 and/or DRX component 2910 depicted in FIG. 29) may transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset, as described above.

Process 2400 may include additional aspects, such as any single aspect or any combination of aspects described below and/or in connection with one or more other processes described elsewhere herein.

In a first aspect, transmitting the data burst includes transmitting the data burst if (an SFN of a frame comprising the subframe×a quantity of subframes per frame)+a sub-frame number of the subframe is equal to [the DRX time reference SFN×the quantity of subframes per subframe+a starting offset+a DRX on duration number×a length of the DRX cycle+floor (the DRX on duration number/the speci-fied time offset)×a specified quantity of DRX cycles] modulo (1024×the quantity of subframes per frame).

In a second aspect, alone or in combination with the first aspect, transmitting the data burst includes transmitting the data burst if [(a modified SFN of a frame comprising the subframe×10)+a subframe number of the subframe] modulo a length of the DRX cycle is equal to [a starting offset+(n× the specified time offset)+(the DRX time reference SFN× 10)] modulo the length of the DRX cycle, and n updates to n+1 when [(SFN_M×10)+the subframe number] modulo (the length of the DRX cycle×a specified quantity of DRX cycles+the specified time offset) is equal to a specified timing value.

In a third aspect, alone or in combination with one or more of the first and second aspects, the specified timing value is equal to (the length of the DRX cycle×the specified quantity of DRX cycles)−1.

Although FIG. 24 shows example blocks of process 2400, in some aspects, process 2400 may include additional blocks, fewer blocks, different blocks, or differently arranged blocks than those depicted in FIG. 24. Additionally, or alternatively, two or more of the blocks of process 2400 may be performed in parallel.

FIG. 25 is a diagram illustrating an example process 2500 performed, for example, by a network entity, in accordance with the present disclosure. Example process 2500 is an example where the network entity (e.g., base station 110, network entity 1810) performs operations associated with a DRX methodology for multimedia.

As shown in FIG. 25, in some aspects, process 2500 may include preparing for communication with a UE according to a resource cycle (block 2510). For example, the network entity (e.g., using communication manager 2908 and/or resource component 2912 depicted in FIG. 29) may prepare for communication with a UE according to a resource cycle, as described above.

As further shown in FIG. 25, in some aspects, process 2500 may include transmitting, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset (block 2520). For example, the network entity (e.g., using communication manager 2908 and/or transmission component 2904 depicted in FIG. 29) may transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset, as described above.

Process 2500 may include additional aspects, such as any single aspect or any combination of aspects described below and/or in connection with one or more other processes described elsewhere herein.

In a first aspect, the resource cycle is a cycle for one of a CSI reference signal, a CSI interference measurement resource, or a sounding reference signal.

In a second aspect, alone or in combination with the first aspect, the resource cycle is a cycle for a scheduling request.

In a third aspect, alone or in combination with one or more of the first and second aspects, the resource cycle is a cycle for a configured grant resource or a semi-persistent sched-uling resource.

In a fourth aspect, alone or in combination with one or more of the first through third aspects, the resource cycle is a cycle for a channel state information report or a buffer status report.

In a fifth aspect, alone or in combination with one or more of the first through fourth aspects, the resource cycle is a cycle for physical downlink control channel monitoring or for physical uplink control channel resources.

In a sixth aspect, alone or in combination with one or more of the first through fifth aspects, the resource cycle number is equal to [(10×a system frame number (SFN) of a frame comprising the subframe+a subframe number of the subframe)−(n×the specified time offset)] divided by the length of the resource cycle.

In a seventh aspect, alone or in combination with one or more of the first through sixth aspects, transmitting the data burst includes transmitting the data burst if (10×the SFN+the subframe number+an SFN wraparound offset) modulo the length of the resource cycle is equal to ((n×the specified time offset)+a starting offset) modulo the length of the resource cycle, and n updates to n+1 when (10×the SFN+the subframe number+the SFN wraparound offset) modulo (the length of the resource cycle×a specified quantity of resource cycles+the specified time offset) is equal to a specified timing value.

In an eighth aspect, alone or in combination with one or more of the first through seventh aspects, the SFN wraparound offset is 10240×m, and m updates to m+1 when the SFN returns to 0 (zero).

In a ninth aspect, alone or in combination with one or more of the first through eighth aspects, transmitting the data burst includes transmitting the data burst if (10×the SFN+the subframe number+an SFN wraparound offset) modulo the length of the resource cycle is equal to [(n×the specified time offset)+a starting offset+(a resource time reference SFN×10] modulo the length of the resource cycle, and n updates to n+1 when (10×the resource+the subframe number+the SFN wraparound offset) modulo (the length of the resource cycle×a specified quantity of resource cycles+the specified time offset) is equal to a specified timing value.

In a tenth aspect, alone or in combination with one or more of the first through ninth aspects, the SFN wraparound offset is 10240×m, where m updates to m+1 when the SFN returns to the resource time reference SFN, and where the resource time reference SFN is 0 or 512.

Although FIG. 25 shows example blocks of process 2500, in some aspects, process 2500 may include additional blocks, fewer blocks, different blocks, or differently arranged blocks than those depicted in FIG. 25. Additionally, or alternatively, two or more of the blocks of process 2500 may be performed in parallel.

Figure 26:
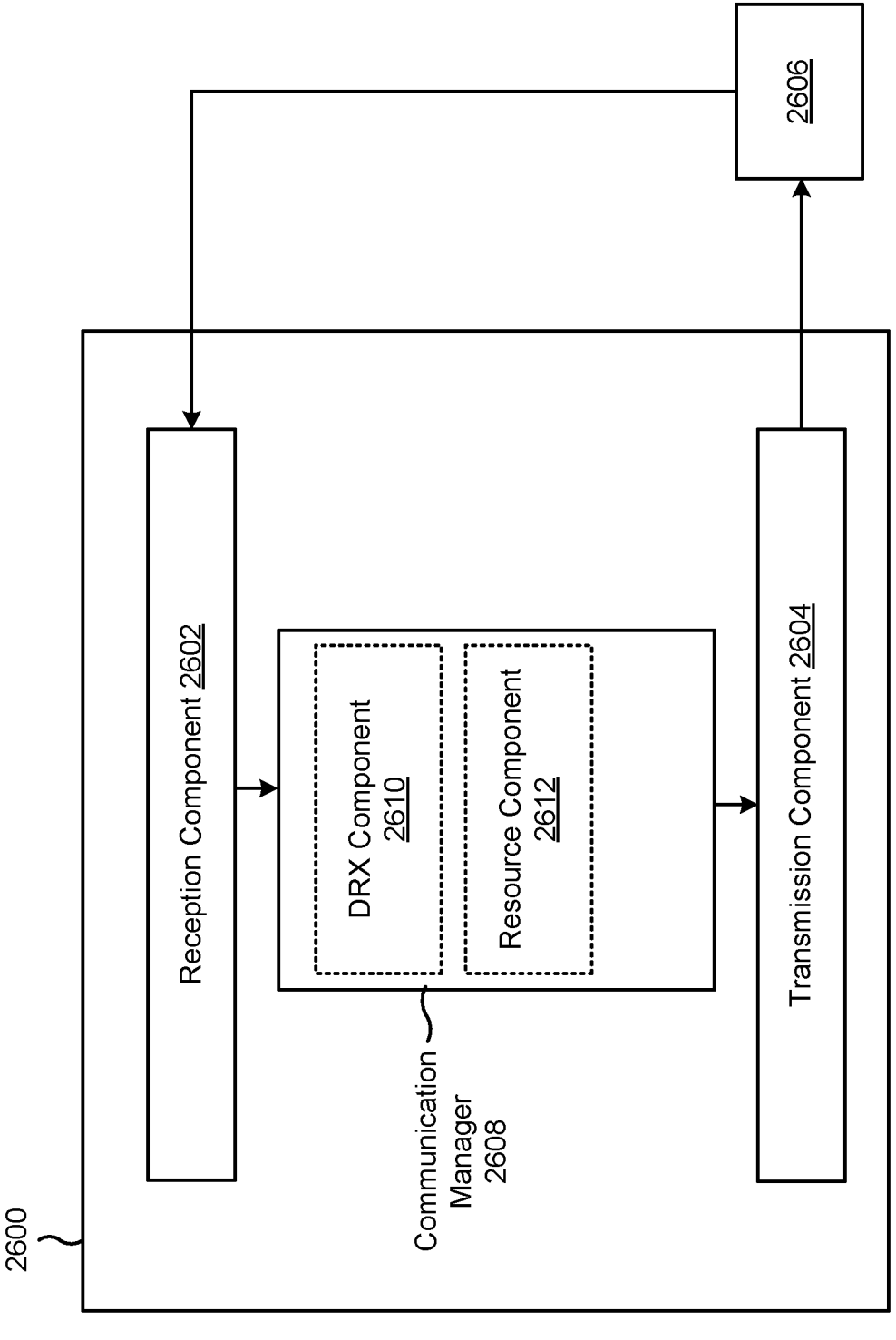
FIG. 26 is a block diagram of an example apparatus for wireless communication, in accordance with the present disclosure.

FIG. 26 is a diagram of an example apparatus 2600 for wireless communication, in accordance with the present disclosure. The apparatus 2600 may be a UE (e.g., a UE 120, UE 1820), or a UE may include the apparatus 2600. In some aspects, the apparatus 2600 includes a reception component 2602 and a transmission component 2604, which may be in communication with one another (for example, via one or more buses and/or one or more other components). As shown, the apparatus 2600 may communicate with another apparatus 2606 (such as a UE, a base station, network entity, or another wireless communication device) using the reception component 2602 and the transmission component 2604. As further shown, the apparatus 2600 may include the communication manager 140. The communication manager 2608 may control and/or otherwise manage one or more operations of the reception component 2602 and/or the transmission component 2604. In some aspects, the communication manager 2608 may include one or more antennas, a modem, a controller/processor, a memory, or a combination thereof, of the UE described in connection with FIG. 2. The communication manager 2608 may be, or be similar to, the communication manager 140 depicted in FIGS. 1 and 2. For example, in some aspects, the communication manager 2608 may be configured to perform one or more of the functions described as being performed by the communication manager 140. In some aspects, the communication manager 2608 may include the reception component 2602 and/or the transmission component 2604. The communication manager 2608 may include a DRX component 2610 and/or a resource component 2612, among other examples.

In some aspects, the apparatus 2600 may be configured to perform one or more operations described herein in connection with FIGS. 1-18. Additionally, or alternatively, the apparatus 2600 may be configured to perform one or more processes described herein, such as process 2000 of FIG. 20, process 2100 of FIG. 21, process 2200 of FIG. 22, or a combination thereof. In some aspects, the apparatus 2600 and/or one or more components shown in FIG. 26 may include one or more components of the UE described in connection with FIG. 2. Additionally, or alternatively, one or more components shown in FIG. 26 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2602 may receive communications, such as reference signals, control information, data communications, or a combination thereof, from the apparatus 2606. The reception component 2602 may provide received communications to one or more other components of the apparatus 2600. In some aspects, the reception component 2602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2600. In some aspects, the reception component 2602 may include one or more antennas, a modem, a demodulator, a MIMO detector, a receive processor, a controller/processor, a memory, or a combination thereof, of the UE described in connection with FIG. 2.

The transmission component 2604 may transmit communications, such as reference signals, control information, data communications, or a combination thereof, to the apparatus 2606. In some aspects, one or more other components of the apparatus 2600 may generate communications and may provide the generated communications to the transmission component 2604 for transmission to the apparatus 2606. In some aspects, the transmission component 2604 may perform signal processing on the generated communications (such as filtering, amplification, modulation, digital-to-analog conversion, multiplexing, interleaving, mapping, or encoding, among other examples), and may transmit the processed signals to the apparatus 2606. In some aspects, the transmission component 2604 may include one or more antennas, a modem, a modulator, a transmit MIMO processor, a transmit processor, a controller/processor, a memory, or a combination thereof, of the UE described in connection with FIG. 2. In some aspects, the transmission component 2604 may be co-located with the reception component 2602 in a transceiver.

In some aspects, the DRX component 2610 may cause the apparatus 2600 to sleep in association with a DRX cycle. The DRX component 2610 may wake the apparatus 2600 up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The reception component 2602 may receive a multimedia data burst during the subframe.

The reception component 2602 may receive an indication of the DRX time reference SFN, an indication of the two or more leap cycles, and/or an indication of a timing of the two or more leap cycles.

In some aspects, the DRX component 2610 may cause the apparatus 2600 to sleep in association with a DRX cycle. The DRX component 2610 may wake the apparatus 2600 up, starting at a subframe, based at least in part on a specified time offset that is added to an on duration of the DRX cycle based at least in part on a DRX cycle number of the DRX cycle and a DRX time reference SFN, where the specified time offset is based at least in part on a periodicity of multimedia data bursts, and where the DRX cycle number is based at least in part on the specified time offset. The reception component 2602 may receive a multimedia data burst during the subframe.

In some aspects, the resource component 2612 may cause the apparatus 2600 to sleep in association with a resource cycle. The resource component 2612 may wake the apparatus 2600 up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset. The reception component 2602 may receive a multimedia data burst during the subframe.

The number and arrangement of components shown in FIG. 26 are provided as an example. In practice, there may be additional components, fewer components, different components, or differently arranged components than those shown in FIG. 26. Furthermore, two or more components shown in FIG. 26 may be implemented within a single component, or a single component shown in FIG. 26 may be implemented as multiple, distributed components. Additionally, or alternatively, a set of (one or more) components shown in FIG. 26 may perform one or more functions described as being performed by another set of components shown in FIG. 26.

Figure 27:
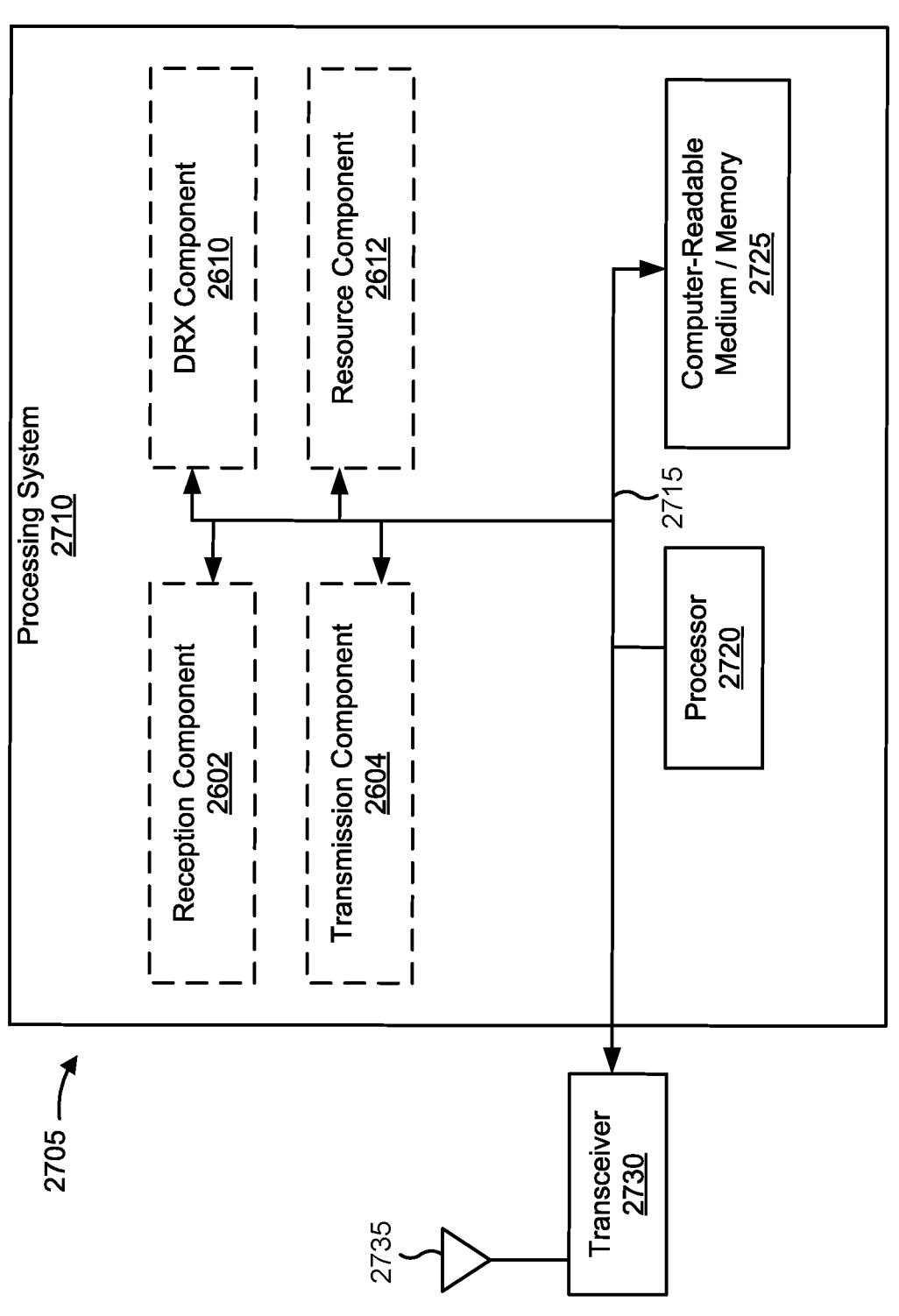
FIG. 27 is a diagram illustrating an example of a hardware implementation for an apparatus employing a processing system.

FIG. 27 is a diagram illustrating an example 2700 of a hardware implementation for an apparatus 2705 employing a processing system 2710. The apparatus 2705 may be a UE (e.g., UE 120, UE 1820).

The processing system 2710 may be implemented with a bus architecture, represented generally by the bus 2715. The bus 2715 may include any number of interconnecting buses and bridges depending on the specific application of the processing system 2710 and the overall design constraints. The bus 2715 links together various circuits including one or more processors and/or hardware components, represented by the processor 2720, the illustrated components, and the computer-readable medium/memory 2725. The bus 2715 may also link various other circuits, such as timing sources, peripherals, voltage regulators, and/or power management circuits.

The processing system 2710 may be coupled to a transceiver 2730. The transceiver 2730 is coupled to one or more antennas 2735. The transceiver 2730 provides a means for communicating with various other apparatuses over a transmission medium. The transceiver 2730 receives a signal from the one or more antennas 2735, extracts information from the received signal, and provides the extracted information to the processing system 2710, specifically the reception component 2602. In addition, the transceiver 2730 receives information from the processing system 2710, specifically the transmission component 2604, and generates a signal to be applied to the one or more antennas 2735 based at least in part on the received information.

The processing system 2710 includes a processor 2720 coupled to a computer-readable medium/memory 2725. The processor 2720 is responsible for general processing, including the execution of software stored on the computer-readable medium/memory 2725. The software, when executed by the processor 2720, causes the processing system 2710 to perform the various functions described herein for any particular apparatus. The computer-readable medium/memory 2725 may also be used for storing data that is manipulated by the processor 2720 when executing software. The processing system further includes at least one of the illustrated components. The components may be software modules running in the processor 2720, resident/stored in the computer-readable medium/memory 2725, one or more hardware modules coupled to the processor 2720, or some combination thereof.

In some aspects, the processing system 2710 may be a component of the UE 120 and may include the memory 282 and/or at least one of the TX MIMO processor 266, the RX processor 258, and/or the controller/processor 280. In some aspects, the apparatus 2705 for wireless communication includes means for sleeping in association with a DRX cycle and means for waking up, starting at a subframe, based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. The apparatus 2705 includes means for receiving a multimedia data burst during the subframe. In some aspects, the apparatus 2705 includes means for sleeping in association with a DRX cycle; means for waking up, starting at a subframe, based at least in part on a specified time offset that is added to an on duration of the DRX cycle based at least in part on a DRX cycle number of the DRX cycle and a DRX time reference system frame number (SFN), where the specified time offset is based at least in part on a periodicity of multimedia data bursts, and where the DRX cycle number is based at least in part on the specified time offset; and/or means for receiving a multimedia data burst during the subframe. In some aspects, the apparatus 2705 includes means for sleeping in association with a resource cycle; means for waking up, starting at a subframe, based at least in part on a specified time offset that is added to an instance of the resource cycle based at least in part on a resource cycle number of the resource cycle and a length of the resource cycle, where the specified time offset is based at least in part on a periodicity of multimedia data bursts, and where the resource cycle number is based at least in part on the specified time offset; and/or means for receiving a multimedia data burst during the subframe. The aforementioned means may be one or more of the aforementioned components of the apparatus 2600 and/or the processing system 2710 of the apparatus 2705 configured to perform the functions recited by the aforementioned means. As described elsewhere herein, the processing system 2710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 27 is provided as an example. Other examples may differ from what is described in connection with FIG. 27.

Figure 28:
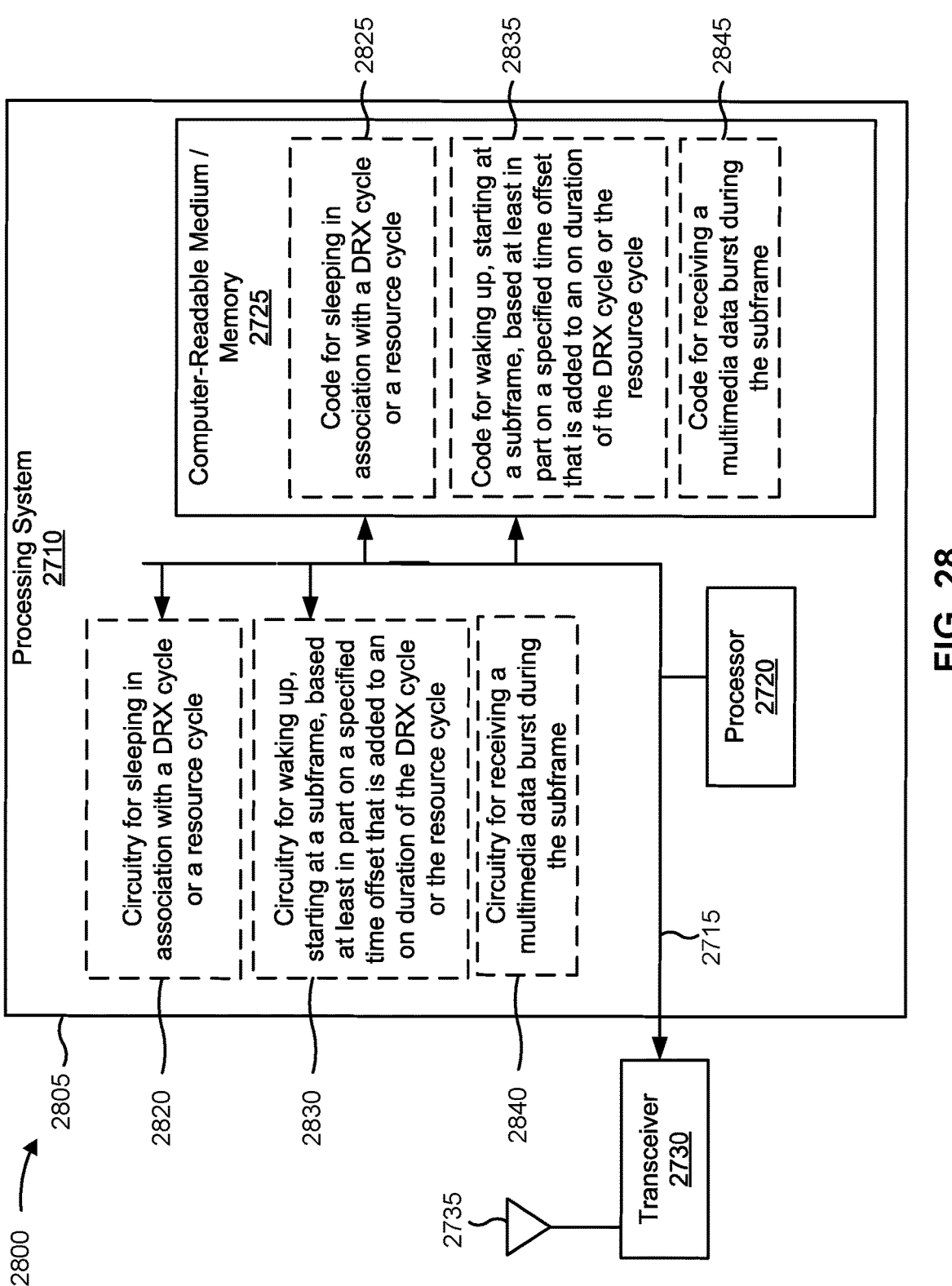
FIG. 28 is a diagram illustrating an example of an implementation of code and circuitry for an apparatus, in accordance with the present disclosure.

FIG. 28 is a diagram illustrating an example 2800 of an implementation of code and circuitry for an apparatus 2805, in accordance with the present disclosure. The apparatus 2805 may be a UE (e.g., a UE 120, UE 1820), or a UE may include the apparatus 2805.

As shown in FIG. 28, the apparatus 2805 may include circuitry for sleeping in association with a DRX cycle or a resource cycle (circuitry 2820). For example, the circuitry 2820 may enable the apparatus 2805 to sleep in association with a DRX cycle or a resource cycle.

As shown in FIG. 28, the apparatus 2805 may include, stored in computer-readable medium 2725, code for sleeping in association with a DRX cycle or a resource cycle (code 2825). For example, the code 2825, when executed by processor 2720, may cause processor 2720 to cause transceiver 2730 to sleep in association with a DRX cycle or a resource cycle.

As shown in FIG. 28, the apparatus 2805 may include circuitry for waking up, starting at a subframe, based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle number is based at least in part on the specified time offset (circuitry 2830). For example, the circuitry 2830 may enable the apparatus 2805 to wake up, starting at a subframe, based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset.

As shown in FIG. 28, the apparatus 2805 may include, stored in computer-readable medium 2725, code for waking up, starting at a subframe, based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset (code 2835). For example, the code 2835, when executed by processor 2720, may cause processor 2720 to cause transceiver 2730 to wake up, starting at a subframe, based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset.

As shown in FIG. 28, the apparatus 2805 may include circuitry for receiving a multimedia data burst during the subframe. For example, the circuitry 2840 may enable the apparatus 2805 to receive a multimedia data burst during the subframe.

As shown in FIG. 28, the apparatus 2805 may include, stored in computer-readable medium 2725, code for receiving a multimedia data burst during the subframe. For example, the code 2845, when executed by processor 2720, may cause processor 2720 to cause transceiver 2730 to receive a multimedia data burst during the subframe.

FIG. 28 is provided as an example. Other examples may differ from what is described in connection with FIG. 28.

Figure 29:
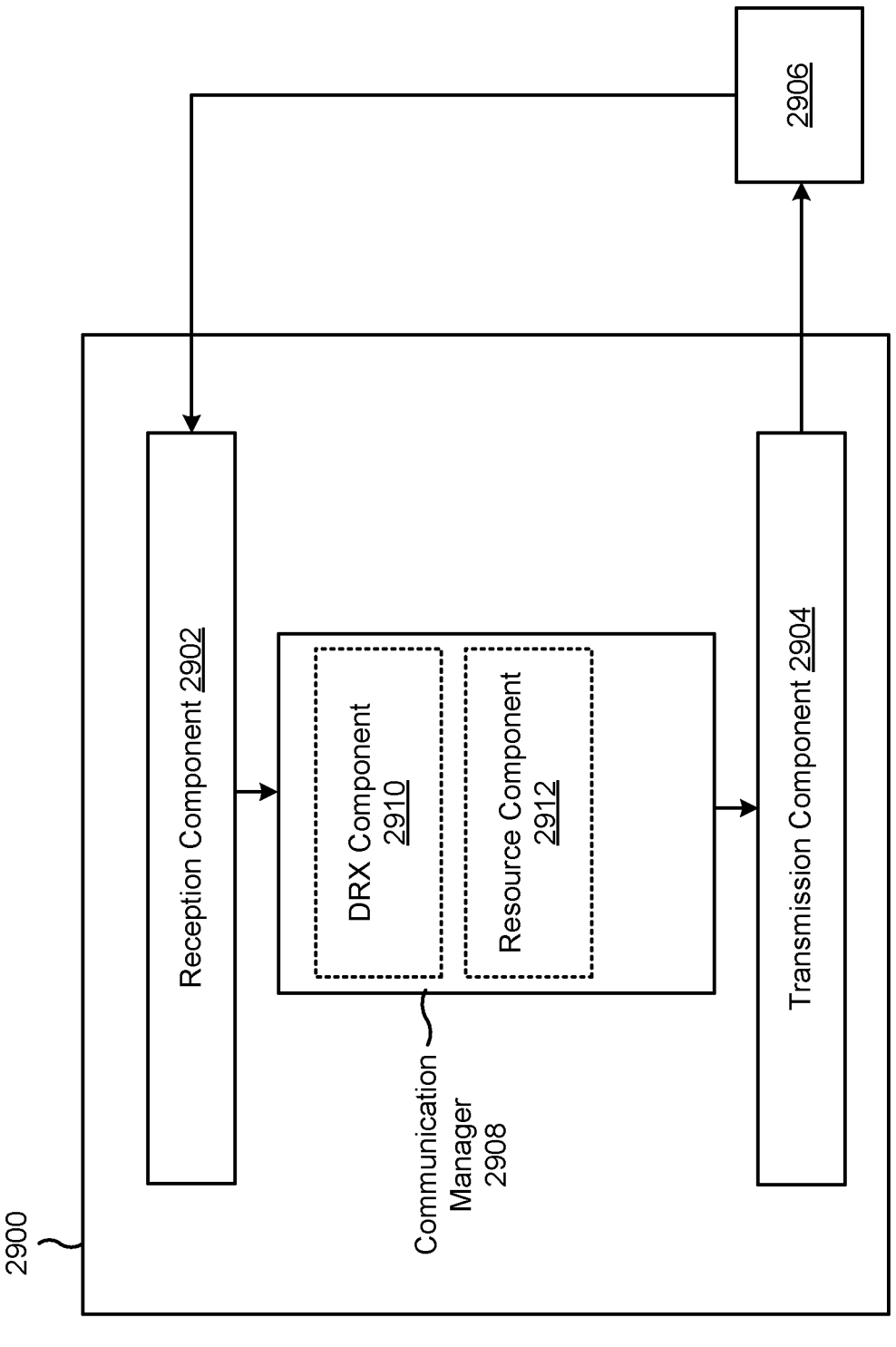
FIG. 29 is a block diagram of an example apparatus for wireless communication, in accordance with the present disclosure.

FIG. 29 is a diagram of an example apparatus 2900 for wireless communication, in accordance with the present disclosure. The apparatus 2900 may be a network entity (e.g., base station 110, network entity 1810), or a network entity may include the apparatus 2900. In some aspects, the apparatus 2900 includes a reception component 2902 and a transmission component 2904, which may be in communication with one another (for example, via one or more buses and/or one or more other components). As shown, the apparatus 2900 may communicate with another apparatus 2906 (such as a UE, a base station, or another wireless communication device) using the reception component 2902 and the transmission component 2904. As further shown, the apparatus 2900 may include the communication manager 2908. The communication manager 2908 may control and/or otherwise manage one or more operations of the reception component 2902 and/or the transmission component 2904. In some aspects, the communication manager 2908 may include one or more antennas, a modem, a controller/processor, a memory, or a combination thereof, of the network entity described in connection with FIG. 2. The communication manager 2908 may be, or be similar to, the communication manager 150 depicted in FIGS. 1 and 2. For example, in some aspects, the communication manager 2908 may be configured to perform one or more of the functions described as being performed by the communication manager 150. In some aspects, the communication manager 2908 may include the reception component 2902 and/or the transmission component 2904. The communication manager 2908 may include a DRX component 2910 and/or a resource component 2912, among other examples.

In some aspects, the apparatus 2900 may be configured to perform one or more operations described herein in connection with FIGS. 1-18. Additionally, or alternatively, the apparatus 2900 may be configured to perform one or more processes described herein, such as process 2300 of FIG. 23, process 2400 of FIG. 24, process 2500 of FIG. 25, or a combination thereof. In some aspects, the apparatus 2900 and/or one or more components shown in FIG. 29 may include one or more components of the network entity described in connection with FIG. 2. Additionally, or alternatively, one or more components shown in FIG. 29 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2902 may receive communications, such as reference signals, control information, data communications, or a combination thereof, from the apparatus 2906. The reception component 2902 may provide received communications to one or more other components of the apparatus 2900. In some aspects, the reception component 2902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2900. In some aspects, the reception component 2902 may include one or more antennas, a modem, a demodulator, a MIMO detector, a receive processor, a controller/processor, a memory, or a combination thereof, of the network entity described in connection with FIG. 2.

The transmission component 2904 may transmit communications, such as reference signals, control information, data communications, or a combination thereof, to the apparatus 2906. In some aspects, one or more other components of the apparatus 2900 may generate communications and may provide the generated communications to the transmission component 2904 for transmission to the apparatus 2906. In some aspects, the transmission component 2904 may perform signal processing on the generated communications (such as filtering, amplification, modulation, digital-to-analog conversion, multiplexing, interleaving, mapping, or encoding, among other examples), and may transmit the processed signals to the apparatus 2906. In some aspects, the transmission component 2904 may include one or more antennas, a modem, a modulator, a transmit MIMO processor, a transmit processor, a controller/processor, a memory, or a combination thereof, of the network entity described in connection with FIG. 2. In some aspects, the transmission component 2904 may be co-located with the reception component 2902 in a transceiver.

In some aspects, the DRX component 2910 may prepare for communication with a UE 120 according to a DRX cycle. The transmission component 2904 may transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

The transmission component 2904 may transmit an indication of the DRX time reference SFN, an indication of the two or more leap cycles, and/or an indication of a timing of the two or more leap cycles.

In some aspects, the DRX component 2910 may prepare for communication with a UE according to a DRX cycle. The transmission component 2904 may transmit, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset.

In some aspects, the resource component 2912 may prepare for communication with a UE according to a resource cycle. The transmission component 2904 may transmit, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset.

The number and arrangement of components shown in FIG. 29 are provided as an example. In practice, there may be additional components, fewer components, different components, or differently arranged components than those shown in FIG. 29. Furthermore, two or more components shown in FIG. 29 may be implemented within a single component, or a single component shown in FIG. 29 may be implemented as multiple, distributed components. Additionally, or alternatively, a set of (one or more) components shown in FIG. 29 may perform one or more functions described as being performed by another set of components shown in FIG. 29.

Figure 30:
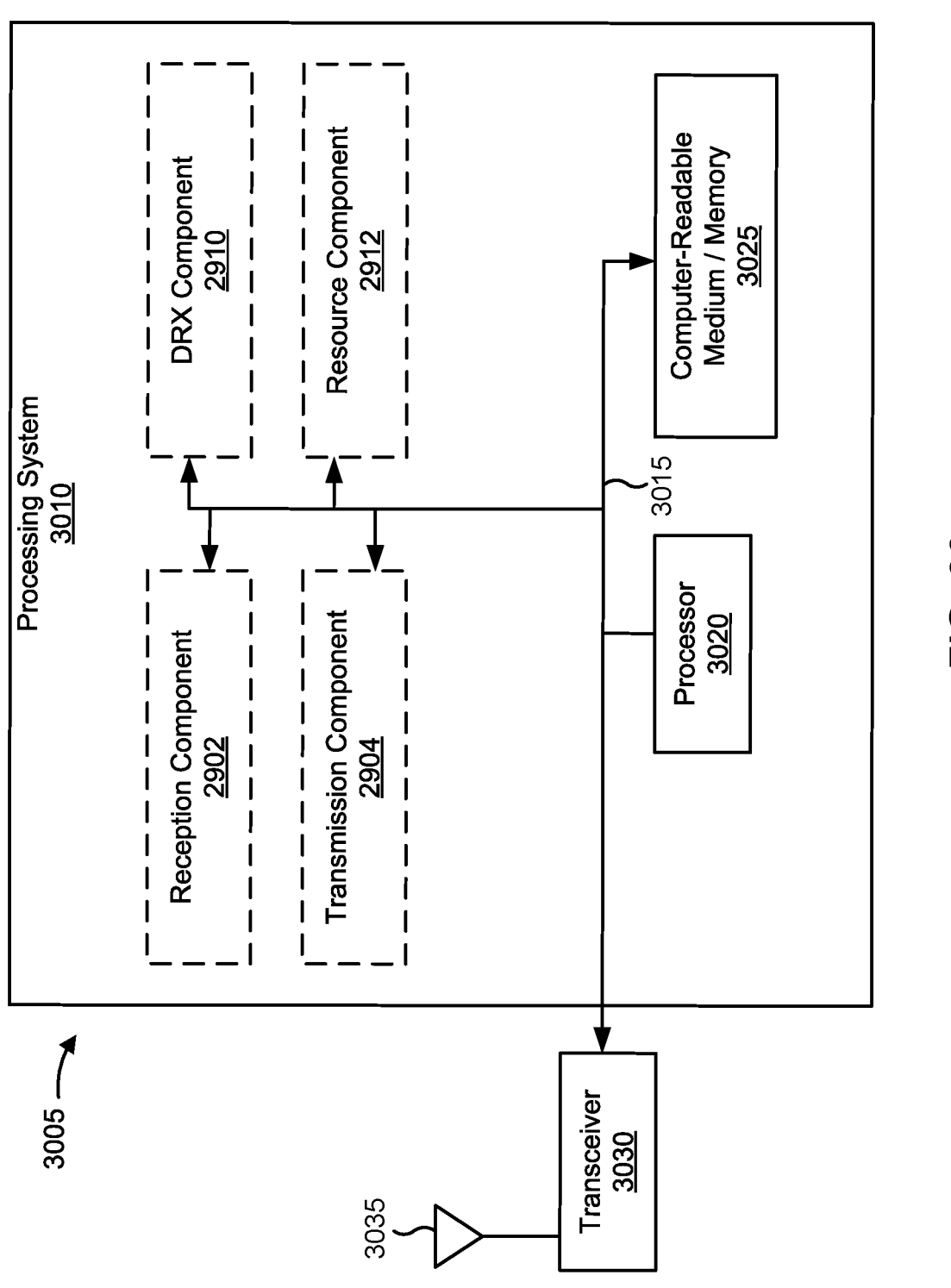
FIG. 30 is a diagram illustrating an example of a hardware implementation for an apparatus employing a processing system.

FIG. 30 is a diagram illustrating an example 3000 of a hardware implementation for an apparatus 3005 employing a processing system 3010. The apparatus 3005 may be a network entity (e.g., base station 110, network entity 1810).

The processing system 3010 may be implemented with a bus architecture, represented generally by the bus 3015. The bus 3015 may include any number of interconnecting buses and bridges depending on the specific application of the processing system 3010 and the overall design constraints. The bus 3015 links together various circuits including one or more processors and/or hardware components, represented by the processor 3020, the illustrated components, and the computer-readable medium/memory 3025. The bus 3015 may also link various other circuits, such as timing sources, peripherals, voltage regulators, and/or power management circuits.

The processing system 3010 may be coupled to a transceiver 3030. The transceiver 3030 is coupled to one or more antennas 3035. The transceiver 3030 provides a means for communicating with various other apparatuses over a transmission medium. The transceiver 3030 receives a signal from the one or more antennas 3035, extracts information from the received signal, and provides the extracted information to the processing system 3010, specifically the reception component 2902. In addition, the transceiver 3030 receives information from the processing system 3010, specifically the transmission component 2904, and generates a signal to be applied to the one or more antennas 3035 based at least in part on the received information.

The processing system 3010 includes a processor 3020 coupled to a computer-readable medium/memory 3025. The processor 3020 is responsible for general processing, including the execution of software stored on the computer-readable medium/memory 3025. The software, when executed by the processor 3020, causes the processing system 3010 to perform the various functions described herein for any particular apparatus. The computer-readable medium/memory 3025 may also be used for storing data that is manipulated by the processor 3020 when executing software. The processing system further includes at least one of the illustrated components. The components may be software modules running in the processor 3020, resident/stored in the computer-readable medium/memory 3025, one or more hardware modules coupled to the processor 3020, or some combination thereof.

In some aspects, the processing system 3010 may be a component of the UE 120 and may include the memory 282 and/or at least one of the TX MIMO processor 266, the RX processor 258, and/or the controller/processor 280. In some aspects, the apparatus 3005 for wireless communication includes means for preparing for communication with a UE according to a DRX cycle; and/or means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. In some aspects, the apparatus 3005 may include means for preparing for communication with a UE according to a DRX cycle; and/or means for transmitting, starting at a subframe, a data burst based at least in part on a specified time offset that is added to an on duration of the DRX cycle based at least in part on a DRX cycle number of the DRX cycle and a length of the DRX cycle, where the specified time offset is based at least in part on a periodicity of multimedia data bursts, and where the DRX cycle number is based at least in part on the specified time offset. In some aspects, the apparatus 3005 may include means for preparing for communication with a UE according to a resource cycle; and/or means for transmitting, starting at a subframe, a data burst based at least in part on a specified time offset that is added to an instance of the resource cycle based at least in part on a resource cycle number of the resource cycle and a length of the resource cycle, where the specified time offset is based at least in part on a periodicity of multimedia data bursts, where the resource cycle number is based at least in part on the specified time offset, and where the resource cycle number is based at least in part on the specified time offset. The aforementioned means may be one or more of the aforementioned components of the apparatus 2900 and/or the processing system 3010 of the apparatus 3005 configured to perform the functions recited by the aforementioned means. As described elsewhere herein, the processing system 3010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 30 is provided as an example. Other examples may differ from what is described in connection with FIG. 30.

Figure 31:
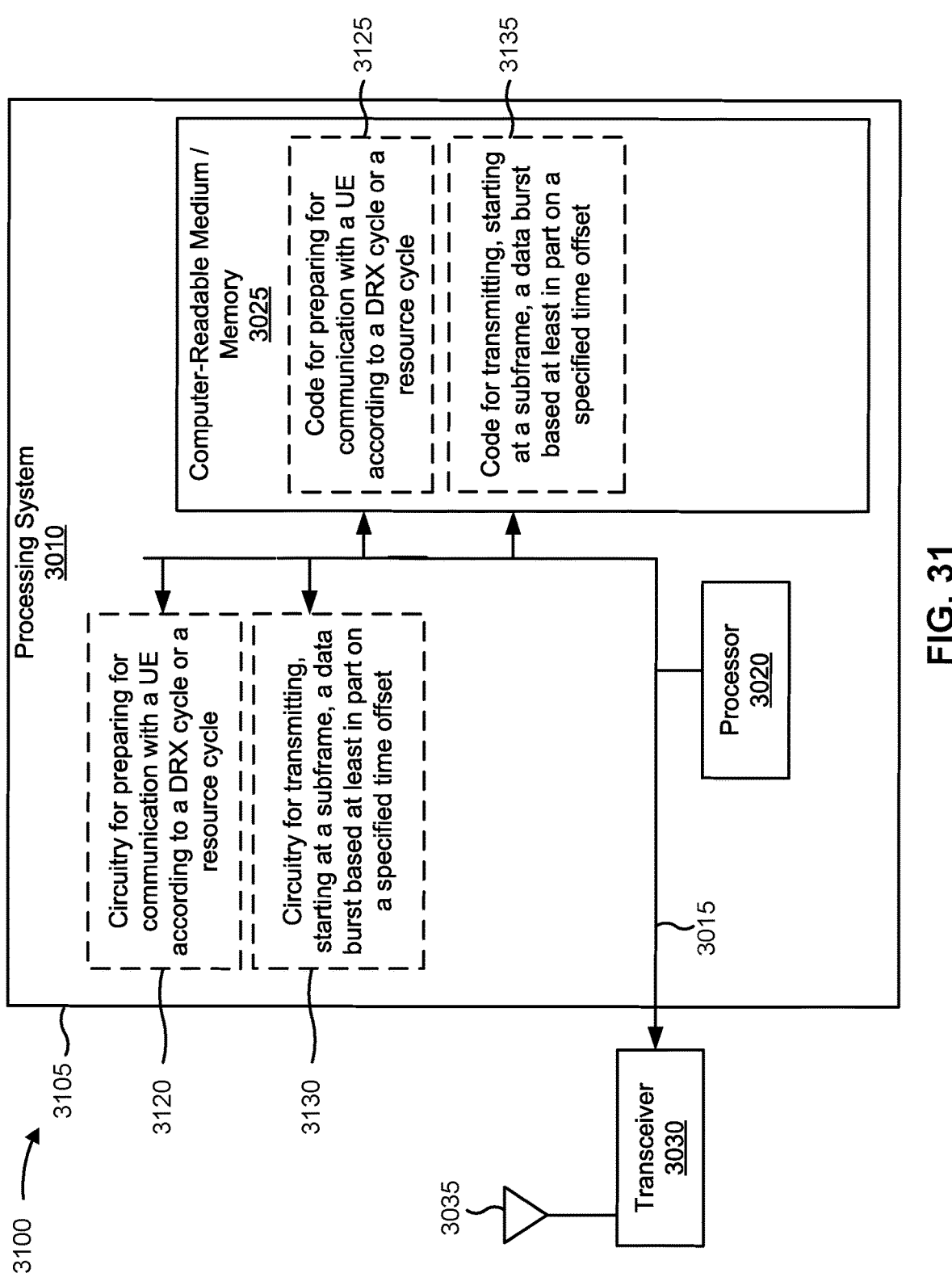
FIG. 31 is a diagram illustrating an example of an implementation of code and circuitry for an apparatus, in accordance with the present disclosure.

FIG. 31 is a diagram illustrating an example 3100 of an implementation of code and circuitry for an apparatus 3105, in accordance with the present disclosure. The apparatus 3105 may be a network entity (e.g., base station 110, network entity 1810), or a network entity may include the apparatus 3105.

As shown in FIG. 31, the apparatus 3105 may include circuitry for preparing for communication with a UE according to a DRX cycle or a resource cycle (circuitry 3120). For example, the circuitry 3120 may enable the apparatus 3105 to prepare for communication with a UE according to a DRX cycle or a resource cycle.

As shown in FIG. 31, the apparatus 3105 may include, stored in computer-readable medium 3025, code for preparing for communication with a UE according to a DRX cycle or a resource cycle (code 3125). For example, the code 3125, when executed by processor 3020, may cause processor 3020 to prepare for communication with a UE according to a DRX cycle or a resource cycle.

As shown in FIG. 31, the apparatus 3105 may include circuitry for transmitting, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset (circuitry 3130). For example, the circuitry 3130 may enable the apparatus 3105 to transmit, starting at a subframe, a data burst based at least in part on a specified time offset that is added to an on duration of the DRX cycle (or resource cycle)

based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset.

As shown in FIG. 31, the apparatus 3105 may include, stored in computer-readable medium 3025, code for transmitting, starting at a subframe, a data burst based at least in part on a specified time offset that is added to an on duration of the DRX cycle (or resource cycle) based at least in part on a DRX (or resource cycle) cycle number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset (code 3135). For example, the code 3135, when executed by processor 3020, may cause processor 3020 to cause transceiver 3030 to transmit, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle number is based at least in part on the specified time offset.

As shown in FIG. 31, the apparatus 3105 may include circuitry for transmitting, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset (circuitry 3130). For example, the circuitry 3130 may enable the apparatus 3105 to transmit, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset.

As shown in FIG. 31, the apparatus 3105 may include, stored in computer-readable medium 3025, code for transmitting, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset (code 3135). For example, the code 3135, when executed by processor 3020, may cause processor 3020 to cause transceiver 3030 to transmit, starting at a subframe, a data burst based at least in part on a specified time offset that is added to an on duration of the DRX cycle (or resource cycle) based at least in part on a DRX cycle (or resource cycle) number of the DRX cycle (or resource cycle) and a length of the DRX cycle (or resource cycle), where the specified time offset is based at least in part on a periodicity of multimedia data bursts, and where the DRX cycle (or resource cycle) number is based at least in part on the specified time offset.

FIG. 31 is provided as an example. Other examples may differ from what is described in connection with FIG. 31.

FIG. 32 is a diagram illustrating an example 3200 of leap offset patterns, in accordance with the present disclosure.

In some aspects, a configuration may involve multiple DRX cycles. A DRX cycle may be a DRX long cycle. Example 3200 shows DRX long cycles of 16 ms for fps XR traffic. Example 3200 shows a DRX start offset of 2 ms. Three DRX cycles total 50 ms.

A DRX cycle may include a DRX leap offset, such as 1 ms. A leap offset of 1 ms added to the DRX long cycle of 16 ms is a DRX cycle of 17 ms. In some aspects, a first leap offset pattern 3202 includes a leap offset pattern of (0 ms, 1 ms, 1 ms). The DRX cycle lengths are thus 16 ms, 17 ms, and 17 ms for a total of 50 ms. The first leap offset pattern 3202 starts with a DRX cycle of 16 ms and thus the UE is waking up before XR traffic arrivals. In some aspects, a first leap offset pattern 3204 includes a leap offset pattern of (1 ms, 1 ms, 0 ms). The DRX cycle lengths are thus 17 ms, 17 ms, and 16 ms. The first leap offset pattern 3204 starts with a DRX cycle of 17 ms and thus the UE is waking up after XR traffic arrivals. A UE may wake up further based at least in part on an accumulated DRX offset that includes a DRX offset that is equal to a DRX start offset, such as drx-Offset (0)=drx-StartOffset and drx-Offset(n)=X(n−1)+drx-LeapOffset {(n−1) mod N}, m≥1. In some aspects, the UE may sequentially search the next nth DRX cycle, and the UE may wake up for a subframe if a subframe index [(SFN×10)+subframe number]={drx-LongCycle×n+drx-Offset(n)+10×drx-timeReferenceSFN} modulo 10240. In some aspects, the UE may sequentially search the next nth DRX cycle, and the UE may wake up for a subframe if (10240×m)+[(SFN×10)+subframe number]={drx-LongCycle×n+drx-Offset(n)+10×drx-timeReferenceSFN} modulo 10240.

As indicated above, FIG. 32 is provided as an example. Other examples may differ from what is described with regard to FIG. 32.

FIG. 33A is a diagram illustrating an example 3300 of subframe indices, in accordance with the present disclosure.

Example 3300 shows a table that includes leap offsets used for subframe indices. The subframe indices may correspond to DRX cycle indices. For example, for index n=1, a subframe index ([SFN×10]+subframe number])=16 and the leap offset=0. For index n=2, a subframe index=33 and the leap offset=1. For index n=3, a subframe index=50 and the leap offset=1. The leap offset pattern is (0 ms, 1 ms, 1 ms).

As indicated above, FIG. 33A is provided as an example. Other examples may differ from what is described with regard to FIG. 33A.

FIG. 33B is a diagram illustrating an example 3302 of subframe indices, in accordance with the present disclosure.

As described in connection with FIG. 15, a sequential search DRX cycle formula (e.g., for searching the next nth DRX cycle) may involve a rational number for drx-Short-Cycle, or a DRX cycle. A rational number (e.g., A/B) may represent a non-integer value for drx-ShortCycle. In an example where drx-ShortCadence=60 fps or Hz (DRX cycles of 16 ms, 16 ms, and 17 ms), drx-LongCycle=1000/60=50/3 (16and2Over3). The DRX start offset may be 0 ms, and the subframe indices may start right before XR data bursts.

In some aspects, a formula for a non-integer DRX cycle may involve a modulo with a hyper frame length (10240)+a rational number DRX cycle. The formula may include a floor operation that cause the DRX cycle align with the subframe granularity (e.g., 1 ms). A ceiling operation may also be used instead of a floor operation. The formula may be [(SFN×numberOfSubframesPerFrame)+subframe number in the frame]=[floor(DRX long cycle×n)+the DRX start offset+(10×the DRX time reference SFN] modulo 10240. The number of subframe per frame may be 10, and a DRX time reference SFN may be 0 or 512 (1 bit). Example 3302 in FIG. 33B shows values for subframe indices. The table values may work when the subframe index, such as (SFN× 10)+subframe number, is greater than 10240.

As indicated above, FIG. 33B is provided as an example. Other examples may differ from what is described with regard to FIG. 33B.

FIG. 34 is a diagram illustrating an example 3400 of backward compatibility, in accordance with the present disclosure.

In some aspects, an enhanced DRX formula solution for the SFN wraparound problem, such as adding 10240×m in a DRX formula, may not be compatible with a legacy DRX formula for a certain DRX cycles. Some DRX short cycles may not be compatible with an SFN wraparound solution, such as 3 ms, 6 ms, 7 ms, 14 ms, 30 ms, and 35 ms. For example, for drx-ShortCycle=6 ms (10240/6=1706.6666). DRX long cycles of 60 ms and 70 ms may also not be backward compatible. The legacy DRX formula and an enhanced DRX formula work differently under these DRX cycles.

Example 3400 shows a first table 3402 where DRX short cycles have backward compatibility ("O") or do not have backward compatibility ("X"). Example 3400 shows a first table 3404 where DRX long cycles have backward compatibility ("O") or do not have backward compatibility ("X").

As indicated above, FIG. 34 is provided as an example. Other examples may differ from what is described with regard to FIG. 34.

Figure 35:
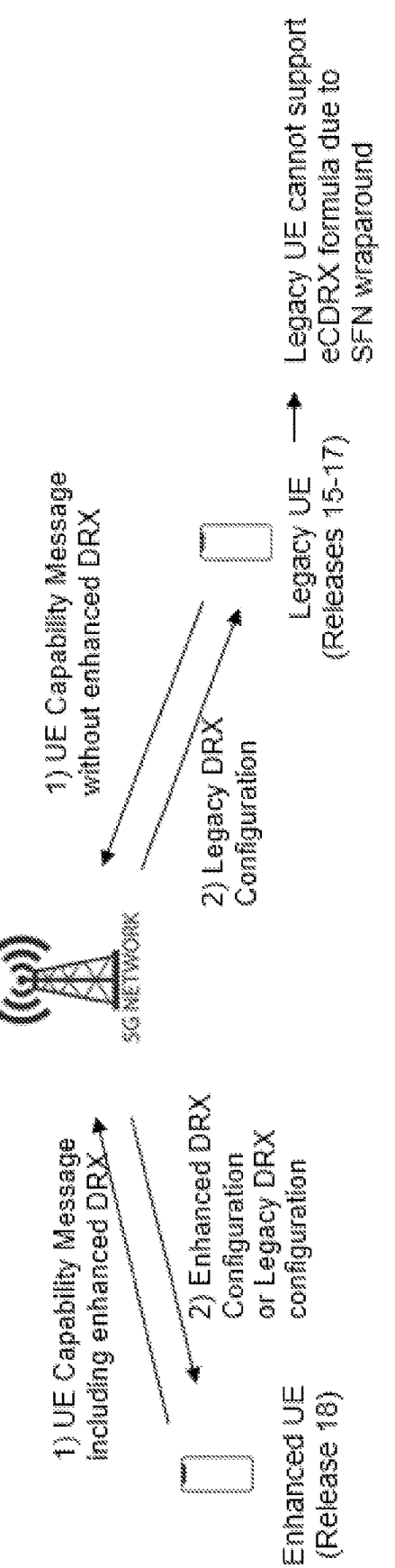
FIG. 35 is a diagram illustrating an example of handling backward compatibility, in accordance with the present disclosure.

FIG. 35 is a diagram illustrating an example 3500 of handling backward compatibility, in accordance with the present disclosure.

Example 3500 shows that enhanced UEs, configured to operate with 3GPP standard Release 18 or later, that can operate using a solution for the SFN wraparound problem and legacy UEs, configured to operate with 3GPP standard Releases 15-17, that cannot operate using a solution for the SFN wraparound problem. The solution may involve an SFN wraparound offset that accounts for accumulated lengths of a hyper frame.

In some aspects, the UE may transmit, in a capability message, an indication of a capability of the UE to use an SFN wrapround offset to address the SFN wrapround problem. Enhanced UEs may indicate the capability, while legacy UEs may not indicate the capability. In some aspects, the indication may be an information element in a capability message. The UE may receive a legacy DRX configuration that does not use the SFN wraparound offset or an enhanced DRX configuration that does use the SFN wraparound offset.

As indicated above, FIG. 35 is provided as an example. Other examples may differ from what is described with regard to FIG. 35.

Figure 36:
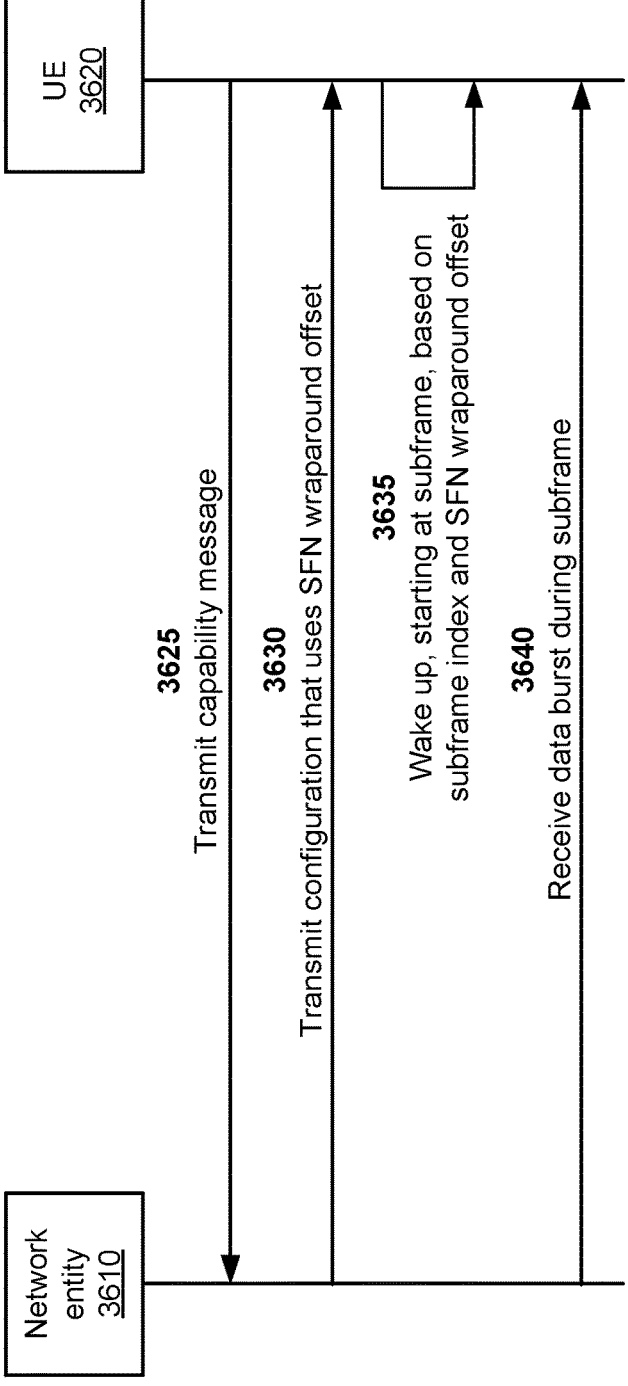
FIG. 36 is a diagram illustrating an example associated with using an SFN wraparound offset, in accordance with the present disclosure.

FIG. 36 is a diagram illustrating an example 3600 associated with using an SFN wraparound offset, in accordance with the present disclosure. As shown in FIG. 36, a network entity 3610 (e.g., base station 110) may communicate with a UE 3620 (e.g., UE 120). The network entity 3610 and the UE 3620 may be part of a wireless network (e.g., wireless network 100). The UE 3620 may be an enhanced UE that is capable of using an SFN wrapround offset that accounts for accumulated lengths of a hyper frame.

As shown by reference number 3625, the UE 3620 may transmit, in a capability message, an indication of a capability of the UE 3620 to use the SFN wrapround offset. As shown by reference number 3630, the network entity 3610 may transmit, based at least in part on the capability message, a configuration that uses the SFN wraparound offset (for enhanced UEs).

In some aspects, as shown by reference number 3635, the UE may wake up, starting at a subframe, based at least in part on a subframe index of a resource cycle (e.g., DRX cycle) and an SFN wraparound offset that accounts for accumulated lengths of a hyper frame. The SFN wraparound offset may be equal to a length of the hyper frame×m. The length of the hyper frame may be equal to 10240. As shown by reference number 3640, the UE may receive a data burst (e.g., multimedia data burst) during the subframe.

In some aspects, the UE 3620 may wake up if the subframe index is for a subframe for which the UE 3620 is to wake up, taking into account the SFN wraparound offset. For example, the UE 3620 may wake up if [(SFN×10)+ subframe number+10240×m×k] modulo (drx-ShortCycle)= [(drx-StartOffset(i))+(drx-timeReferenceSFN×10)] modulo (drx-ShortCycle). Since the SFN wraparound offset (10240× m) is activated for the UE 3620, the value of k is 1. In some aspects, the value m=m+1 whenever the SFN becomes the reference SFN value (drx-timeReferenceSFN is 0 or 512). That is, the subframe index may be equal to [(10×an SFN of a frame comprising the subframe)+a subframe number of the subframe], where m updates to m+1 when the SFN returns to 0 (zero) or m updates to m+1 when the SFN returns to the time reference SFN, which may be 0 or 512. In some aspects, the UE may wake up if (the subframe index+the SFN wraparound offset) modulo a length of the resource cycle is equal to [(a starting offset+(the time reference SFN×10)] modulo the length of the resource cycle. The starting offset may be drx-StartOffset.

In some aspects, the network entity 3610 may transmit an indication of k=0 and drx-timeReferenceSFN=0 for a legacy DRX operation, and an indication of k=1 for an enhanced DRX operation. By setting k=0, the network entity 3610 may support the legacy UE, and by setting k=1, the network entity may support the enhanced UE for XR. The network entity 3610 may set the value k in the configuration, by RRC signaling, DCI, or a MAC CE. In some aspects, m may increase by 1 (m=m+1) when SFN becomes the time reference SFN value and the network entity 3610 configures the enhanced DRX feature. Otherwise, m may not increase and is fixed to 0 (m=0).

In some aspects, the UE 3620 may not alter the enhanced DRX formula, and the network entity 3610 does not configure the DRX cycles which are not backward compatible to the legacy UE. For example, the configuration may indicate for which DRX short cycles and for which DRX long cycles the SFN wraparound offset is applicable or not applicable. The UE 3620 may then apply the SFN wraparound offset for applicable DRX short cycles and DRX long cycles and not apply the SFN wraparound offset for non-applicable DRX short cycles and DRX long cycles.

As indicated above, FIG. 36 is provided as an example. Other examples may differ from what is described with regard to FIG. 36.

Figure 37A:
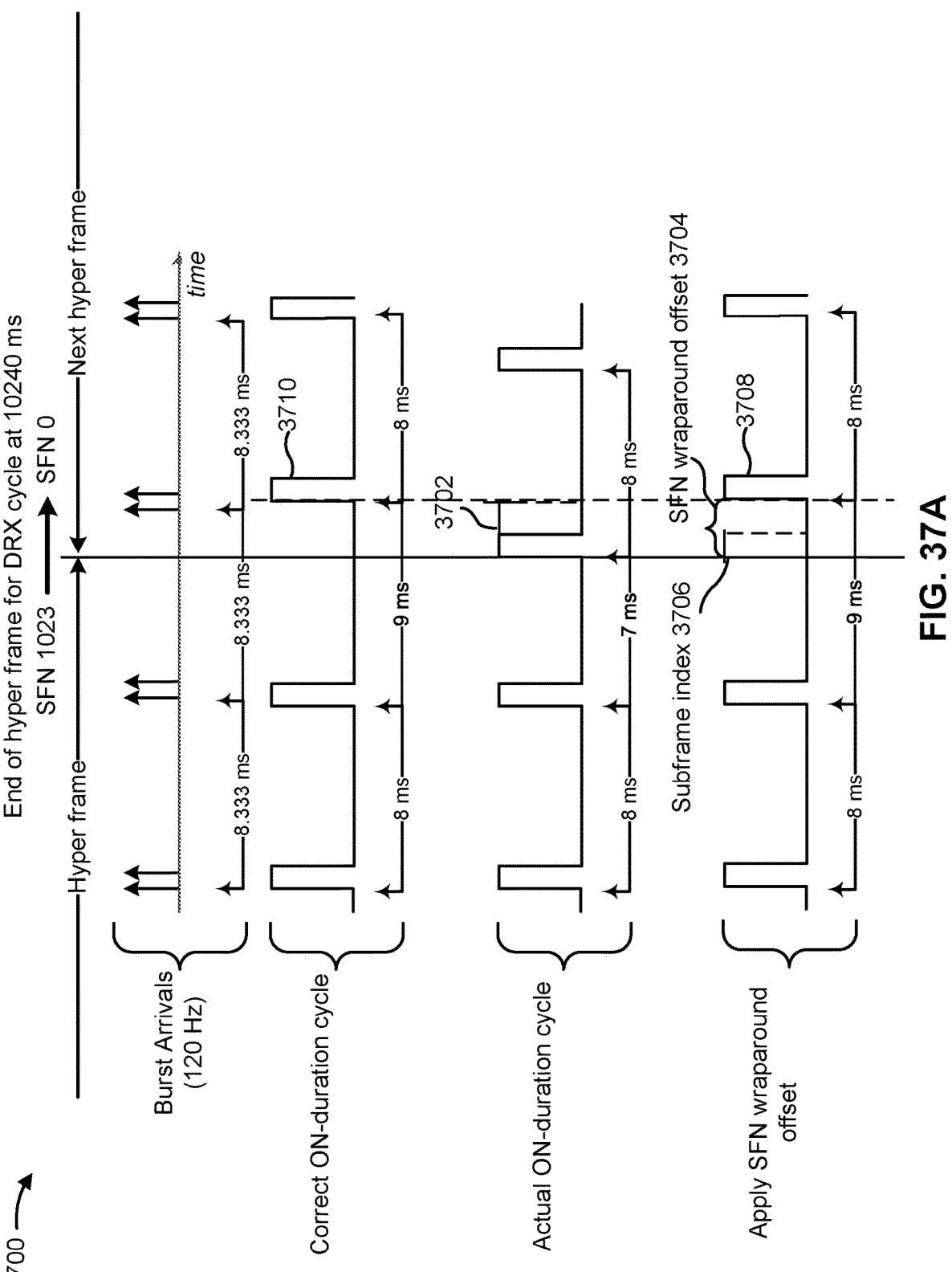
FIG. 37A is a diagram illustrating an example of using an SFN wraparound offset, in accordance with the present disclosure.

FIG. 37A is a diagram illustrating an example 3700 of using an SFN wraparound offset, in accordance with the present disclosure.

Example 3700 shows multimedia data burst arrivals that are arriving at a rate of 120 Hz. In example 3700, drx-StartOffset is set to 0. A UE may configure a DRX cycle for a cadence of data bursts, such as every 8.33 ms at 120 Hz, but the cadence of the data bursts may be associated with a periodicity of 1000 ms. With a multimedia periodicity of 1000 ms and a DRX cycle of 10,240 ms (1024 SFNs per hyper frame at ms each), the hyper frame of the DRX may be misaligned with a frame of a multimedia server every 10.24 seconds. There is a drift 3702 of 1.666 ms (2 ms in example 3700) every 10.24 sec (10,240 ms) due to the misalignment between the hyper frame periodicity (10,240 ms) and the multimedia periodicity. In other words, the hyper frame periodicity (10,240 ms) cannot be divided by the multimedia periodicity (Hz, fps). In an example of 120 Hz XR traffic, 10,240 ms/(1000/120) ms=1228.8 frames. The fractional part of 0.8 (or 1−0.8=0.2) is the remaining partial frame at the end of the hyper frame, and this partial frame causes an SFN wraparound problem in the next hyper frame. Other multimedia periodicities result in other quantities of frames that do not align with a quantity of SFNs per hyper frame: 45 Hz (460.8 SFNs), 48 Hz (491.52 SFNs), 60 Hz (614.4 SFNs), or 90 Hz (921.6 SFNs).

Example 3700 shows an end of the hyper frame (at SFN 1023) and a beginning of the next hyper frame (at SFN 0), or when the SFN numbers wrap around (restart or return to 0) for the next hyper frame. When the end of the hyper frame is reached, an ON-duration wake-up condition or formula, such as (SFN*10)+subframe number=0, may select a subframe for an ON-duration that is between data bursts due to the SFN wraparound. Because the subframe may not be aligned with a data burst, the data burst may not be received. This may cause a degradation of communications that could consume additional processing resources and signaling.

By adding the SFN wraparound offset 3704 (e.g., the length of the hyper frame (e.g., 1024)×m) to a subframe index 3706 (e.g., (SFN*10)+subframe number), the subframe 3708 that the UE wakes up at aligns with the correct subframe 3710 that matches the burst arrival time of the XR data. As a result, data is not lost and communications do not degrade. Signaling resources are conserved.

As indicated above, FIG. 37A is provided as an example. Other examples may differ from what is described with regard to FIG. 37A.

Figure 37B:
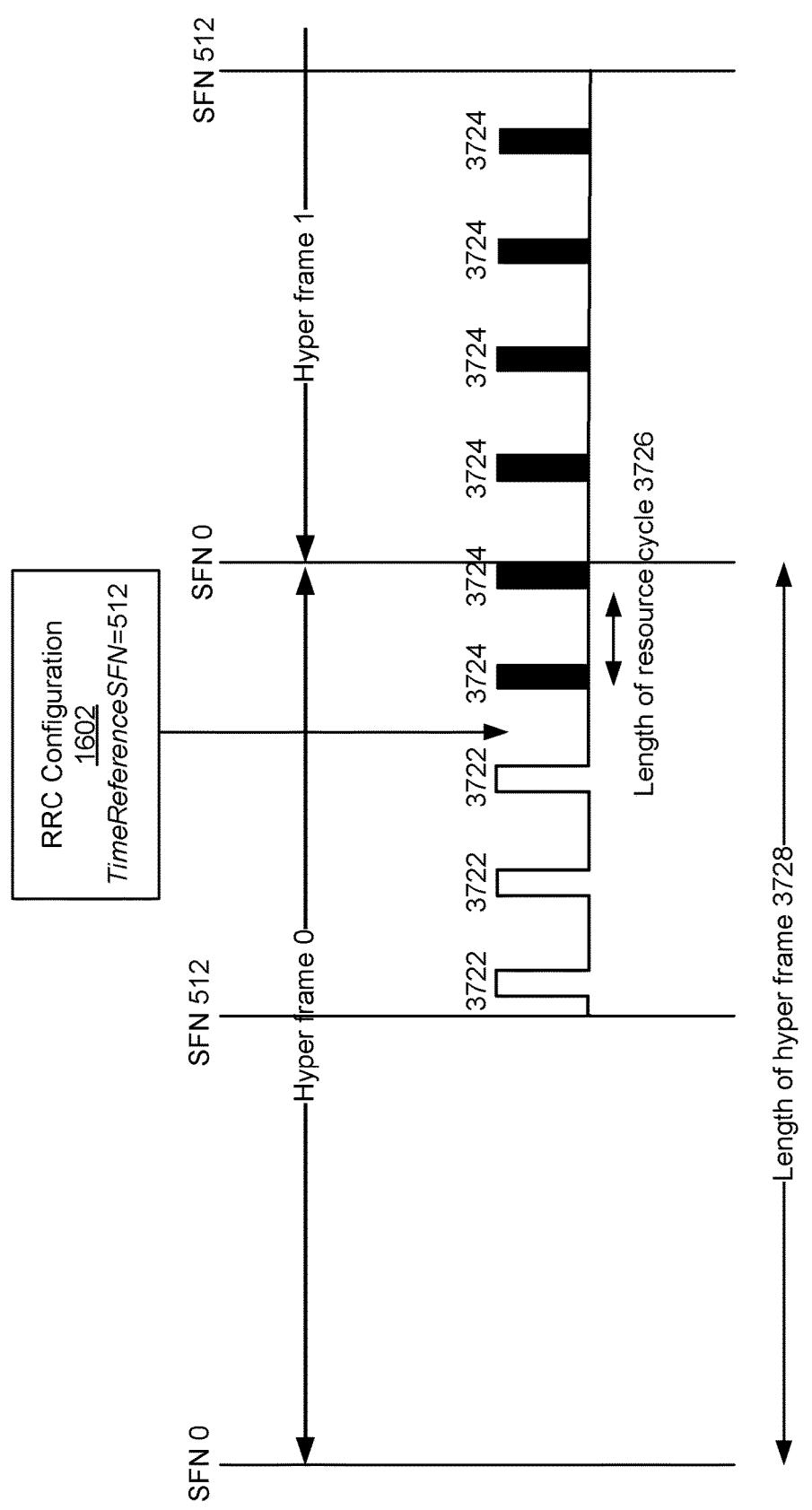
FIG. 37B is a diagram illustrating an example of receiving a configuration for resource cycles, in accordance with the present disclosure.

FIG. 37B is a diagram illustrating an example 3720 of receiving a configuration for resource cycles, in accordance with the present disclosure.

Example 3720 shows that a UE may be operating with resource cycles 3722. The UE may receive a configuration (e.g., RRC configuration 1602 in FIG. 16) for future resource cycles 3724. The RRC configuration 1602 may indicate information about the future resource cycles 3724, such as a length of the resource cycle 3726. The UE may start using the RRC configuration 1602 in a hyper frame based at least in part on when the RRC configuration 1602 is received. The length of the hyper frame 3728 may be 1024 SFNs, for example. However, if the RRC configuration 1602 is received later in a hyper frame (e.g., after SFN 512 of the hyper frame), there may be some ambiguity as to an initial value of m for applying an SFN wraparound offset. The SFN wraparound offset may be equal to (a length of the hyper frame×m). The counter m may be used to determine a size of the SFN wraparound offset. If the initial value of m is not correct, the SFN wraparound offset may not be the right size and communications may degrade if traffic bursts are not received at on-durations of the resource cycle. Degraded communications waste signaling resources and increase latency.

In some aspects, the UE may wake up based at least in part on a time reference SFN. The time reference SFN may indicate when an initial resource cycle starts. For example, the time reference SFN may indicate that a reference timing of an initial resource cycle (e.g., an initial DRX cycle) is SFN 512 (not SFN 0). Even if the RRC reconfiguration 1602 is completed in the next hyper frame (hyper frame n+1), the UE may expect that the initial DRX cycle starts from SFN 512 of hyper frame n. There is no ambiguity around SFN 0, if the RRC configuration 1602 is received by the UE between SFN 512 of hyper frame 0 and SFN 512 of hyper frame 1. Note that a suboptimal transmission time of the RRC configuration 1602 may be lower than 5.12 seconds (half of a hyper frame).

As indicated above, FIG. 37B is provided as an example. Other examples may differ from what is described with regard to FIG. 37B.

FIG. 37C is a diagram illustrating examples 3730 and 3732 of receiving the configuration for resource cycles, in accordance with the present disclosure.

A time reference SFN (e.g., drx-TimeReferenceSFN in eCDRX) may be set to or 512 (e.g., 1-bit RRC message). SFN-GNB may be the SFN when an RRC configuration 1602 with eCDRX is generated by a network entity (e.g., gNB). SFN-UE may be the SFN when the RRC configuration 1602 with eCDRX is successfully received by the UE. The network entity may set the drx-timeReferenceSFN to 0 if 0≤SFN-GNB<512, or set the drx-timeReferenceSFN to 512 if 512≤SFN-GNB<1024. The network entity may set the starting offset value (e.g., drx-StartOffset shown by DRX offset 3734) from the drx-timeReferenceSFN (SFN 0 or SFN 512).

In some aspects, the UE may set the initial value of m to 0, where m increases by 1 whenever SFN becomes the drx-timeReferenceSFN (SFN 0 or SFN 512). As shown by example 3730, m can be set to 0 if drx-timeReferenceSFN=0, regardless of when the UE receives the RRC configuration 1602. As shown by example 3732, m can be set to 0 if drx-timeReferenceSFN=512, regardless of when the UE receives the RRC configuration 1602. According to one or more aspects, the network entity may be provided with 5.12 seconds (enough time) to deliver the RRC configuration 1602. By setting the initial value of m correctly, based at least in part on when the RRC configuration 1602 is received, the UE may apply the correct SFN wraparound offset (e.g., correct because the initial value m is set as described above) and communications may improve when traffic bursts are matched with on-durations of the resource cycle. Improved communications conserve signaling resources and reduce latency.

As indicated above, FIG. 37C provides some examples. Other examples may differ from what is described with regard to FIG. 37C.

FIG. 37D is a diagram illustrating examples 3740 and 3742 of receiving the configuration for resource cycles, in accordance with the present disclosure.

In some aspects, regardless of the time reference SFN (e.g., drx-timeReferenceSFN), the network entity may set the starting offset value (e.g., drx-StartOffset) from SFN=0, and m=0 when the RRC configuration is generated. Counter m may increase by 1 whenever the SFN is wrapped around (SFN returns to 0).

In some aspects, to reduce the computational complexity, m can be wrapped around by a specific integer number which is configured by the network. For example, if the network entity configures the wraparound value as k, m is wrapped around to 0 when the next value of m becomes k (e.g., m=(m+1) modulo k, whenever the SFN is wrapped around). The network entity may determine the value of k, which can be aligned with the current frame rate. For example, the network entity may determine the value of k, which can be divided by the current frame periodicity, such as (10,240 ms×k hyper frames)/(1,000 ms/X), where X is associated with the current frame periodicity.

In some aspects, m can be wrapped around by an integer multiple of 25 (e.g., 50, 75, 100, 1000). For example, if m is wrapped around by 25, m returns or is reset to 0 when the next value of m reaches 25 (i.e., m=(m+1) modulo 25). Since any integer frame rate can be aligned within 25 hyper frames (e.g., assume that f is an integer frame rate (fps, Hz), (10,240 ms*25 hyper frames)/(1,000 ms/f)=f×256), m can support any integer frame rate if m has the range from 0 to 24.

In some aspects, the UE may wake up based at least in part on (the subframe index+the SFN wraparound offset) modulo a length of the resource cycle (e.g., DRX long cycle) being equal to a starting offset. In some aspects, the UE may wake up based at least in part on (the subframe index+the SFN wraparound offset) modulo a length of the resource cycle (e.g., DRX short cycle) being equal to a starting offset modulo the length of the resource cycle (e.g., DRX short cycle).

In some aspects, the SFN wraparound offset may be equal to (a length of the hyper frame×m), where an initial value of m is based at least in part on a time reference SFN and an SFN in which a configuration for the resource cycle is received. For example, as shown by example 3742, the time reference SFN is 512, and either the initial value of m is 1 based at least in part on the SFN being less than 512 (e.g., 0≤SFN-UE<512 or delivered in the next hyper frame), or the initial value of m is 0 based at least in part on the SFN being 0 or between 512 and the length of the hyper frame (e.g., 512≤SFN-UE<1024). As shown by example 3740, if the time reference SFN is the initial value of m is 0, regardless of the SFN in which the RRC configuration is received.

As indicated above, FIG. 37D provides some examples. Other examples may differ from what is described with regard to FIG. 37D.

Figure 37E:
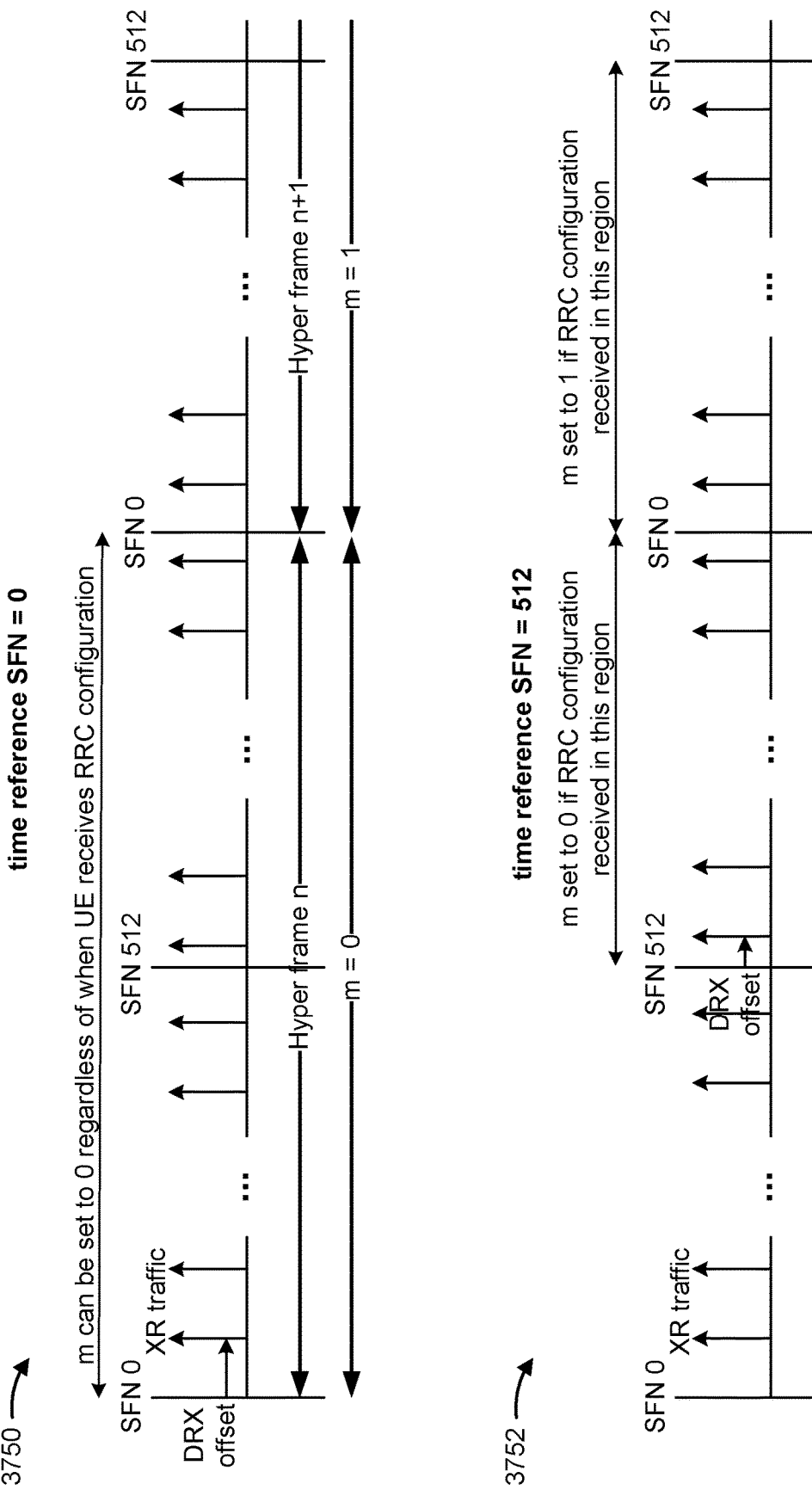
FIG. 37E is a diagram illustrating an example of receiving the configuration for resource cycles, in accordance with the present disclosure.

FIG. 37E is a diagram illustrating examples 3750 and 3752 of receiving the configuration for resource cycles, in accordance with the present disclosure.

In some aspects, the UE may wake up based at least in part on (the subframe index+the SFN wraparound offset) modulo a length of the resource cycle being equal to (a starting offset+(the time reference SFN×10)) modulo the length of the resource cycle. The resource cycle may be, for example, a DRX long cycle or a DRX short cycle. In some aspects, the SFN wraparound offset may be equal to (a length of the hyper frame×m), where an initial value of m is based at least in part on a time reference SFN and an SFN in which a configuration for the resource cycle is received. For example, as shown by example 3752, the time reference SFN is 512, and either the initial value of m is 1 based at least in part on the SFN being less than 512 (e.g., 0≤SFN-UE<512 or delivered in the next hyper frame), or the initial value of m is 0 based at least in part on the SFN being 0 or between 512 and the length of the hyper frame (e.g., 512≤SFN-UE<1024). As shown by example 3750, if the time reference SFN is 0, the initial value of m is 0, regardless of the SFN in which the RRC configuration is received.

As indicated above, FIG. 37E provides some examples. Other examples may differ from what is described with regard to FIG. 37E.

Figure 37F:
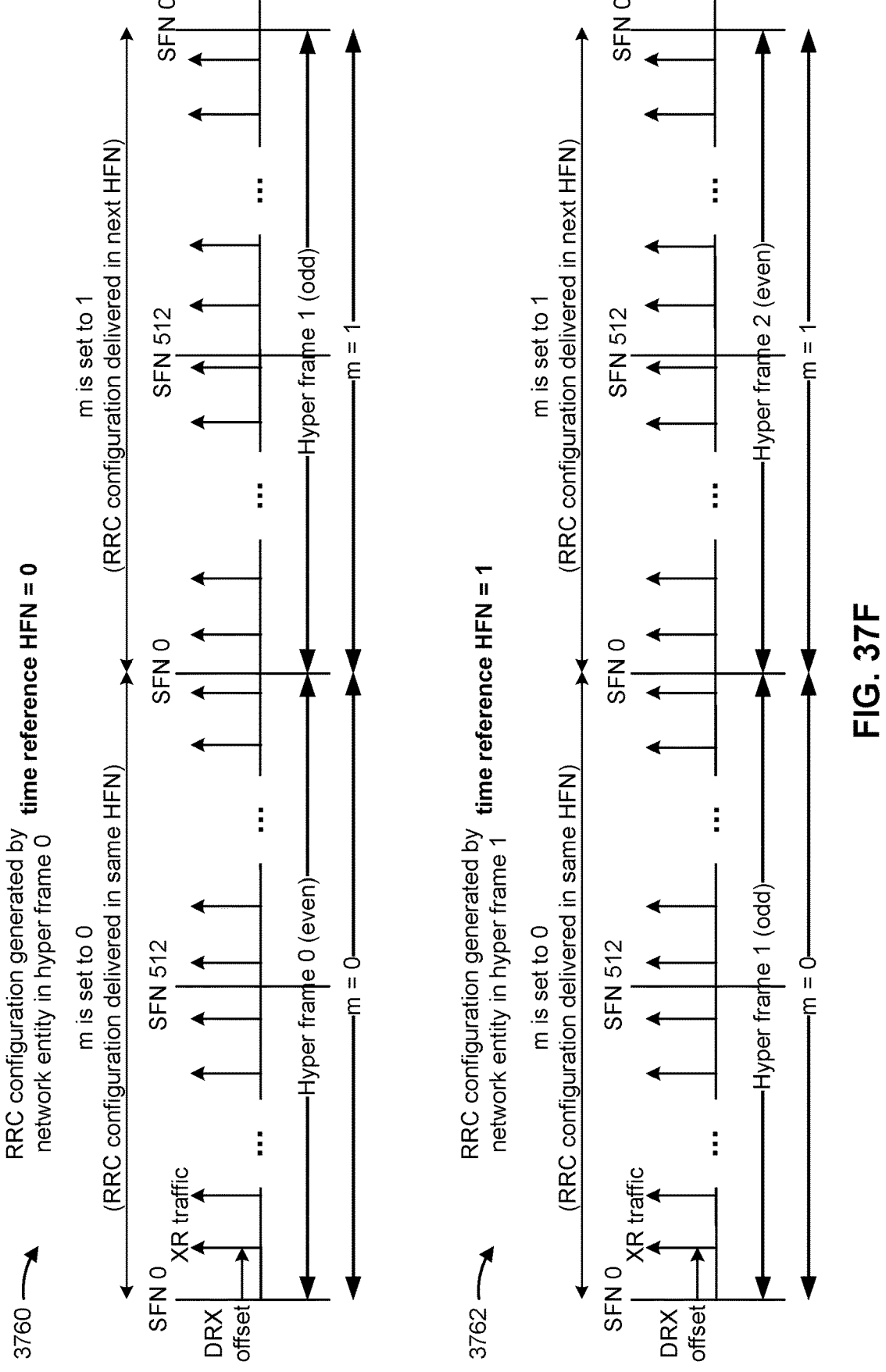
FIG. 37F is a diagram illustrating an example of receiving the configuration for resource cycles, in accordance with the present disclosure.

FIG. 37F is a diagram illustrating examples 3760 and 3762 of receiving the configuration for resource cycles, in accordance with the present disclosure.

In some aspects, the UE may wake up based at least in part on (the subframe index+the SFN wraparound offset) modulo a length of the resource cycle (e.g., DRX long cycle) being equal to a starting offset. In some aspects, the UE may wake up based at least in part on (the subframe index+the SFN wraparound offset) modulo a length of the resource cycle (e.g., DRX short cycle) being equal to a starting offset modulo the length of the resource cycle (e.g., DRX short cycle).

In some aspects, a time reference HFN (e.g., drx-timeReferenceHFN) may indicate when a new counter m starts with 0 with HFN (e.g., RRC configuration generated by the network entity). The time reference HFN may be the least significant bit (LSB) of the HFN when the RRC message is generated by the network entity. The HFN may also be referred to as a hyper SFN (HSFN). A time reference HFN (0 or 1) may be indicated when the RRC configuration message is generated (even or odd). For example, drx-TimeReferenceHFN in eCDRX may be set to 0 or 1 (1-bit RRC message). HFN-GNB may be the HFN when the RRC configuration with eCDRX is generated by the network entity (e.g., gNB). HFN-UE may be the HFN when the RRC configuration with eCDRX is successfully received by the UE.

In some aspects, the network entity may set the time reference HFN (e.g., drx-timeReferenceHFN) to 0 (e.g., LSB 1-bit of HFN-GNB) if the HFN-GNB is even. The network entity may set the time reference HFN to 1 if the HFN-GNB is odd. Regardless of the time reference HFN, the network entity may set the starting offset value (e.g., drx-StartOffset) from SFN=0. Counter m may be 0 when the RRC configuration is generated and may increase by 1 when the SFN wraps around (returns to 0).

In some aspects, the UE may set the initial value of m based at least in part on the time reference HFN (e.g., drx-timeReferenceHFN). For example, as shown by example 3760, if the time reference HFN is 0 (even) and HFN-UE is odd (delivered in the next HFN), the UE may set m to 1. As shown by example 3762, if the time reference HFN is 1 (odd) and HFN-UE is even (delivered in the next HFN), the UE may set m to 1. Otherwise, if the RRC configuration is delivered in the same HFN, the UE may set m to 0. The counter m may increase by one whenever the SFN is wrapped around (0). As a result, the network entity may deliver the RRC configuration within seconds (enough time). In some aspects, the time reference HFN may be multiple LSBs, which can provide more of a delivery time margin (e.g., 2 bits provides 20.48 seconds).

As indicated above, FIG. 37F provides some examples. Other examples may differ from what is described with regard to FIG. 37F.

Figure 38:
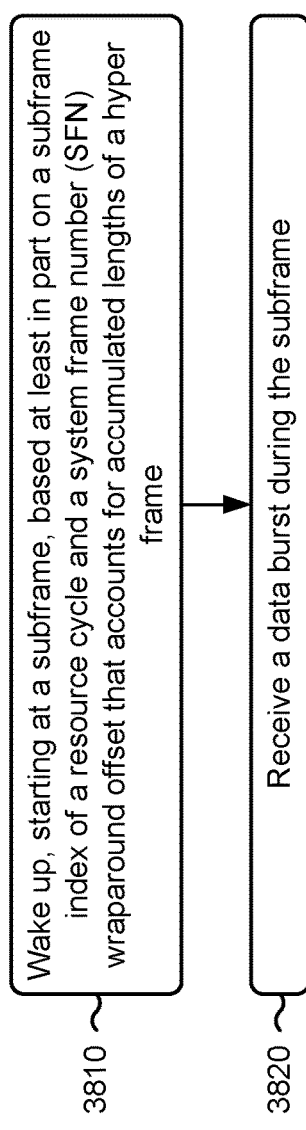
FIG. 38 is a diagram illustrating an example process performed, for example, by a UE, in accordance with the present disclosure.

FIG. 38 is a diagram illustrating an example process 3800 performed, for example, by a UE, in accordance with the present disclosure. Example process 3800 is an example where the UE (e.g., UE 120, UE 1820, UE 3620) performs operations associated with DRX.

As shown in FIG. 38, in some aspects, process 3800 may include waking up, starting at a subframe, based at least in part on a subframe index of a resource cycle and an SFN wraparound offset that accounts for accumulated lengths of a hyper frame (block 3810). For example, the UE (e.g., using communication manager 140 and/or wakeup component 3908, depicted in FIG. 39) may wake up, starting at a subframe, based at least in part on a subframe index of a resource cycle and an SFN wraparound offset that accounts for accumulated lengths of a hyper frame, as described above.

As further shown in FIG. 38, in some aspects, process 3800 may include receiving a data burst during the subframe (block 3820). For example, the UE (e.g., using communication manager 140 and/or reception component 3902, depicted in FIG. 39) may receive a data burst during the subframe, as described above.

Process 3800 may include additional aspects, such as any single aspect or any combination of aspects described below and/or in connection with one or more other processes described elsewhere herein.

In a first aspect, the SFN wraparound offset is equal to (a length of the hyper frame×m).

In a second aspect, alone or in combination with the first aspect, waking up includes waking up based at least in part on (the subframe index+the SFN wraparound offset) modulo a length of the resource cycle being equal to a starting offset modulo the length of the resource cycle.

In a third aspect, alone or in combination with one or more of the first and second aspects, the SFN wraparound offset is equal to (a length of the hyper frame×m), and an initial value of m is based at least in part on a time reference SFN and an SFN in which a configuration for the resource cycle is received.

In a fourth aspect, alone or in combination with one or more of the first through third aspects, the time reference SFN is 512, and either the initial value of m is 1 based at least in part on the SFN being less than 512, or the initial value of m is 0 based at least in part on the SFN between 512 and the length of the hyper frame.

In a fifth aspect, alone or in combination with one or more of the first through fourth aspects, the time reference SFN is 0 and the initial value of m is 0.

In a sixth aspect, alone or in combination with one or more of the first through fifth aspects, the SFN wraparound offset is equal to (a length of the hyper frame×m), and an initial value of m is based at least in part on a time reference HFN and an HFN in which a configuration for the resource cycle is received.

In a seventh aspect, alone or in combination with one or more of the first through sixth aspects, either the time reference HFN indicates 0, and the initial value of m is 1 based at least in part on the HFN being odd, or the initial value of m is 0 based at least in part on the HFN being even, or the time reference HFN indicates 1, and the initial value of m is 1 based at least in part on the HFN being even, or the initial value of m is 0 based at least in part on the HFN being odd.

In an eighth aspect, alone or in combination with one or more of the first through seventh aspects, the length of the hyper frame is equal to 10240.

In a ninth aspect, alone or in combination with one or more of the first through eighth aspects, the subframe index is equal to (10×an SFN of a frame comprising the subframe)+a subframe number of the subframe.

In a tenth aspect, alone or in combination with one or more of the first through ninth aspects, the SFN wraparound offset is equal to (a length of the hyper frame×m), where m updates to m+1 when the SFN returns to 0 (zero) or a time reference SFN, and the time reference SFN is 0 or 512.

In an eleventh aspect, alone or in combination with one or more of the first through tenth aspects, waking up includes waking up if (the subframe index+the SFN wraparound offset) modulo a length of the resource cycle is equal to [(a starting offset+(a time reference SFN×10)] modulo the length of the resource cycle.

In a twelfth aspect, alone or in combination with one or more of the first through eleventh aspects, the SFN wraparound offset is equal to (a length of the hyper frame×m), and an initial value of m is based at least in part on the time reference SFN and an SFN, of a frame comprising the subframe, in which a configuration for a resource cycle is received.

In a thirteenth aspect, alone or in combination with one or more of the first through twelfth aspects, the time reference SFN is 512, and the initial value of m is 1 based at least in part on the SFN being less than 512, or the initial value of m is 0 based at least in part on the SFN between 512 and the length of the hyper frame.

In a fourteenth aspect, alone or in combination with one or more of the first through thirteenth aspects, the time reference SFN is 0 and the initial value of m is 0.

In a fifteenth aspect, alone or in combination with one or more of the first through fourteenth aspects, the resource cycle includes a DRX cycle, and the data burst is a multimedia data burst.

In a sixteenth aspect, alone or in combination with one or more of the first through fifteenth aspects, process 3800 includes transmitting an indication of a capability of using the SFN wraparound offset.

In a seventeenth aspect, alone or in combination with one or more of the first through sixteenth aspects, process 3800 includes activating the SFN wraparound offset.

In an eighteenth aspect, alone or in combination with one or more of the first through seventeenth aspects, the SFN wraparound offset is equal to (a length of the hyper frame× m×k), where k=1 for activation of the SFN wraparound offset k=0 for deactivation of the SFN wraparound offset.

In a nineteenth aspect, alone or in combination with one or more of the first through eighteenth aspects, process 3800 includes receiving a configuration of one or more of DRX short cycles or DRX long cycles that are backward compatible for use of the SFN wraparound offset.

In a twentieth aspect, alone or in combination with one or more of the first through nineteenth aspects, m resets to 0 based at least in part on the next value of m being a configured value (e.g., integer multiple of 25).

Although FIG. 38 shows example blocks of process 3800, in some aspects, process 3800 may include additional blocks, fewer blocks, different blocks, or differently arranged blocks than those depicted in FIG. 38. Additionally, or alternatively, two or more of the blocks of process 3800 may be performed in parallel.

Figure 39:
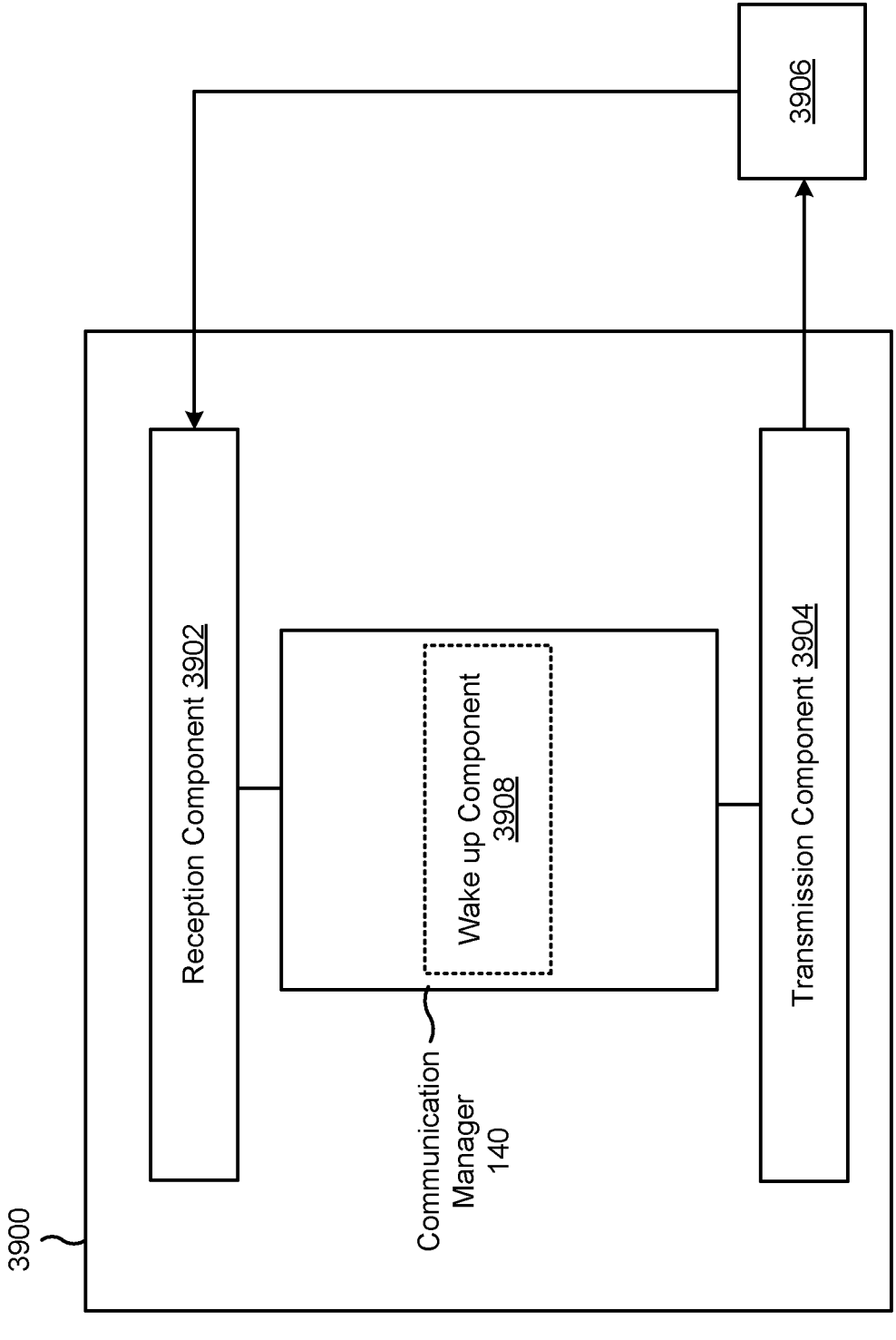
FIG. 39 is a diagram of an example apparatus for wireless communication, in accordance with the present disclosure.

FIG. 39 is a diagram of an example apparatus 3900 for wireless communication, in accordance with the present disclosure. The apparatus 3900 may be a UE (e.g., UE 120, UE 1820, UE 3620), or a UE may include the apparatus 3900. In some aspects, the apparatus 3900 includes a reception component 3902 and a transmission component 3904, which may be in communication with one another (for example, via one or more buses and/or one or more other components). As shown, the apparatus 3900 may communicate with another apparatus 3906 (such as a UE, a base station, or another wireless communication device) using the reception component 3902 and the transmission component 3904. As further shown, the apparatus 3900 may include the communication manager 140. The communication manager 140 may include one or more of a wakeup component 3908, among other examples.

In some aspects, the apparatus 3900 may be configured to perform one or more operations described herein in connection with FIGS. 17-37. Additionally, or alternatively, the apparatus 3900 may be configured to perform one or more processes described herein, such as process 3800 of FIG. 38. In some aspects, the apparatus 3900 and/or one or more components shown in FIG. 39 may include one or more components of the UE described in connection with FIG. 2. Additionally, or alternatively, one or more components shown in FIG. 39 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 3902 may receive communications, such as reference signals, control information, data communications, or a combination thereof, from the apparatus 3906. The reception component 3902 may provide received communications to one or more other components of the apparatus 3900. In some aspects, the reception component 3902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 3900. In some aspects, the reception component 3902 may include one or more antennas, a modem, a demodulator, a MIMO detector, a receive processor, a controller/processor, a memory, or a combination thereof, of the UE described in connection with FIG. 2.

The transmission component 3904 may transmit communications, such as reference signals, control information, data communications, or a combination thereof, to the apparatus 3906. In some aspects, one or more other components of the apparatus 3900 may generate communications and may provide the generated communications to the transmission component 3904 for transmission to the apparatus 3906. In some aspects, the transmission component 3904 may perform signal processing on the generated communications (such as filtering, amplification, modulation, digital-to-analog conversion, multiplexing, interleaving, mapping, or encoding, among other examples), and may transmit the processed signals to the apparatus 3906. In some aspects, the transmission component 3904 may include one or more antennas, a modem, a modulator, a transmit MIMO processor, a transmit processor, a controller/ processor, a memory, or a combination thereof, of the UE described in connection with FIG. 2. In some aspects, the transmission component 3904 may be co-located with the reception component 3902 in a transceiver.

The wakeup component 3908 may wake up, starting at a subframe, based at least in part on a subframe index of a resource cycle and an SFN wraparound offset that accounts for accumulated lengths of a hyper frame. The reception component 3902 may receive a data burst during the subframe.

The transmission component 3904 may transmit an indication of a capability of using the SFN wraparound offset. The wakeup component 3908 may activate the SFN wraparound offset. The reception component 3902 may receive a configuration of one or more of DRX short cycles or DRX long cycles that are backward compatible for use of the SFN wraparound offset.

The number and arrangement of components shown in FIG. 39 are provided as an example. In practice, there may be additional components, fewer components, different components, or differently arranged components than those shown in FIG. 39. Furthermore, two or more components shown in FIG. 39 may be implemented within a single component, or a single component shown in FIG. 39 may be implemented as multiple, distributed components. Additionally, or alternatively, a set of (one or more) components shown in FIG. 39 may perform one or more functions described as being performed by another set of components shown in FIG. 39.

Figure 40:
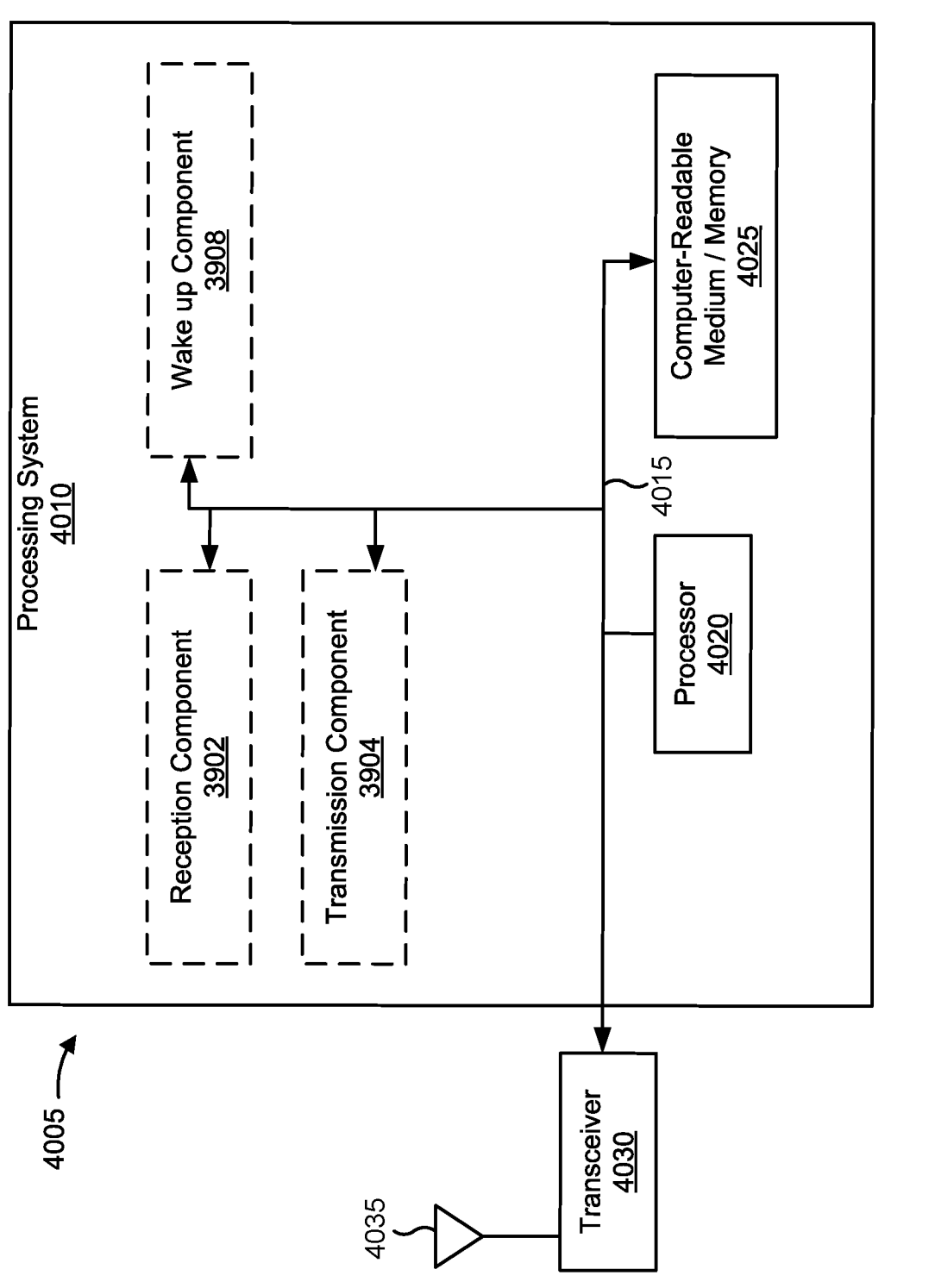
FIG. 40 is a diagram illustrating an example of a hardware implementation for an apparatus employing a processing system.

FIG. 40 is a diagram illustrating an example 4000 of a hardware implementation for an apparatus 4005 employing a processing system 4010. The apparatus 4005 may be a UE (e.g., UE 120, UE 1820, UE 3620).

The processing system 4010 may be implemented with a bus architecture, represented generally by the bus 4015. The bus 4015 may include any number of interconnecting buses and bridges depending on the specific application of the processing system 4010 and the overall design constraints. The bus 4015 links together various circuits including one or more processors and/or hardware components, represented by the processor 4020, the illustrated components, and the computer-readable medium/memory 4025. The bus 4015 may also link various other circuits, such as timing sources, peripherals, voltage regulators, and/or power management circuits.

The processing system 4010 may be coupled to a transceiver 4030. The transceiver 4030 is coupled to one or more antennas 4035. The transceiver 4030 provides a means for communicating with various other apparatuses over a transmission medium. The transceiver 4030 receives a signal from the one or more antennas 4035, extracts information from the received signal, and provides the extracted information to the processing system 4010, specifically the reception component 3902. In addition, the transceiver 4030 receives information from the processing system 4010, specifically the transmission component 3904, and generates a signal to be applied to the one or more antennas 4035 based at least in part on the received information.

The processing system 4010 includes a processor 4020 coupled to a computer-readable medium/memory 4025. The processor 4020 is responsible for general processing, including the execution of software stored on the computer-readable medium/memory 4025. The software, when executed by the processor 4020, causes the processing system 4010 to perform the various functions described herein for any particular apparatus. The computer-readable medium/memory 4025 may also be used for storing data that is manipulated by the processor 4020 when executing software. The processing system further includes at least one of the illustrated components. The components may be software modules running in the processor 4020, resident/stored in the computer-readable medium/memory 4025, one or more hardware modules coupled to the processor 4020, or some combination thereof.

In some aspects, the processing system 4010 may be a component of the UE 120 and may include the memory 282 and/or at least one of the TX MIMO processor 266, the RX processor 258, and/or the controller/processor 280. In some aspects, the apparatus 4005 for wireless communication includes means for waking up, starting at a subframe, based at least in part on a subframe index of a resource cycle and an SFN wraparound offset that accounts for accumulated lengths of a hyper frame; and/or means for receiving a data burst during the subframe. The aforementioned means may be one or more of the aforementioned components of the apparatus 2900 and/or the processing system 4010 of the apparatus 4005 configured to perform the functions recited by the aforementioned means. As described elsewhere herein, the processing system 4010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 40 is provided as an example. Other examples may differ from what is described in connection with FIG. 40.

Figure 41:
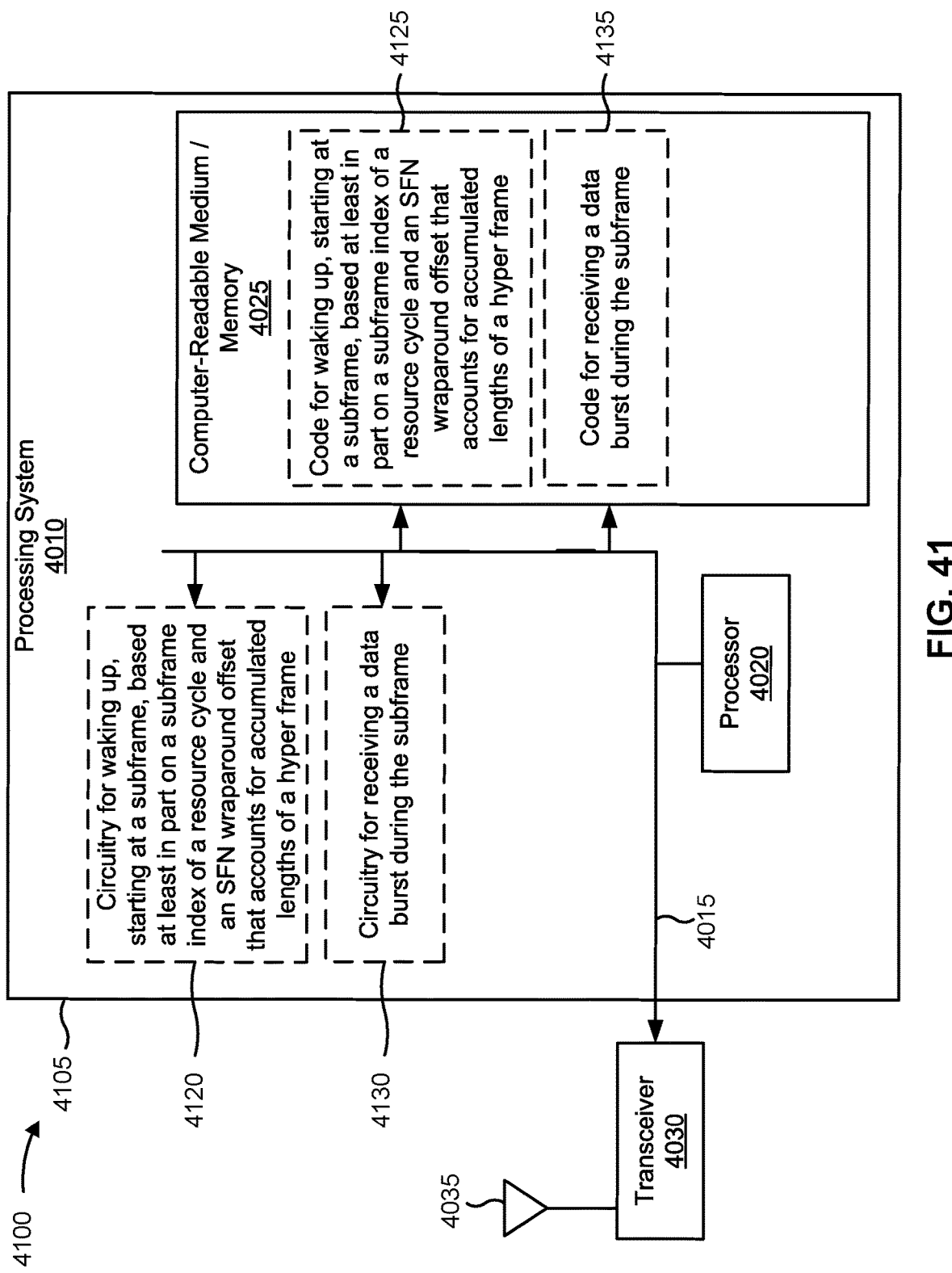
FIG. 41 is a diagram illustrating an example of an implementation of code and circuitry for an apparatus, in accordance with the present disclosure.

FIG. 41 is a diagram illustrating an example 4100 of an implementation of code and circuitry for an apparatus 4105, in accordance with the present disclosure. The apparatus 4105 may be a UE, or a UE may include the apparatus 4105.

As shown in FIG. 41, the apparatus 4105 may include circuitry for waking up, starting at a subframe, based at least in part on a subframe index of a resource cycle and an SFN wraparound offset that accounts for accumulated lengths of a hyper frame (circuitry 4120). For example, the circuitry 4120 may enable the apparatus 4105 to wake up, starting at a subframe, based at least in part on a subframe index of a resource cycle and an SFN wraparound offset that accounts for accumulated lengths of a hyper frame.

As shown in FIG. 41, the apparatus 4105 may include, stored in computer-readable medium 4025, code for waking up, starting at a subframe, based at least in part on a subframe index of a resource cycle and an SFN wraparound offset that accounts for accumulated lengths of a hyper frame (code 4125). For example, the code 4125, when executed by processor 4020, may cause processor 4020 to cause transceiver 4030 to wake up, starting at a subframe, based at least in part on a subframe index of a resource cycle and an SFN wraparound offset that accounts for accumulated lengths of a hyper frame.

As shown in FIG. 41, the apparatus 4105 may include circuitry for receiving a data burst during the subframe (circuitry 4130). For example, the circuitry 4130 may enable the apparatus 4105 to receive a data burst during the subframe.

As shown in FIG. 41, the apparatus 4105 may include, stored in computer-readable medium 4025, code for receiving a data burst during the subframe (code 4135). For example, the code 4135, when executed by processor 4020, may cause processor 4020 to cause transceiver 4030 to receive a data burst during the subframe.

FIG. 41 is provided as an example. Other examples may differ from what is described in connection with FIG. 41.

The following provides an overview of some Aspects of the present disclosure:

Aspect 1: A method of wireless communication performed by a user equipment (UE), comprising: sleeping in association with a discontinuous reception (DRX) cycle; waking up, starting at a subframe, based at least in part on a specified time offset that is added to an on duration of the DRX cycle based at least in part on a DRX cycle number of the DRX cycle and a length of the DRX cycle, wherein the specified time offset is based at least in part on a periodicity of multimedia data bursts, and wherein the DRX cycle number is based at least in part on the specified time offset; and receiving a multimedia data burst during the subframe.

Aspect 2: The method of Aspect 1, wherein the DRX cycle number is equal to [(10×a system frame number (SFN) of a frame comprising the subframe+a subframe number of the subframe)−(n×the specified time offset)] divided by the length of the DRX cycle.

Aspect 3: The method of Aspect 2, wherein waking up includes waking up if (10×the SFN+the subframe number) modulo the length of the DRX cycle is equal to ((n×the specified time offset)+a starting offset) modulo the length of the DRX cycle, and wherein n updates to n+1 when the DRX cycle number modulo a specified quantity of DRX cycles is equal to 0 (zero).

Aspect 4: The method of Aspect 3, further comprising skipping every second n+1 update.

Aspect 5: The method of Aspect 2, wherein waking up includes waking up if (10×the SFN+the subframe number) modulo the length of the DRX cycle is equal to ((n×the specified time offset)+a starting offset) modulo the length of the DRX cycle, and wherein n updates to n+1 when (10×the SFN+the subframe number) modulo (the length of the DRX cycle×a specified quantity of DRX cycles+the specified time offset) is equal to a specified timing value.

Aspect 6: The method of Aspect 5, wherein the specified timing value is equal to (the length of the DRX cycle×the specified quantity of DRX cycles)−1.

Aspect 7: The method of Aspect 2, wherein waking up includes waking up further based at least in part on an SFN wraparound offset.

Aspect 8: The method of Aspect 7, wherein waking up includes waking up if (10×the SFN+the subframe number+ the SFN wraparound offset) modulo the length of the DRX cycle is equal to ((n×the specified time offset)+a starting offset) modulo the length of the DRX cycle, and wherein n updates to n+1 when (10×the SFN+the subframe number+ the SFN wraparound offset) modulo (the length of the DRX cycle×a specified quantity of DRX cycles+the specified time offset) is equal to a specified timing value.

Aspect 9: The method of Aspect 7, wherein the SFN wraparound offset is equal to (10240×m), and wherein m updates to m+1 when the SFN returns to 0 (zero).

Aspect 10: The method of Aspect 7, wherein waking up includes waking up if (10×the SFN+the subframe number+ the SFN wraparound offset) modulo the length of the DRX cycle is equal to [(n×the specified time offset)+a starting offset+(DRX time reference SFN×10] modulo the length of the DRX cycle, and wherein n updates to n+1 when (10×the SFN+the subframe number+the SFN wraparound offset) modulo (the length of the DRX cycle×a specified quantity of DRX cycles+the specified time offset) is equal to a specified timing value.

Aspect 11: The method of Aspect 10, wherein the SFN wraparound offset is 10240×m, wherein m updates to m+1 when the SFN returns to the DRX time reference SFN, and wherein the DRX time reference SFN is 0 or 512.

Aspect 12: The method of Aspect 10, further comprising receiving an indication of the DRX time reference SFN.

Aspect 13: The method of any of Aspects 1-12, wherein an anchor cycle that includes the DRX cycle also includes two or more leap cycles.

Aspect 14: The method of Aspect 13, further comprising receiving an indication of the two or more leap cycles.

Aspect 15: The method of Aspect 13 or 14, further comprising receiving an indication of a timing of the two or more leap cycles.

Aspect 16: A method of wireless communication performed by a user equipment (UE), comprising: sleeping in association with a discontinuous reception (DRX) cycle;

waking up, starting at a subframe, based at least in part on a specified time offset that is added to an on duration of the DRX cycle based at least in part on a DRX cycle number of the DRX cycle and a DRX time reference system frame number (SFN), wherein the specified time offset is based at least in part on a periodicity of multimedia data bursts, and wherein the DRX cycle number is based at least in part on the specified time offset; and receiving a multimedia data burst during the subframe.

Aspect 17: The method of Aspect 16, wherein waking up includes waking up if (an SFN of a frame comprising the subframe×a quantity of subframes per frame)+a subframe number of the subframe is equal to [the DRX time reference SFN×the quantity of subframes per subframe+a starting offset+a DRX on duration number×a length of the DRX cycle+floor (the DRX on duration number/the specified time offset)×a specified quantity of DRX cycles] modulo (1024× the quantity of subframes per frame).

Aspect 18: The method of Aspect 16, wherein waking up includes waking up if [(a modified SFN of a frame comprising the subframe×10)+a subframe number of the subframe] modulo a length of the DRX cycle is equal to [a starting offset+(n×the specified time offset)+(the DRX time reference SFN×10)] modulo the length of the DRX cycle, and wherein n updates to n+1 when [(SFN_M×10)+the subframe number] modulo (the length of the DRX cycle×a specified quantity of DRX cycles+the specified time offset) is equal to a specified timing value.

Aspect 19: The method of Aspect 18, wherein the specified timing value is equal to (the length of the DRX cycle×the specified quantity of DRX cycles)−1.

Aspect 20: A method of wireless communication performed by a user equipment (UE), comprising: sleeping in association with a resource cycle; waking up, starting at a subframe, based at least in part on a specified time offset that is added to an instance of the resource cycle based at least in part on a resource cycle number of the resource cycle and a length of the resource cycle, wherein the specified time offset is based at least in part on a periodicity of multimedia data bursts, and wherein the resource cycle number is based at least in part on the specified time offset; and receiving a multimedia data burst during the subframe.

Aspect 21: The method of Aspect 20, wherein the resource cycle is a cycle for one of a channel state information (CSI) reference signal, a CSI interference measurement resource, or a sounding reference signal.

Aspect 22: The method of Aspect 20 or 21, wherein the resource cycle is a cycle for a scheduling request.

Aspect 23: The method of any of Aspects 20-22, wherein the resource cycle is a cycle for a configured grant resource or a semi-persistent scheduling resource.

Aspect 24: The method of any of Aspects 20-23, wherein the resource cycle is a cycle for a channel state information report or a buffer status report.

Aspect 25: The method of any of Aspects 20-24, wherein the resource cycle is a cycle for physical downlink control channel monitoring or for physical uplink control channel resources.

Aspect 26: The method of any of Aspects 20-25, wherein the resource cycle number is equal to [(10×a system frame number (SFN) of a frame comprising the subframe+a subframe number of the subframe)−(n×the specified time offset)] divided by the length of the resource cycle.

Aspect 27: The method of any of Aspects 20-26, wherein waking up includes waking up if (10×the SFN+the subframe number+an SFN wraparound offset) modulo the length of the resource cycle is equal to ((n×the specified time offset)+a starting offset) modulo the length of the resource cycle, and wherein n updates to n+1 when (10×the SFN+the subframe number+the SFN wraparound offset) modulo (the length of the resource cycle×a specified quantity of resource cycles+the specified time offset) is equal to a specified timing value.

Aspect 28: The method of Aspect 27, wherein the SFN wraparound offset is 10240×m, and wherein m updates to m+1 when the SFN returns to 0 (zero).

Aspect 29: The method of any of Aspects 20-26, wherein waking up includes waking up if (10×the SFN+the subframe number+an SFN wraparound offset) modulo the length of the resource cycle is equal to [(n×the specified time offset)+a starting offset+(a resource time reference SFN×10] modulo the length of the resource cycle, and wherein n updates to n+1 when (10×the resource+the subframe number+the SFN wraparound offset) modulo (the length of the resource cycle×a specified quantity of resource cycles+the specified time offset) is equal to a specified timing value.

Aspect 30: The method of Aspect 29, wherein the SFN wraparound offset is 10240×m, wherein m updates to m+1 when the SFN returns to the resource time reference SFN, and wherein the resource time reference SFN is 0 or 512.

Aspect 31: A method of wireless communication performed by a network entity, comprising: preparing for communication with a user equipment (UE) according to a discontinuous reception (DRX) cycle; and transmitting, starting at a subframe, a data burst based at least in part on a specified time offset that is added to an on duration of the DRX cycle based at least in part on a DRX cycle number of the DRX cycle and a length of the DRX cycle, wherein the specified time offset is based at least in part on a periodicity of multimedia data bursts, and wherein the DRX cycle number is based at least in part on the specified time offset.

Aspect 32: The method of Aspect 31, wherein the DRX cycle number is equal to [(10×a system frame number (SFN) of a frame comprising the subframe+a subframe number of the subframe)−(n×the specified time offset)] divided by length of the DRX cycle.

Aspect 33: The method of Aspect 32, wherein transmitting the data burst includes transmitting the data burst if (10×the SFN+the subframe number) modulo the length of the DRX cycle is equal to ((n×the specified time offset)+a starting offset) modulo the length of the DRX cycle, and wherein n updates to n+1 when the DRX cycle number modulo a specified quantity of DRX cycles is equal to 0 (zero).

Aspect 34: The method of Aspect 33, further comprising skipping every second n+1 update.

Aspect 35: The method of Aspect 32, wherein transmitting the data burst includes transmitting the data burst if (10×the SFN+the subframe number) modulo the length of the DRX cycle is equal to ((n×the specified time offset)+a starting offset) modulo the length of the DRX cycle, and wherein n updates to n+1 when (10×the SFN+the subframe number) modulo (the length of the DRX cycle×a specified quantity of DRX cycles+the specified time offset) is equal to a specified timing value.

Aspect 36: The method of Aspect 35, wherein the specified timing value is equal to (the length of the DRX cycle×the specified quantity of DRX cycles)−1.

Aspect 37: The method of Aspect 32, wherein transmitting the data burst includes transmitting the data burst further based at least in part on an SFN wraparound offset.

Aspect 38: The method of Aspect 37, wherein transmitting the data burst includes transmitting the data burst if (10×the SFN+the subframe number+the SFN wraparound offset) modulo the length of the DRX cycle is equal to ((n×the specified time offset)+a starting offset) modulo the length of the DRX cycle, and wherein n updates to n+1 when (10×the SFN+the subframe number+the SFN wraparound offset) modulo (the length of the DRX cycle×a specified quantity of DRX cycles+the specified time offset) is equal to a specified timing value.

Aspect 39: The method of Aspect 37, wherein the SFN wraparound offset is equal to (10240×m), and wherein m updates to m+1 when the SFN returns to 0 (zero).

Aspect 40: The method of Aspect 37, wherein transmitting the data burst includes transmitting the data burst up if (10×the SFN+the subframe number+the SFN wraparound offset) modulo the length of the DRX cycle is equal to [(n×the specified time offset)+a starting offset+(DRX time reference SFN×10] modulo the length of the DRX cycle, and wherein n updates to n+1 when (10×the SFN+the subframe number+the SFN wraparound offset) modulo (the length of the DRX cycle×a specified quantity of DRX cycles+the specified time offset) is equal to a specified timing value.

Aspect 41: The method of Aspect 40, wherein the SFN wraparound offset is 10240×m, wherein m updates to m+1 when the SFN returns to the DRX time reference SFN, and wherein the DRX time reference SFN is 0 or 512.

Aspect 42: The method of Aspect 40, further comprising transmitting an indication of the DRX time reference SFN.

Aspect 43: The method of any of Aspects 31-42, wherein an anchor cycle that includes the DRX cycle also includes two or more leap cycles.

Aspect 44: The method of Aspect 43, further comprising transmitting an indication of the two or more leap cycles.

Aspect 45: The method of Aspect 43 or 44, further comprising transmitting an indication of a timing of the two or more leap cycles.

Aspect 46: The method of any of Aspects 43-45, wherein a leap cycle offset pattern of the two or more leap cycles includes (0 milliseconds (ms), 1 ms, 1 ms) or (1 ms, 1 ms, 0 ms).

Aspect 47: A method of wireless communication performed by a network entity, comprising: preparing for communication with a user equipment (UE) according to a discontinuous reception (DRX) cycle; and transmitting, starting at a subframe, a data burst based at least in part on a specified time offset that is added to an on duration of the DRX cycle based at least in part on a DRX cycle number of the DRX cycle and a length of the DRX cycle, wherein the specified time offset is based at least in part on a periodicity of multimedia data bursts, and wherein the DRX cycle number is based at least in part on the specified time offset.

Aspect 48: The method of Aspect 47, wherein transmitting the data burst includes transmitting the data burst if (an SFN of a frame comprising the subframe×a quantity of subframes per frame)+a subframe number of the subframe is equal to [the DRX time reference SFN×the quantity of subframes per subframe+a starting offset+a DRX on duration number×a length of the DRX cycle+floor (the DRX on duration number/the specified time offset)×a specified quantity of DRX cycles] modulo (1024×the quantity of subframes per frame).

Aspect 49: The method of Aspect 47, wherein transmitting the data burst includes transmitting the data burst if [(a modified SFN of a frame comprising the subframe×10)+a subframe number of the subframe] modulo a length of the DRX cycle is equal to [a starting offset+(n×the specified time offset)+(the DRX time reference SFN×10)] modulo the length of the DRX cycle, and wherein n updates to n+1 when [(SFN_M×10)+the subframe number] modulo (the length of the DRX cycle×a specified quantity of DRX cycles+the specified time offset) is equal to a specified timing value.

Aspect 50: The method of Aspect 49, wherein the specified timing value is equal to (the length of the DRX cycle×the specified quantity of DRX cycles)−1.

Aspect 51: A method of wireless communication performed by a network entity, comprising: preparing for communication with a user equipment (UE) according to a resource cycle; and transmitting, starting at a subframe, a data burst based at least in part on a specified time offset that is added to an instance of the resource cycle based at least in part on a resource cycle number of the resource cycle and a length of the resource cycle, wherein the specified time offset is based at least in part on a periodicity of multimedia data bursts, wherein the resource cycle number is based at least in part on the specified time offset, and wherein the resource cycle number is based at least in part on the specified time offset.

Aspect 52: The method of Aspect 51, wherein the resource cycle is a cycle for one of a channel state information (CSI) reference signal, a CSI interference measurement resource, or a sounding reference signal.

Aspect 53: The method of Aspect 51 or 52, wherein the resource cycle is a cycle for a scheduling request.

Aspect 54: The method of any of Aspects 51-53, wherein the resource cycle is a cycle for a configured grant resource or a semi-persistent scheduling resource.

Aspect 55: The method of any of Aspects 51-54, wherein the resource cycle is a cycle for a channel state information report or a buffer status report.

Aspect 56: The method of any of Aspects 51-55, wherein the resource cycle is a cycle for physical downlink control channel monitoring or for physical uplink control channel resources.

Aspect 57: The method of any of Aspects 51-56, wherein the resource cycle number is equal to [(10×a system frame number (SFN) of a frame comprising the subframe+a subframe number of the subframe)−(n×the specified time offset)] divided by the length of the resource cycle.

Aspect 58: The method of any of Aspects 51-56, wherein transmitting the data burst includes transmitting the data burst if (10×the SFN+the subframe number+an SFN wraparound offset) modulo the length of the resource cycle is equal to ((n×the specified time offset)+a starting offset) modulo the length of the resource cycle, and wherein n updates to n+1 when (10×the SFN+the subframe number+the SFN wraparound offset) modulo (the length of the resource cycle×a specified quantity of resource cycles+the specified time offset) is equal to a specified timing value.

Aspect 59: The method of Aspect 58, wherein the SFN wraparound offset is 10240×m, and wherein m updates to m+1 when the SFN returns to 0 (zero).

Aspect 60: The method of any of Aspects 51-56, wherein transmitting the data burst includes transmitting the data burst if (10×the SFN+the subframe number+an SFN wraparound offset) modulo the length of the resource cycle is equal to [(n×the specified time offset)+a starting offset+(a resource time reference SFN×10] modulo the length of the resource cycle, and wherein n updates to n+1 when (10×the resource+the subframe number+the SFN wraparound offset) modulo (the length of the resource cycle×a specified quantity of resource cycles+the specified time offset) is equal to a specified timing value.

Aspect 61: The method of Aspect 60, wherein the SFN wraparound offset is 10240×m, wherein m updates to m+1 when the SFN returns to the resource time reference SFN, and wherein the resource time reference SFN is 0 or 512.

Aspect 62: A method for wireless communication at a user equipment (UE), comprising: waking up, starting at a subframe, based at least in part on a subframe index of a resource cycle and a system frame number (SFN) wraparound offset that accounts for accumulated lengths of a hyper frame; and receiving a data burst during the subframe.

Aspect 63: The method of Aspect 62, wherein the SFN wraparound offset is equal to (a length of the hyper frame× m).

Aspect 64: The method of Aspect 62 or 63, wherein waking up includes waking up based at least in part on (the subframe index+the SFN wraparound offset) modulo a length of the resource cycle being equal to a starting offset modulo the length of the resource cycle.

Aspect 65: The method of Aspect 64, wherein the SFN wraparound offset is equal to (a length of the hyper frame× m), and wherein an initial value of m is based at least in part on a time reference SFN and an SFN in which a configuration for the resource cycle is received.

Aspect 66: The method of Aspect 65, wherein the time reference SFN is 512, and wherein either: the initial value of m is 1 based at least in part on the SFN being less than 512, or the initial value of m is 0 based at least in part on the SFN between 512 and the length of the hyper frame.

Aspect 67: The method of Aspect 65, wherein the time reference SFN is 0 and the initial value of m is 0.

Aspect 68: The method of Aspect 62, wherein the SFN wraparound offset is equal to (a length of the hyper frame× m), and wherein an initial value of m is based at least in part on a time reference hyper frame number (HFN) and an HFN in which a configuration for the resource cycle is received.

Aspect 69: The method of Aspect 68, wherein either: the time reference HFN indicates 0, and the initial value of m is 1 based at least in part on the HFN being odd, or the initial value of m is 0 based at least in part on the HFN being even, or the time reference HFN indicates 1, and the initial value of m is 1 based at least in part on the HFN being even, or the initial value of m is 0 based at least in part on the HFN being odd.

Aspect 70: The method of any of Aspects 62-69, wherein the length of the hyper frame is equal to 10240.

Aspect 71: The method of any of Aspects 62-70, wherein the subframe index is equal to (10×an SFN of a frame comprising the subframe)+a subframe number of the subframe.

Aspect 72: The method of Aspect 71, wherein m updates to m+1 when the SFN returns to 0 (zero).

Aspect 73: The method of Aspect 71, wherein m updates to m+1 when the SFN returns to a time reference SFN.

Aspect 74: The method of Aspect 73, wherein the time reference SFN is 0 or 512.

Aspect 75: The method of any of Aspects 62-74, wherein waking up includes waking up if (the subframe index+the SFN wraparound offset) modulo a length of the resource cycle is equal to [(a starting offset+(a time reference SFN× 10)] modulo the length of the resource cycle.

Aspect 76: The method of Aspect 75, wherein the SFN wraparound offset is equal to (a length of the hyper frame× m), and wherein an initial value of m is based at least in part on the time reference SFN and an SFN, of a frame comprising the subframe, in which a configuration for a resource cycle is received.

Aspect 77: The method of Aspect 76, wherein the time reference SFN is 512, and wherein the initial value of m is 1 based at least in part on the SFN being less than 512, or the initial value of m is 0 based at least in part on the SFN between 512 and the length of the hyper frame.

Aspect 78: The method of Aspect 76, wherein the time reference SFN is 0 and the initial value of m is 0.

Aspect 79: The method of any of Aspects 62-69, wherein the resource cycle includes a discontinuous reception (DRX) cycle, and the data burst is a multimedia data burst.

Aspect 80: The method of any of Aspects 62-70, further comprising transmitting an indication of a capability of using the SFN wraparound offset.

Aspect 81: The method of any of Aspects 62-71, further comprising activating the SFN wraparound offset.

Aspect 82: The method of Aspects 72, wherein the SFN wraparound offset is equal to (a length of the hyper frame$\times$ m$\times$k), where k=1 for activation of the SFN wraparound offset k=0 for deactivation of the SFN wraparound offset.

Aspect 83: The method of any of Aspects 62-73, wherein the one or more processors are configured to receive a configuration of one or more of DRX short cycles or DRX long cycles that are backward compatible for use of the SFN wraparound offset.

Aspect 84: The method of any of Aspects 62-83, wherein m resets to 0 based at least in part on a next value of m being a configured value.

Aspect 85: An apparatus for wireless communication at a device, comprising a processor; memory coupled with the processor; and instructions stored in the memory and executable by the processor to cause the apparatus to perform the method of one or more of Aspects 1-84.

Aspect 86: A device for wireless communication, comprising a memory and one or more processors coupled to the memory, the one or more processors configured to perform the method of one or more of Aspects 1-84.

Aspect 87: An apparatus for wireless communication, comprising at least one means for performing the method of one or more of Aspects 1-84.

Aspect 88: A non-transitory computer-readable medium storing code for wireless communication, the code comprising instructions executable by a processor to perform the method of one or more of Aspects 1-84.

Aspect 89: A non-transitory computer-readable medium storing a set of instructions for wireless communication, the set of instructions comprising one or more instructions that, when executed by one or more processors of a device, cause the device to perform the method of one or more of Aspects 1-84.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled with the one or more memories, configured to:

wake up the apparatus starting at a subframe, based at least in part on a specified time offset that is added to an on duration of a discontinuous reception (DRX) cycle based at least in part on a DRX cycle number of the DRX cycle and a DRX time reference system frame number (SFN), wherein the specified time offset is based at least in part on a periodicity of multimedia data bursts, and wherein the DRX cycle number is based at least in part on an initial value of a DRX counter, the initial value being based at least in part on the DRX time reference SFN; and receive a multimedia data burst during the subframe.

2. The apparatus of claim 1, wherein the DRX cycle number is equal to [(10$\times$ an SFN of a frame comprising the subframe+a subframe number of the subframe)−(n× the specified time offset)] divided by a length of the DRX cycle.

3. The apparatus of claim 2, wherein the one or more processors, to wake up the apparatus, are configured to wake up the apparatus further based at least in part on an SFN wraparound offset.

4. The apparatus of claim 3, wherein the SFN wraparound offset is equal to (10240×m), and wherein m updates to m+1 when the SFN returns to 0 (zero).

5. The apparatus of claim 3, wherein the one or more processors, to wake up the apparatus, are configured to wake up the apparatus when (10×the SFN+the subframe number+ the SFN wraparound offset) modulo a length of the DRX cycle is equal to [(n× the specified time offset)+a starting offset+ (the DRX time reference SFN×10] modulo the length of the DRX cycle, and wherein n updates to n+1 when (10× the SFN+the subframe number+the SFN wraparound offset) modulo (the length of the DRX cycle× a specified quantity of DRX cycles+the specified time offset) is equal to a specified timing value.

6. The apparatus of claim 5, wherein the SFN wraparound offset is 10240× m, wherein m updates to m+1 when the SFN returns to the DRX time reference SFN, and wherein the DRX time reference SFN is 0 or 512.

7. The apparatus of claim 5, wherein the one or more processors are configured to receive an indication of the DRX time reference SFN.

8. The apparatus of claim 3, wherein the one or more processors are configured to operate without the SFN wraparound offset for legacy DRX operation.

9. The apparatus of claim 3, wherein the one or more processors are configured to activate the SFN wraparound offset based on configuration information received from a network entity via at least one of: radio resource control (RRC) signaling or downlink control information (DCI).

10. The apparatus of claim 3, wherein the one or more processors are configured to receive a configuration of one or more of DRX short cycles or DRX long cycles that are backward compatible for use of the SFN wraparound offset.

11. The apparatus of claim 1, wherein an anchor cycle that includes the DRX cycle also includes two or more leap cycles.

12. The apparatus of claim 11, wherein the one or more processors are configured to receive an indication of the two or more leap cycles or an indication of a timing of the two or more leap cycles.

13. The apparatus of claim 11, wherein a leap cycle offset pattern of the two or more leap cycles includes (0 milliseconds (ms), 1 ms, 1 ms) or (1 ms, 1 ms, 0 ms).

14. An apparatus for wireless communication at a user equipment (UE), comprising:
  one or more memories; and
  one or more processors, coupled with the one or more memories, configured to:
    wake up the apparatus, starting at a subframe, based at least in part on a specified time offset that is added to an on duration of a discontinuous reception (DRX) cycle, based at least in part on a DRX cycle number of the DRX cycle and a DRX time reference system frame number (SFN), wherein the specified time offset is based at least in part on a periodicity of multimedia data bursts, and wherein the DRX cycle number is based at least in part on an initial value of a DRX counter, the initial value being based at least in part on the DRX time reference SFN; and
    receive a multimedia data burst during the subframe.

15. The apparatus of claim 14, wherein the one or more processors, to wake up the apparatus, are configured to wake up the apparatus when (an SFN of a frame comprising the subframe× a quantity of subframes per frame)+a subframe number of the subframe is equal to [the DRX time reference SFN× the quantity of subframes per subframe+a starting offset+a DRX on duration number× a length of the DRX cycle+floor (the DRX on duration number/the specified time offset)× a specified quantity of DRX cycles] modulo (1024× the quantity of subframes per frame).

16. An apparatus for wireless communication at a user equipment (UE), comprising:
  one or more memories; and
  one or more processors, coupled with the one or more memories, configured to:
    wake up the apparatus, starting at a subframe, based at least in part on a specified time offset that is added to an instance of a resource cycle, based at least in part on a resource cycle number of the resource cycle and a length of the resource cycle, wherein the specified time offset is based at least in part on a periodicity of multimedia data bursts, and wherein the resource cycle number is based at least in part on an initial value of a resource cycle counter, the initial value being based at least in part on a resource time reference system frame number (SFN); and
    receive a multimedia data burst during the subframe.

17. The apparatus of claim 16, wherein the resource cycle is a cycle for one of a channel state information (CSI) reference signal, a CSI interference measurement resource, or a sounding reference signal.

18. The apparatus of claim 16, wherein the resource cycle is a cycle for a scheduling request.

19. The apparatus of claim 16, wherein the resource cycle is a cycle for a configured grant resource or a semi-persistent scheduling resource.

20. The apparatus of claim 16, wherein the resource cycle is a cycle for a channel state information report or a buffer status report.

21. The apparatus of claim 16, wherein the resource cycle is a cycle for physical downlink control channel monitoring or for physical uplink control channel resources.

22. The apparatus of claim 16, wherein the one or more processors, to wake up the apparatus, are configured to wake up the apparatus when (10× a an SFN of a frame comprising the subframe+a subframe number of the subframe+an SFN wraparound offset) modulo the length of the resource cycle is equal to ((n× the specified time offset)+a starting offset) modulo the length of the resource cycle, wherein n updates to n+1 when (10× the SFN+the subframe number+the SFN wraparound offset) modulo (the length of the resource cycle× a specified quantity of resource cycles+the specified time offset) is equal to a specified timing value, wherein the SFN wraparound offset is 10240× m, and wherein m updates to m+1 when the SFN returns to 0 (zero).

23. An apparatus for wireless communication at a user equipment (UE), comprising:
  one or more memories; and
  one or more processors, coupled with the one or more memories, configured to:
    wake up, starting at a subframe, based at least in part on a subframe index of a resource cycle and a system frame number (SFN) wraparound offset that accounts for accumulated lengths of a hyper frame, wherein the SFN wraparound offset is equal to a length of the hyper frame multiplied by a variable m, an initial value of m being based at least in part on a time reference system frame number (SFN); and receive a data burst during the subframe.

24. The apparatus of claim 23, wherein the one or more processors, to wake up, are configured to wake up based at least in part on (the subframe index+the SFN wraparound offset) modulo a length of the resource cycle being equal to a starting offset modulo the length of the resource cycle.

25. The apparatus of claim 24, wherein the initial value of m is further based at least in part on an SFN in which a configuration for the resource cycle is received.

26. The apparatus of claim 25, wherein:
the time reference SFN is 512, and the initial value of m is 1 based at least in part on the SFN being less than 512,
the time reference SFN is 512, and the initial value of m is 0 based at least in part on the SFN between 512 and the length of the hyper frame, or
the time reference SFN is 0, and the initial value of m is 0.

27. The apparatus of claim 24, wherein an initial value of m is further based at least in part on a hyper frame number (HFN) in which a configuration for the resource cycle is received.

28. The apparatus of claim 23, wherein the length of the hyper frame is equal to 10240.

29. The apparatus of claim 23, wherein the subframe index is equal to (10× an SFN of a frame comprising the subframe)+a subframe number of the subframe.

30. The apparatus of claim 29, wherein m updates to m+1 when the SFN returns to 0 (zero) or the time reference SFN, and wherein the time reference SFN is 0 or 512.

31. The apparatus of claim 30, wherein m resets to 0 based at least in part on a next value of m being a configured value.

32. The apparatus of claim 23, wherein the one or more processors, to wake up, are configured to wake up when (the subframe index+the SFN wraparound offset) modulo a length of the resource cycle is equal to [(a starting offset+ (a time reference SFN×10)] modulo the length of the resource cycle.

33. The apparatus of claim 23, wherein:
the time reference SFN is 512, and the initial value of m is 1 based at least in part on the SFN being less than 512,
the time reference SFN is 512, and the initial value of m is 0 based at least in part on the SFN between 512 and the length of the hyper frame, or
the time reference SFN is 0, and the initial value of m is 0.

34. The apparatus of claim 23, wherein the resource cycle includes a discontinuous reception (DRX) cycle, and the data burst is a multimedia data burst.

35. The apparatus of claim 23, wherein the one or more processors are configured to transmit an indication of a capability of using the SFN wraparound offset.

36. The apparatus of claim 23, wherein the one or more processors are configured to activate the SFN wraparound offset.

37. The apparatus of claim 23, wherein the SFN wraparound offset is equal to (the length of the hyper frame×m× k), where k=1 for activation of the SFN wraparound offset k=0 for deactivation of the SFN wraparound offset.

38. The apparatus of claim 23, wherein the one or more processors are configured to receive a configuration of one or more of DRX short cycles or DRX long cycles that are backward compatible for use of the SFN wraparound offset.

\* \* \* \* \*